(12) United States Patent
Matsuda et al.

(10) Patent No.: US 9,209,968 B2
(45) Date of Patent: Dec. 8, 2015

(54) INFORMATION PROCESSING APPARATUS, INFORMATION PROCESSING METHOD, AND PROGRAM

(71) Applicant: SONY CORPORATION, Minato-ku (JP)

(72) Inventors: Seiichi Matsuda, Tokyo (JP); Shiho Moriai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/374,942

(22) PCT Filed: Feb. 7, 2013

(86) PCT No.: PCT/JP2013/052817
§ 371 (c)(1),
(2) Date: Jul. 28, 2014

(87) PCT Pub. No.: WO2013/129054
PCT Pub. Date: Sep. 6, 2013

(65) Prior Publication Data
US 2015/0010146 A1    Jan. 8, 2015

(30) Foreign Application Priority Data

Mar. 2, 2012   (JP) ................................. 2012-046307

(51) Int. Cl.
*H04L 29/06* (2006.01)
*H04L 9/08* (2006.01)
*H04L 9/00* (2006.01)

(52) U.S. Cl.
CPC .............. *H04L 9/0816* (2013.01); *H04L 9/005* (2013.01); *H04L 2209/24* (2013.01)

(58) Field of Classification Search
CPC .................................................... H04L 2209/24
See application file for complete search history.

(56) References Cited

U.S. PATENT DOCUMENTS

2011/0167221 A1*  7/2011  Pangal et al. ................. 711/117

FOREIGN PATENT DOCUMENTS

JP           2003-216025 A       7/2003

OTHER PUBLICATIONS

U.S. Appl. No. 14/373,562, filed Jul. 21, 2014, Matsuda, et al.
U.S. Appl. No. 14/374,671, filed Jul. 25, 2014, Matsuda, et al.
International Search Report issued May 7, 2013 in PCT/JP2013/052817.

(Continued)

*Primary Examiner* — Brandon Hoffman
*Assistant Examiner* — Thong Truong
(74) *Attorney, Agent, or Firm* — Sony Corporation

(57) ABSTRACT

Speed-up of a cryptographic process by software (program) is realized. A data processing unit which executes a data process according to a program defining a cryptographic process sequence is included, and the data processing unit, according to the program, generates a bit slice expression data based on a plurality of plain text data items which are encryption process targets and a bit slice expression key based on a cryptographic key of each plain text data item, generates a round key based on the bit slice expression key, executes the cryptographic process including operation and movement processes of a block unit of the bit slice expression data, and an operation using the round key, and generates the plurality of encrypted data items corresponding to the plurality of plain text data items by the reverse conversion of the data with respect to the cryptographic process results.

15 Claims, 71 Drawing Sheets

(56) References Cited

OTHER PUBLICATIONS

Chester Rebeiro, et al., "Bitslice Implementation of AES", Lecture Notes in Computer Science, CANS 2006, LNCS vol. 4301, 2 Bitslice Implementation, (2006), pp. 203-212.

Robert Könighofer, "A Fast and Cache-Timing Resistant Implementation of the AES", Lecture Notes in Computer Science, CT-RSA 2008, LNCS vol. 4964, 2 The General Approach, 3 The Transform Function, (2008), pp. 187-202.

Emilia Kasper, et al., "Faster and Timing-Attack Resistant AES-GCM", Lecture Notes in Computer Science, CHES 2009, LNCS vol. 5747, International Association for Cryptologic Research 2009, 4 Bitsliced Implementation of AES in Counter Mode, (2009), pp. 1-17.

A. Bogdanov, et al., "Present: An Ultra-Lightweight Block Cipher", Lecture Notes in Computer Science, CHES 2007, LNCS vol. 4727, 3 The Block Cipher Present, (2007), pp. 450-466.

Thomas Ristenpart, et al., "Hey, You, Get Off of My Cloud: Exploring Information Leakage in Third-Party Compute Clouds", ACM CCS'09, (Nov. 9-13, 2009), 14 pages.

Eli Biham, "A Fast New DES Implementation in Software", Proceedings of Fast Software Encryption Workshop 1997, pp. 260-272.

\* cited by examiner

FIG. 3
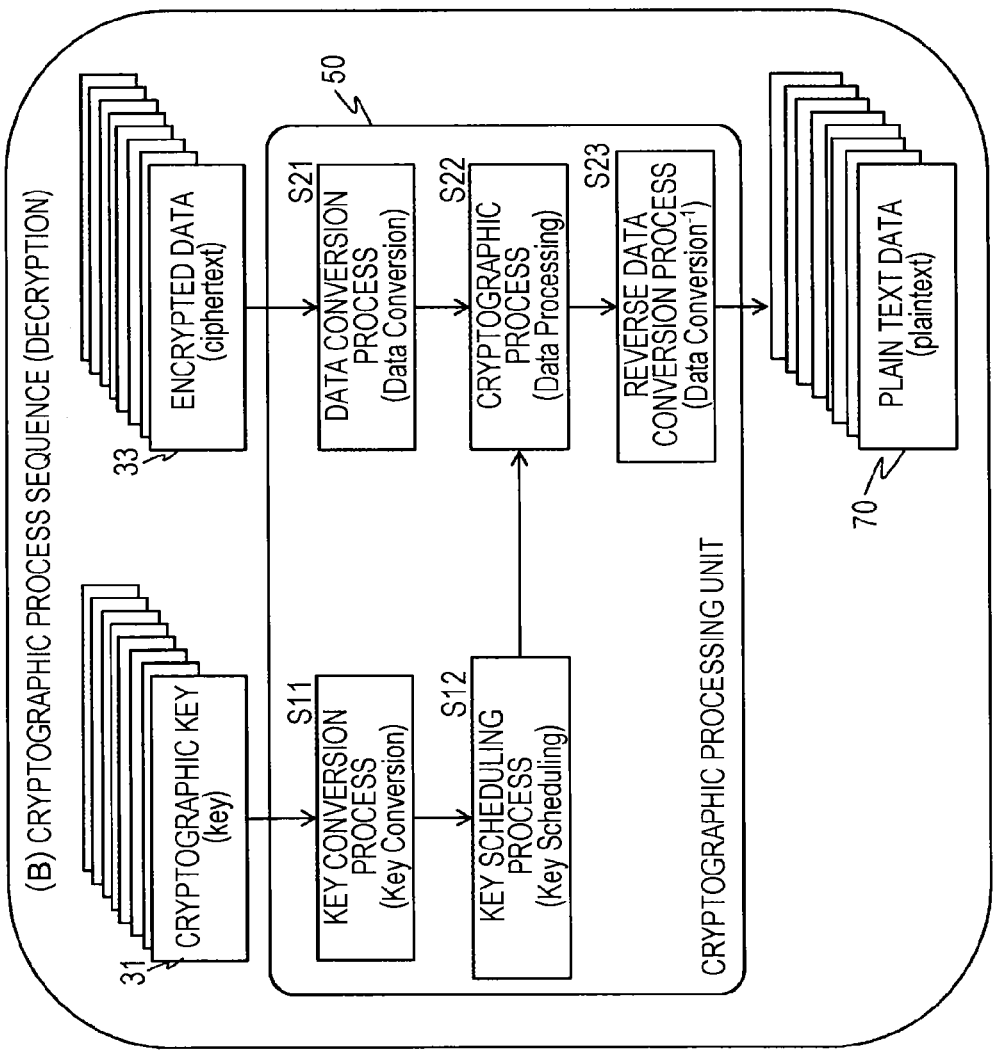
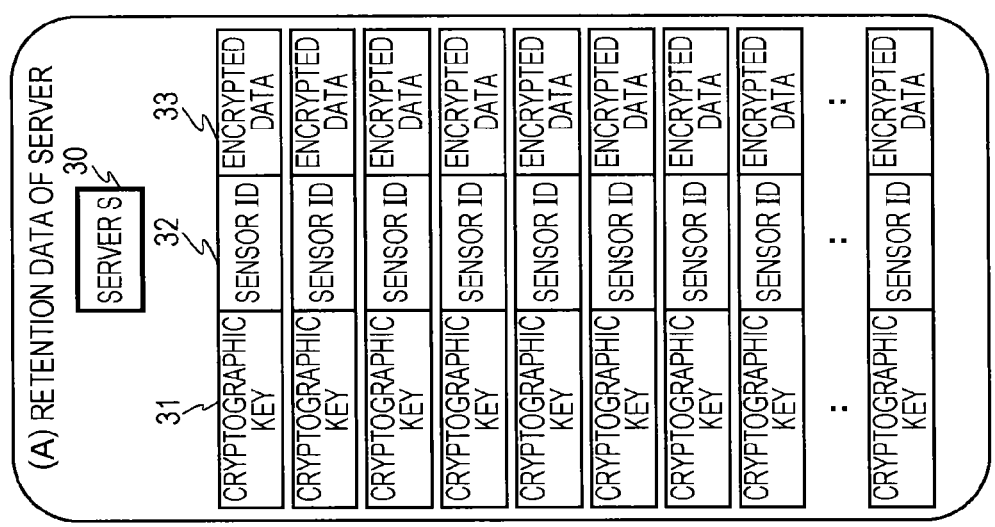

FIG. 10

| | | | | | | | | | | | | | | | | | | | |
|---|---|---|---|---|---|---|---|---|---|---|---|---|---|---|---|---|---|---|---|
| r0 | 79 | 75 | 71 | 67 | 63 | 59 | 55 | 51 | 47 | 43 | 39 | 35 | 31 | 27 | 23 | 19 | | | |
| r1 | 78 | 74 | 70 | 66 | 62 | 58 | 54 | 50 | 46 | 42 | 38 | 34 | 30 | 26 | 22 | 18 | | | |
| r2 | 77 | 73 | 69 | 65 | 61 | 57 | 53 | 49 | 45 | 41 | 37 | 33 | 29 | 25 | 21 | 17 | | | |
| r3 | 76 | 72 | 68 | 64 | 60 | 56 | 52 | 48 | 44 | 40 | 36 | 32 | 28 | 24 | 20 | 16 | | | |
| r4 | 15 | 11 | 7 | 3 | | | | | | | | | | | | | | | |
| r5 | 14 | 10 | 6 | 2 | | | | | | | | | | | | | | | |
| r6 | 13 | 9 | 5 | 1 | | | | | | | | | | | | | | | |
| r7 | 12 | 8 | 4 | 0 | | | | | | | | | | | | | | | |

128-bit

SET
[0, 0]=79,
[1, 0]=78,
[2, 0]=77,
⋮
[3, 15]=0

FIG. 14

STEP S221:

| | | | | | | | | | | | | | | | | | | | |
|---|---|---|---|---|---|---|---|---|---|---|---|---|---|---|---|---|---|---|---|
| r0 | 79 | 75 | 71 | 67 | 63 | 59 | 55 | 51 | 47 | 43 | 39 | 35 | 31 | 27 | 23 | 19 |
| r1 | 78 | 74 | 70 | 66 | 62 | 58 | 54 | 50 | 46 | 42 | 38 | 34 | 30 | 26 | 22 | 18 |
| r2 | 77 | 73 | 69 | 65 | 61 | 57 | 53 | 49 | 45 | 41 | 37 | 33 | 29 | 25 | 21 | 17 |
| r3 | 76 | 72 | 68 | 64 | 60 | 56 | 52 | 48 | 44 | 40 | 36 | 32 | 28 | 24 | 20 | 16 |
| r4 | 15 | 11 | 7 | 3 | | | | | | | | | | | | |
| r5 | 14 | 10 | 6 | 2 | | | | | | | | | | | | |
| r6 | 13 | 9 | 5 | 1 | | | | | | | | | | | | |
| r7 | 12 | 8 | 4 | 0 | | | | | | | | | | | | |
| r8 | 15 | 11 | 7 | 3 | | | | | | | | | | | | |
| r9 | 78 | 74 | 70 | 66 | 62 | 58 | 54 | 50 | 46 | 42 | 38 | 34 | 30 | 26 | 22 | 18 |
| r10 | 77 | 73 | 69 | 65 | 61 | 57 | 53 | 49 | 45 | 41 | 37 | 33 | 29 | 25 | 21 | 17 |
| r11 | 76 | 72 | 68 | 64 | 60 | 56 | 52 | 48 | 44 | 40 | 36 | 32 | 28 | 24 | 20 | 16 |

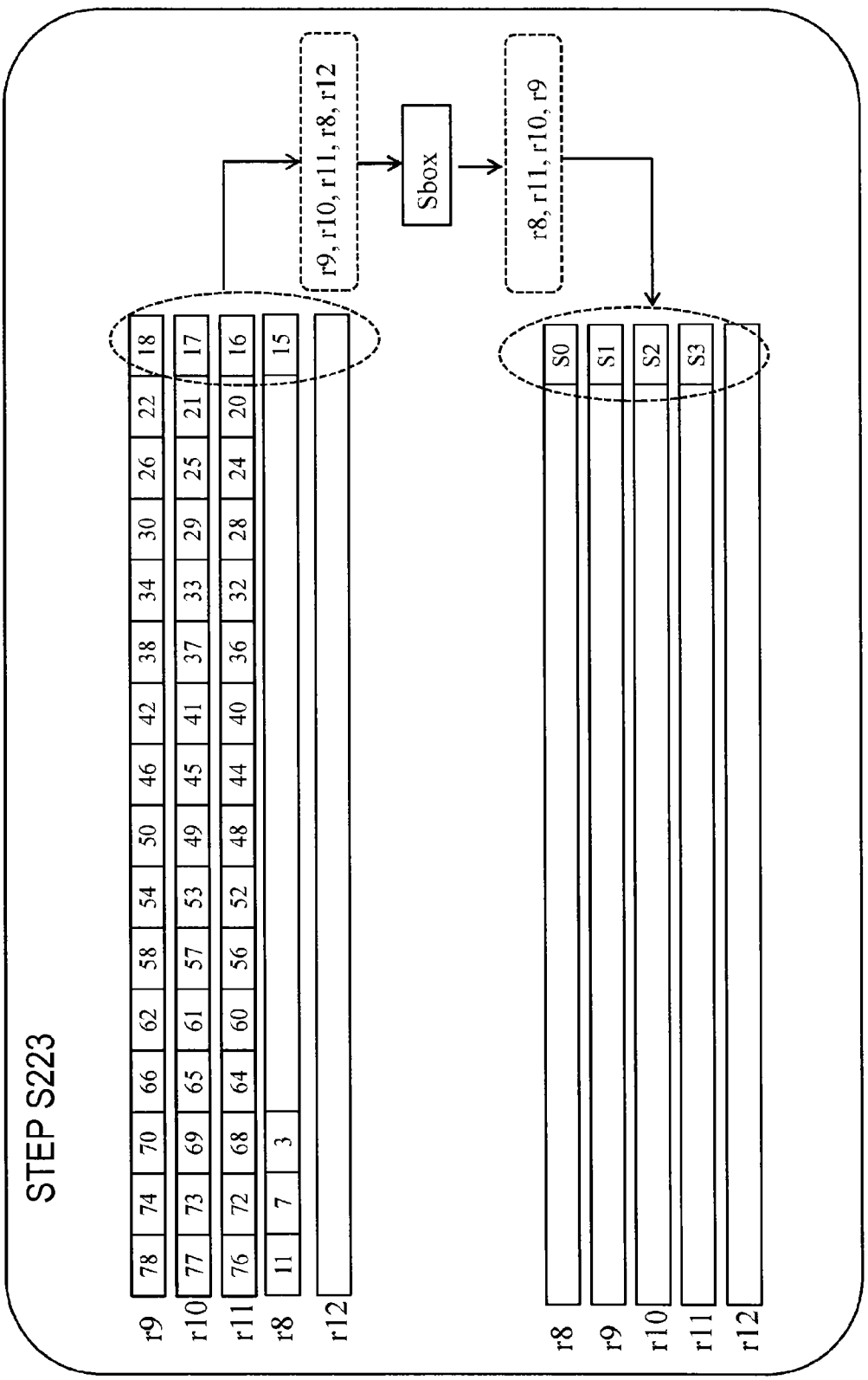

FIG. 17

<sBox LOGICAL COMMAND EXAMPLE>

INPUT REGISTERS: x3, x2, x1, x0, x4
OUTPUT REGISTERS: x0, x1, x2, x3

STEP 1:   $x2 \leftarrow x1 \oplus x2$      $x3 \leftarrow x1 \oplus x3$
STEP 2:   $x4 \leftarrow x2$                $x2 \leftarrow x2 \& x3$
STEP 3:   $x1 \leftarrow x1 \oplus x2$      $x4 \leftarrow x0 \oplus x4$
STEP 4:   $x2 \leftarrow x1$                $x1 \leftarrow x1 \& x4$
STEP 5:   $x1 \leftarrow x1 \oplus x3$      $x4 \leftarrow x0 \oplus x4$
STEP 6:   $x4 \leftarrow x2 | x4$           $x2 \leftarrow x0 \oplus x2$
STEP 7:   $x2 \leftarrow x1 \oplus x2$      $x4 \leftarrow x3 \oplus x4$
STEP 8:   $x2 \leftarrow \sim x2$           $x0 \leftarrow x0 \oplus x4$
STEP 9:   $x3 \leftarrow x2$
STEP 10:  $x2 \leftarrow x2 | x4$
STEP 11:  $x2 \leftarrow \sim x2$           $x2 \leftarrow x1 \& x2$

FIG. 18

STEP S224

| | | | | | | | | | | | | | | | | | | | |
|---|---|---|---|---|---|---|---|---|---|---|---|---|---|---|---|---|---|---|---|
| r0 | 79 | 75 | 71 | 67 | 63 | 59 | 55 | 51 | 47 | 43 | 39 | 35 | 31 | 27 | 23 | 19 | | | |
| r1 | 78 | 74 | 70 | 66 | 62 | 58 | 54 | 50 | 46 | 42 | 38 | 34 | 30 | 26 | 22 | 18 | | | |
| r2 | 77 | 73 | 69 | 65 | 61 | 57 | 53 | 49 | 45 | 41 | 37 | 33 | 29 | 25 | 21 | 17 | | | |
| r3 | 76 | 72 | 68 | 64 | 60 | 56 | 52 | 48 | 44 | 40 | 36 | 32 | 28 | 24 | 20 | 16 | | | |
| r4 | 15 | 11 | 7 | 3 | | | | | | | | | | | | | | | |
| r5 | 14 | 10 | 6 | 2 | | | | | | | | | | | | | | | |
| r6 | 13 | 9 | 5 | 1 | | | | | | | | | | | | | | | |
| r7 | 12 | 8 | 4 | 0 | | | | | | | | | | | | | | | |
| r8 | S0 | 000...000(120-bit) | | | | | | | | | | | | | | | | | |
| r9 | S1 | 000...000(120-bit) | | | | | | | | | | | | | | | | | |
| r10 | S2 | 000...000(120-bit) | | | | | | | | | | | | | | | | | |
| r11 | S3 | 000...000(120-bit) | | | | | | | | | | | | | | | | | |

⇩ 120-BIT LEFT SHIFT

FIG. 19

STEP S225

| | | | | | | | | | | | | | | | | | | | |
|---|---|---|---|---|---|---|---|---|---|---|---|---|---|---|---|---|---|---|---|
| r0 | 79 | 75 | 71 | 67 | 63 | 59 | 55 | 51 | 47 | 43 | 39 | 35 | 31 | 27 | 23 | 19 |
| r1 | 78 | 74 | 70 | 66 | 62 | 58 | 54 | 50 | 46 | 42 | 38 | 34 | 30 | 26 | 22 | 18 |
| r2 | 77 | 73 | 69 | 65 | 61 | 57 | 53 | 49 | 45 | 41 | 37 | 33 | 29 | 25 | 21 | 17 |
| r3 | 76 | 72 | 68 | 64 | 60 | 56 | 52 | 48 | 44 | 40 | 36 | 32 | 28 | 24 | 20 | 16 | r4: 0...0 | 11 | 7 | 3 | 000...000(96-bit)
r5: 0...0 | 14 | 10 | 6 | 2 | 000...000(88-bit)
r6: 0...0 | 13 | 9 | 5 | 1 | 000...000(88-bit)
r7: 0...0 | 12 | 8 | 4 | 0 | 000...000(88-bit)

r8: S0 | 000...000(120-bit)
r9: S1 | 000...000(120-bit)
r10: S2 | 000...000(120-bit)
r11: S3 | 000...000(120-bit)

MASK0: 0...0 | 1...1 | 1...1 | 000...000(96-bit)
MASK1: 0...0 | 1...1 | 1...1 | 000...000(88-bit)

FIG. 22

STEP S228

| | | | | | | | | | | | | | | | | |
|---|---|---|---|---|---|---|---|---|---|---|---|---|---|---|---|---|
| r0 | 31 | 27 | 23 | 19 | 79 | 75 | 71 | 67 | 63 | 59 | 55 | 51 | 47 | 43 | 39 | 35 |
| r1 | 34 | 30 | 26 | 22 | 18 | 78 | 74 | 70 | 66 | 62 | 58 | 54 | 50 | 46 | 42 | 38 |
| r2 | 33 | 29 | 25 | 21 | 17 | 77 | 73 | 69 | 65 | 61 | 57 | 53 | 49 | 45 | 41 | 37 |
| r3 | 32 | 28 | 24 | 20 | 16 | 76 | 72 | 68 | 64 | 60 | 56 | 52 | 48 | 44 | 40 | 36 | r4: S3 | 11 | 7 | 3 | 000...000(96-bit)
r5: S0 | 14 | 10 | 6 | 2 | 000...000(88-bit)
r6: S1 | 13 | 9 | 5 | 1 | 000...000(88-bit)
r7: S2 | 12 | 8 | 4 | 0 | 000...000(88-bit)

| | | | | | | | | | | | | | | | | |
|---|---|---|---|---|---|---|---|---|---|---|---|---|---|---|---|---|
| r8 | 000...000(32-bit) | | | | 79 | 75 | 71 | 67 | 63 | 59 | 55 | 51 | 47 | 43 | 39 | 35 |
| r9 | 000...000(40-bit) | | | | 78 | 74 | 70 | 66 | 62 | 58 | 54 | 50 | 46 | 42 | 38 |
| r10 | 000...000(40-bit) | | | | 77 | 73 | 69 | 65 | 61 | 57 | 53 | 49 | 45 | 41 | 37 |
| r11 | 000...000(40-bit) | | | | 76 | 72 | 68 | 64 | 60 | 56 | 52 | 48 | 44 | 40 | 36 |

MASK2: 000...000(32-bit) | 1...1(96-bit)
MASK3: 000...000(40-bit) | 1...1(88-bit)

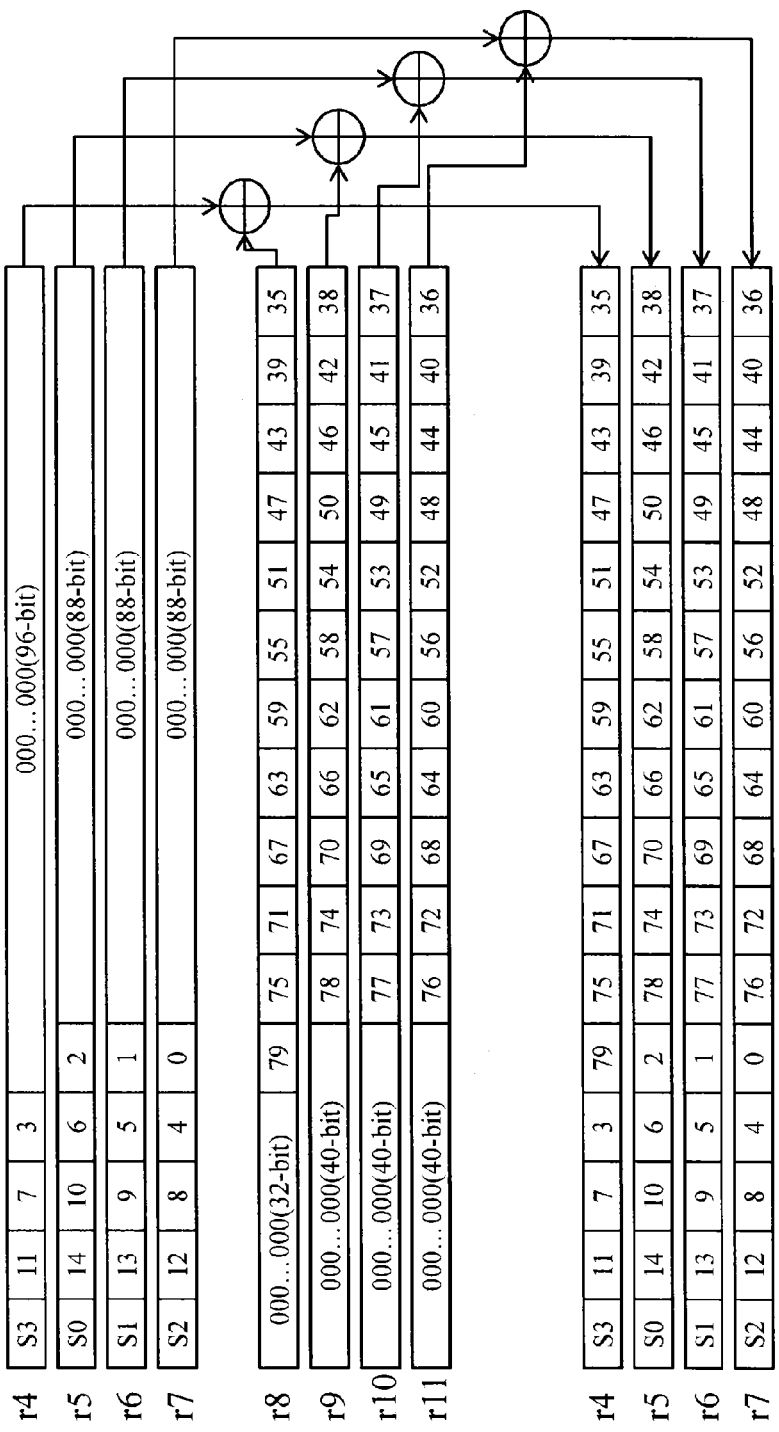

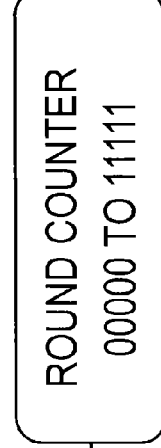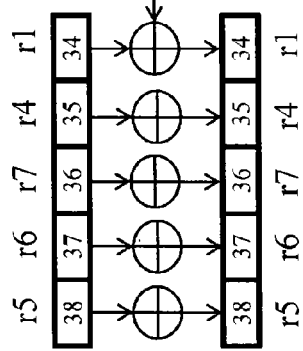
FIG. 24 STEP S230

FIG. 30

| | | | | | | | | | | | | | | | | | | |
|---|---|---|---|---|---|---|---|---|---|---|---|---|---|---|---|---|---|---|
| r0 | 79 | 75 | 71 | 67 | 63 | 59 | 55 | 51 | 47 | 43 | 39 | 35 | 31 | 27 | 23 | 19 |
| r1 | 78 | 74 | 70 | 66 | 62 | 58 | 54 | 50 | 46 | 42 | 38 | 34 | 30 | 26 | 22 | 18 |
| r2 | 77 | 73 | 69 | 65 | 61 | 57 | 53 | 49 | 45 | 41 | 37 | 33 | 29 | 25 | 21 | 17 |
| r3 | 76 | 72 | 68 | 64 | 60 | 56 | 52 | 48 | 44 | 40 | 36 | 32 | 28 | 24 | 20 | 16 |

| | | | |
|---|---|---|---|
| r4 | 15 | 11 | 7 | 3 |
| r5 | 14 | 10 | 6 | 2 |
| r6 | 13 | 9 | 5 | 1 |
| r7 | 12 | 8 | 4 | 0 |

FIG. 47

(A) DATA FOR ROUND KEY GENERATION

| r0 | 79 | 75 | 71 | 67 | 63 | 59 | 55 | 51 | 47 | 43 | 39 | 35 | 31 | 27 | 23 | 19 |
| --- | --- | --- | --- | --- | --- | --- | --- | --- | --- | --- | --- | --- | --- | --- | --- | --- |
| r1 | 78 | 74 | 70 | 66 | 62 | 58 | 54 | 50 | 46 | 42 | 38 | 34 | 30 | 26 | 22 | 18 |
| r2 | 77 | 73 | 69 | 65 | 61 | 57 | 53 | 49 | 45 | 41 | 37 | 33 | 29 | 25 | 21 | 17 |
| r3 | 76 | 72 | 68 | 64 | 60 | 56 | 52 | 48 | 44 | 40 | 36 | 32 | 28 | 24 | 20 | 16 |

| r4 | 15 | 11 | 7 | 3 |
| --- | --- | --- | --- | --- |
| r5 | 14 | 10 | 6 | 2 |
| r6 | 13 | 9 | 5 | 1 |
| r7 | 12 | 8 | 4 | 0 |

(B) PROCESS RESULTS OF NONLINEAR CONVERSION (Sbox)

| r12 | 0,0 | 0,1 | 0,2 | 0,3 | 0,4 | 0,5 | 0,6 | 0,7 | 0,8 | 0,9 | 0,10 | 0,11 | 0,12 | 0,13 | 0,14 | 0,15 |
| --- | --- | --- | --- | --- | --- | --- | --- | --- | --- | --- | --- | --- | --- | --- | --- | --- |
| r13 | 1,0 | 1,1 | 1,2 | 1,3 | 1,4 | 1,5 | 1,6 | 1,7 | 1,8 | 1,9 | 1,10 | 1,11 | 1,12 | 1,13 | 1,14 | 1,15 |
| r14 | 2,0 | 2,1 | 2,2 | 2,3 | 2,4 | 2,5 | 2,6 | 2,7 | 2,8 | 2,9 | 2,10 | 2,11 | 2,12 | 2,13 | 2,14 | 2,15 |
| r15 | 3,0 | 3,1 | 3,2 | 3,3 | 3,4 | 3,5 | 3,6 | 3,7 | 3,8 | 3,9 | 3,10 | 3,11 | 3,12 | 3,13 | 3,14 | 3,15 |

FIG. 50

STEP S303

| | | | | | | | | | | | | | | | | | |
|---|---|---|---|---|---|---|---|---|---|---|---|---|---|---|---|---|---|
|r0|79|75|71|67|63|59|55|51|47|43|39|35|31|27|23|19|
|r1|78|74|70|66|62|58|54|50|46|42|38|34|30|26|22|18|
|r2|77|73|69|65|61|57|53|49|45|41|37|33|29|25|21|17|
|r3|76|72|68|64|60|56|52|48|44|40|36|32|28|24|20|16|
|r4|0...0|11|7|3|000...000(96-bit)|
|r5|0...0|14|10|6|2|000...000(88-bit)|
|r6|0...0|13|9|5|1|000...000(88-bit)|
|r7|0...0|12|8|4|0|000...000(88-bit)|
|r8|0,0|000...000(120-bit)|
|r9|1,0|000...000(120-bit)|
|r10|2,0|000...000(120-bit)|
|r11|3,0|000...000(120-bit)|

MASK0: 0...0 | 1...1 | 1...1 | 1...1 | 000...000(96-bit)
MASK1: 0...0 | 1...1 | 1...1 | 1...1 | 1...1 | 000...000(88-bit)

FIG. 53

STEP S306

| | | | | | | | | | | | | | | | |
|---|---|---|---|---|---|---|---|---|---|---|---|---|---|---|---|
| r0 | 31 | 27 | 23 | 19 | 79 | 75 | 71 | 67 | 63 | 59 | 55 | 51 | 47 | 43 | 39 | 35 |
| r1 | 34 | 30 | 26 | 22 | 18 | 78 | 74 | 70 | 66 | 62 | 58 | 54 | 50 | 46 | 42 | 38 |
| r2 | 33 | 29 | 25 | 21 | 17 | 77 | 73 | 69 | 65 | 61 | 57 | 53 | 49 | 45 | 41 | 37 |
| r3 | 32 | 28 | 24 | 20 | 16 | 76 | 72 | 68 | 64 | 60 | 56 | 52 | 48 | 44 | 40 | 36 |

| | |
|---|---|
| r4 | 3,0 \| 11 \| 7 \| 3 \| 000...000(96-bit) |
| r5 | 0,0 \| 14 \| 10 \| 6 \| 2 \| 000...000(88-bit) |
| r6 | 1,0 \| 13 \| 9 \| 5 \| 1 \| 000...000(88-bit) |
| r7 | 2,0 \| 12 \| 8 \| 4 \| 0 |

| | | | | | | | | | | | | | | | | |
|---|---|---|---|---|---|---|---|---|---|---|---|---|---|---|---|---|
| r8 | 000...000(32-bit) | 79 | 75 | 71 | 67 | 63 | 59 | 55 | 51 | 47 | 43 | 39 | 35 |
| r9 | 000...000(40-bit) | 78 | 74 | 70 | 66 | 62 | 58 | 54 | 50 | 46 | 42 | 38 |
| r10 | 000...000(40-bit) | 77 | 73 | 69 | 65 | 61 | 57 | 53 | 49 | 45 | 41 | 37 |
| r11 | 000...000(40-bit) | 76 | 72 | 68 | 64 | 60 | 56 | 52 | 48 | 44 | 40 | 36 |

MASK2: 000...000(32-bit) | 1...1(96-bit)

MASK3: 000...000(40-bit) | 1...1(88-bit)

FIG. 60

STEP S403   <SboxLayer (NONLINEAR CONVERSION LOGICAL COMMAND EXAMPLE)>
INPUT REGISTERS: x3, x2, x1, x0, x4
OUTPUT REGISTERS: x0, x1, x2, x3

STEP 1:   $x2 \leftarrow x1 \oplus x2$   $x3 \leftarrow x1 \oplus x3$
STEP 2:   $x4 \leftarrow x2$             $x2 \leftarrow x2 \,\&\, x3$
STEP 3:   $x1 \leftarrow x1 \oplus x2$   $x4 \leftarrow x0 \oplus x4$
STEP 4:   $x2 \leftarrow x1$             $x1 \leftarrow x1 \,\&\, x4$
STEP 5:   $x1 \leftarrow x1 \oplus x3$   $x4 \leftarrow x0 \oplus x4$
STEP 6:   $x4 \leftarrow x2 \,|\, x4$    $x2 \leftarrow x0 \oplus x2$
STEP 7:   $x2 \leftarrow x1 \oplus x2$   $x4 \leftarrow x3 \oplus x4$
STEP 8:   $x2 \leftarrow {\sim}x2$       $x0 \leftarrow x0 \oplus x4$
STEP 9:   $x3 \leftarrow x2$             $x2 \leftarrow x1 \,\&\, x2$
STEP 10:  $x2 \leftarrow x2 \,|\, x4$
STEP 11:  $x2 \leftarrow {\sim}x2$

FIG. 62

STEP S404 INPUT DATA OF <pLayer (LINEAR CONVERSION PROCESS)>

| | | | | | | | | | | | | | | | | |
|---|---|---|---|---|---|---|---|---|---|---|---|---|---|---|---|---|
| r0 | [0,0] | [0,1] | [0,2] | [0,3] | [0,4] | [0,5] | [0,6] | [0,7] | [0,8] | [0,9] | [0,10] | [0,11] | [0,12] | [0,13] | [0,14] | [0,15] |
| r1 | [1,0] | [1,1] | [1,2] | [1,3] | [1,4] | [1,5] | [1,6] | [1,7] | [1,8] | [1,9] | [1,10] | [1,11] | [1,12] | [1,13] | [1,14] | [1,15] |
| r2 | [2,0] | [2,1] | [2,2] | [2,3] | [2,4] | [2,5] | [2,6] | [2,7] | [2,8] | [2,9] | [2,10] | [2,11] | [2,12] | [2,13] | [2,14] | [2,15] |
| r3 | [3,0] | [3,1] | [3,2] | [3,3] | [3,4] | [3,5] | [3,6] | [3,7] | [3,8] | [3,9] | [3,10] | [3,11] | [3,12] | [3,13] | [3,14] | [3,15] |

STEP S455

FIG. 70

STEP S404  INPUT AND OUTPUT DATA OF <pLayer (LINEAR CONVERSION PROCESS)>

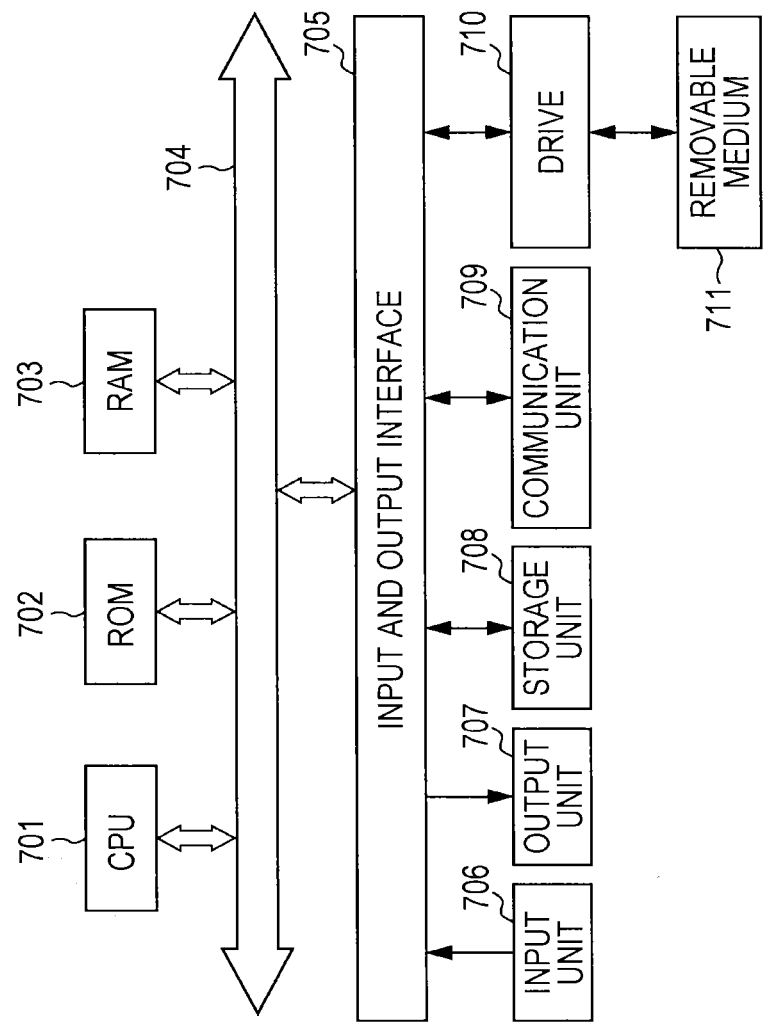

INFORMATION PROCESSING APPARATUS, INFORMATION PROCESSING METHOD, AND PROGRAM

TECHNICAL FIELD

The present disclosure relates to an information processing apparatus, an information processing method, and a program. More specifically, the present disclosure relates to an information processing apparatus, an information processing method, and a program for realizing speed-up of a cryptographic process of mass data.

BACKGROUND ART

With the development of the information society, importance of an information security technology for protecting information in security has been increased. Cryptography is one constituent element of the information security technology, and the cryptography is currently used in various products and systems.

For example, communication is actively performed through a network such as the Internet, and various devices such as a PC, a mobile phone, a RFID, and various sensors are connected to the network for communication. In such an environment, it is essential to use the information security technology for realizing a network society that increases convenience while protecting individual privacy, and the cryptography capable of increasing security and performing a process at a high speed is required.

A system of which a server collects, for example, information transmitted from a terminal owned by an individual or information acquired through a sensor installed in a house, and which performs various data processes or analysis with respect to the information collected by the sensor has been used.

Specifically, there are, for example, a system which manages power consumption by disposing a sensor in a house or an office, a service used for health and safety management by disposing a sensor in a house of an aged person living alone, a transportation system used for traffic congestion detection and alleviation by a sensor disposed at a road or in a car, and the like.

In many cases, the data collected in such a system includes information regarding individual privacy, and it is desirable to encrypt the data in order to protect the privacy. However, hardware in which a cryptographic algorithm of the related art is installed, is not a lightweight cryptographic algorithm designed for small hardware installation, has a large module scale and is difficult to be mounted on a small-sized device such as RFID or a sensor, for example. In addition, it is difficult to realize the device at low cost, power consumption is great, and a frequency of battery exchange increases, and therefore there are many problems from the viewpoint of operability.

Meanwhile, there is an increasing requirement for lightweight cryptography suitable for hardware installation to a device with limited hardware scale or resources of a memory, or a device in which energy saving is required.

Research and development of the lightweight cryptography is in progress in response to such needs, and recently, several new lightweight block cryptographies which are excellent from a viewpoint of small hardware installation are proposed. There are PRESENT, CLEFIA, KATAN, Piccolo, and the like, as representative examples.

With this, international standardization of the lightweight cryptography has progressed, and standardization of an international standard of lightweight cryptography ISO/IEC 29192 has progressed in a committee ISO/IEC JTC 1/SC 27 for performing international standardization of the information security technology, in a joint technical committee of International Organization for Standardization (ISO) and International Electrotechnical Commission (IEC).

Many examples of the lightweight block cryptogram which is one of the lightweight cryptography are optimal for small hardware installation.

That is, in order to realize a small size at the time of hardware installation, many examples of the lightweight block cryptogram are designed with a structure in which a plurality of small S-boxes with four bits and "light" round functions frequently used with a bit operation are repeated.

This structure of the lightweight cryptogram cannot take advantage of a general-purpose processer which continues to be developed, and a problem of a low speed generally occurs in software installation in the PC or the server.

As one example of a process of software installation in the PC or the server, cloud computing using a device connected to the network may be used, but a cross-virtual machine (VM) side-channel attack may also present a threat to the cloud [NPL 1]. The cloud may have a multi-tenant system in which a plurality of users share one server, and virtual machines VM of the users are separated from each other, but a physical device such as a memory or a cache is shared. The cross-VM side-channel attack is an attack where a cache is continuously attacked by a "malicious VM" which shares a set associative cache and a key is extracted by detecting an access by another VM by a delayed reaction of the cache. As described above, when performing the cryptographic process on the cloud in a state of the software installation, resistance with respect to such a side-channel attack is also the object of the disclosure.

CITATION LIST

Non Patent Literature

NPL 1: Thomas Ristenpart, Eran Tromer, Hovav Shacham, Stefan Savage, "Hey, You, Get Off of My Cloud: Exploring Information Leakage in Third-Party Compute Clouds," ACM CCS'09, Nov. 9-13, 2009

NPL 2: Eli Biham, "A Fast New DES Implementation in Software", FSE'97, 1997

SUMMARY OF INVENTION

Technical Problem

The present disclosure is made in view of such circumstances, and an object thereof is to provide an information processing apparatus, an information processing method, and a program for realizing speed-up of a cryptographic process of mass data.

In addition, in one example of the present disclosure, in a case where the cryptographic process is executed using software (program) which can be operated on a general-purpose processor, an object thereof is to provide an information processing apparatus, an information processing method, and a program for performing a process at a high speed.

Solution to Problem

According to a first aspect of the present disclosure, there is provided an information processing apparatus including: a data processing unit which executes a data process according to a program defining a cryptographic process sequence, in which the data processing unit, according to the program, executes a data conversion process of generating bit slice expression data by performing a bit slice process with respect to plain text data which is an encryption process target, a key conversion process of generating a bit slice expression key by performing a bit slice process with respect to each cryptographic key of the plain text data, a key scheduling process of inputting the bit slice expression key to generate a round key for each round of the cryptographic process, a cryptographic process in which the round key is applied with respect to the bit slice expression data, and a reverse data conversion process of generating encrypted data corresponding to the plain text data, by performing reverse conversion of the bit slice process with respect to the result of the cryptographic process, and executes the cryptographic process using an operation process and a movement process of a bit slice expression data block unit configured with the same orders of bits or bits at every n bits of each plain text data configuring the bit slice expression data in the cryptographic process, and herein n is a power of 2.

In addition, in one embodiment of the information processing apparatus of the present disclosure, the data processing unit executes a process of storing a bit slice expression data block configured with the plain text data in a register as a processing unit, in the data conversion process, executes a process of storing a bit slice expression key block configured with the same orders of bits or bits at every n bits of each cryptographic key configuring the bit slice expression key, in the register as a processing unit, in the key conversion process, and herein n is a power of 2, and executes the cryptographic process using an operation process and a movement process of the block unit using the bit slice expression data block and the bit slice expression key block stored in the register as a unit, in the cryptographic process.

In addition, in one embodiment of the information processing apparatus of the present disclosure, the data processing unit executes a process of dispersing and storing a bit slice expression data block configured with the plain text data in a plurality of registers as a processing unit, in the data conversion process, and performs the cryptographic process by executing an operation process between the plurality of registers with respect to the bit slice expression data block stored in the plurality of registers and a shifting and shuffling process of each register storage block, in the cryptographic process.

In addition, in one embodiment of the information processing apparatus of the present disclosure, the data processing unit further executes an unpacking process of re-storing a block selected from the storage blocks of the plurality of registers in one register, in the cryptographic process.

In addition, in one embodiment of the information processing apparatus of the present disclosure, the data processing unit executes a round key operation defined in the cryptographic process sequence, by executing an exclusive-OR operation (XOR) with the round key in the register unit configuring the plurality of registers for storing the bit slice expression data blocks, in the cryptographic process.

In addition, in one embodiment of the information processing apparatus of the present disclosure, the data processing unit executes a nonlinear conversion process (Sbox) defined in the cryptographic process sequence, by executing an operation according to a predetermined logical command example with respect to the bit slice expression blocks stored in the plurality of registers, in the cryptographic process.

In addition, in one embodiment of the information processing apparatus of the present disclosure, the data processing unit executes the cryptographic process according to a cryptographic algorithm PRESENT, according to a program, in the cryptographic process.

In addition, according to a second aspect of the present disclosure, there is provided an information processing apparatus including: a data processing unit that executes a data process according to a program defining a decryption process sequence, in which the data processing unit, according to the program, executes a data conversion process of generating bit slice expression data by performing a bit slice process with respect to a plurality of encrypted data items which are decryption process targets, a key conversion process of generating a bit slice expression key by performing a bit slice process with respect to each cryptographic key of each of the plurality of encrypted data items, a key scheduling process of inputting the bit slice expression key to generate a round key for each round of the decryption process, a decryption process in which the round key is applied with respect to the bit slice expression data, and a reverse data conversion process of generating a plurality of plain text data items corresponding to the plurality of encrypted data items, by performing reverse conversion of the bit slice process with respect to the result of the decryption process, and executes the decryption process using an operation process and a movement process of a bit slice expression data block unit configured with the same orders of bits or bits at every n bits of each encrypted data item configuring the bit slice expression data in the decryption process, and herein n is a power of 2.

In addition, in one embodiment of the information processing apparatus of the present disclosure, the data processing unit executes a process of storing a bit slice expression data block configured with the encrypted data in a register as a processing unit, in the data conversion process, executes a process of storing a bit slice expression key block configured with the same orders of bits or bits at every n bits of each cryptographic key configuring the bit slice expression key, in the register as a processing unit, in the key conversion process, and herein n is a power of 2, and executes a decryption process using an operation process and a movement process of the block unit using the bit slice expression data block and the bit slice expression key block stored in the register as a unit, in the decryption process.

In addition, in one embodiment of the information processing apparatus of the present disclosure, the data processing unit executes a process of dispersing and storing a bit slice expression data block configured with data of the same orders of bits of the encrypted data, in a plurality of registers as a processing unit, in the data conversion process, and executes an operation process between the plurality of registers with respect to the bit slice expression data block stored in the plurality of registers and a shifting and shuffling process of each register storage block, in the decryption process.

In addition, in one embodiment of the information processing apparatus of the present disclosure, the data processing unit executes an unpacking process of re-storing a block selected from the storage blocks of the plurality of registers in one register, in the decryption process.

In addition, according to a third aspect of the present disclosure, there is provided an information processing method which is performed in an information processing apparatus, the method causing a data processing unit of the information processing apparatus, according to a program defining a cryptographic process sequence, to execute: a data conversion process of generating bit slice expression data by performing a bit slice process with respect to a plurality of plain text data items which are encryption process targets; a key conversion process of generating a bit slice expression key by performing a bit slice process with respect to each cryptographic key of each of the plurality of plain text data items; a key scheduling process of inputting the bit slice expression key to generate a round key for each round of the cryptographic process; a cryptographic process in which the round key is applied with respect to the bit slice expression data; and a reverse data conversion process of generating a plurality of encrypted data items corresponding to the plurality of plain text data items, by performing reverse conversion of the bit slice process with respect to the result of the cryptographic process, in which the cryptographic process using an operation process and a movement process of a bit slice expression data block unit configured with the same orders of bits or bits at every n bits of each plain text data configuring the bit slice expression data is executed in the cryptographic process, and herein n is a power of 2.

In addition, according to a fourth aspect of the present disclosure, there is provided an information processing method which is performed in an information processing apparatus, the method causing a data processing unit of the information processing apparatus, according to a program defining a decryption process sequence, to execute: a data conversion process of generating bit slice expression data by performing a bit slice process with respect to the plurality of encrypted data items which are decryption process targets; a key conversion process of generating a bit slice expression key by performing a bit slice process with respect to each cryptographic key of each of the plurality of encrypted data items; a key scheduling process of inputting the bit slice expression key to generate a round key for each round of the decryption process; a decryption process in which the round key is applied with respect to the bit slice expression data; and a reverse data conversion process of generating a plurality of plain text data items corresponding to the plurality of encrypted data items, by performing reverse conversion of the bit slice process with respect to the result of the decryption process, in which the decryption process using an operation process and a movement process of a bit slice expression data block unit configured with the same orders of bits or bits at every n bits of each encrypted data item configuring the bit slice expression data is executed in the decryption process, and herein n is a power of 2.

In addition, according to a fifth aspect of the present disclosure, there is provided a program which causes an information processing apparatus to perform a cryptographic process including: causing a data processing unit of the information processing apparatus to execute a data conversion process of generating bit slice expression data by performing a bit slice process with respect to a plurality of plain text data items which are encryption process targets, a key conversion process of generating a bit slice expression key by performing a bit slice process with respect to each cryptographic key of each of the plurality of plain text data items, a key scheduling process of inputting the bit slice expression key to generate a round key for each round of the cryptographic process, a cryptographic process in which the round key is applied with respect to the bit slice expression data, and a reverse data conversion process of generating a plurality of encrypted data items corresponding to the plurality of plain text data items, by performing reverse conversion of the bit slice process with respect to the result of the cryptographic process, in which the cryptographic process using an operation process and a movement process of a bit slice expression data block unit configured with the same orders of bits or bits at every n bits of each plain text data configuring the bit slice expression data is executed in the cryptographic process, and herein n is a power of 2.

In addition, according to a sixth aspect of the present disclosure, there is provided a program which causes an information processing apparatus to perform a decryption process including: causing a data processing unit of the information processing apparatus to execute a data conversion process of generating bit slice expression data by performing a bit slice process with respect to the plurality of encrypted data items which are decryption process targets, a key conversion process of generating a bit slice expression key by performing a bit slice process with respect to each cryptographic key of each of the plurality of encrypted data items, a key scheduling process of inputting the bit slice expression key to generate a round key for each round of the decryption process, a decryption process in which the round key is applied with respect to the bit slice expression data, and a reverse data conversion process of generating a plurality of plain text data items corresponding to the plurality of encrypted data items, by performing reverse conversion of the bit slice process with respect to the result of the decryption process, in which the decryption process using an operation process and a movement process of a bit slice expression data block unit configured with the same orders of bits or bits at every n bits of each encrypted data item configuring the bit slice expression data is executed in the decryption process, and herein n is a power of 2.

Further, the program of the present disclosure is, for example, a program which is provided, for example, by a recording medium with respect to an information processing apparatus or a computer system which can execute various program codes. Such a program is executed by a program execution unit of the information processing apparatus or the computer system and therefore a process according to the program is executed.

Other objects, features, or advantages of the present disclosure will be made clear with detailed description with reference to the following examples or accompanied drawings. In addition, the system in this specification is a logical set configuration of a plurality of apparatuses, and is not limited to a system with the apparatuses having respective configurations in the same housing.

Advantageous Effects of Invention

According to one example of the present disclosure, speed-up of the cryptographic process by the software (program) is realized.

In detail, the data processing unit which executes the data processing according to the program defining the cryptographic process sequence is included, the data processing unit, according to the program, generates the bit slice expression data based on the plurality of plain text data which are encryption process targets and the bit slice expression key based on the cryptographic key of each plain text data item, generates the round key based on the bit slice expression key, executes the cryptographic process including operation and movement processes of the block unit of the bit slice expression data, and the operation using the round key, and generates the plurality of encrypted data items corresponding to the plurality of plain text data items by the reverse conversion of the data with respect to the cryptographic process results.

When performing the cryptographic process, the process is performed by the operation or the movement process of the bit slice expression block unit stored in the register, and it is possible to collectively execute the generation of the plurality of the encrypted data items or the decryption process with respect to the plurality of the encrypted data items, and to perform the processing of the mass data at a high speed.

In addition, in the decryption process according to one example of the present disclosure, the process is performed by the operation or movement process of the bit slice expression block unit stored in a register, and it is possible to perform the processing of the mass data at a high speed. In detail, in a case where a cryptographic algorithm [PRESENT (key length of 80 bits)] is executed in an Intel Core i7 870 processor, a high speed of 11.06 cycles/byte is achieved, and in a case where a cryptographic algorithm [Piccolo (key length of 80 bits)] is executed, a high speed of 5.59 cycles/byte is achieved. Particularly the speed of Piccolo exceeds 6.92 cycles/byte which is a speed record of Advanced Encryption Standard (AES) in the same platform (Intel Core i7 920) which is known in the related art.

In addition, since S-box is calculated by a logic operation without referring to a table in bit slice installation according to one example of the present disclosure, it is possible to increase durability with respect to the side channel attack such as a cache attack or a cross-virtual machine attack. Further, regarding the speed-up of the cryptographic process in the software in the cloud computing process, the cryptographic process can be completed with the smaller number of cycles, and this results in a decrease of power consumption of the cloud or a data center.

In addition, in the system according to one example of the present disclosure, it is not necessary to introduce dedicated hardware for the cryptographic process to the cloud or the data center, and therefore scalability is improved.

Further, it is possible to use the lightweight cryptogram in the cloud which was difficult to be used in the related art, and thus installation of the lightweight cryptogram in the sensor is promoted and it is possible to realize a sensor network at low cost and low power consumption.

BRIEF DESCRIPTION OF DRAWINGS

FIG. 3 is a diagram illustrating one example of a process executed in a server configuring a system shown in FIG. 1 and FIG. 2 to which process of the present disclosure is applicable.

FIG. 10 is a diagram showing one example of register storage data of a key scheduling process.

FIG. 14 is a diagram showing register storage data and a process example of a key scheduling process.

FIG. 15 is a diagram showing register storage data and a process example of a key scheduling process.

FIG. 16 is a diagram showing register storage data and a process example of a key scheduling process.

FIG. 17 is a diagram illustrating a logical command example of a nonlinear conversion process (Sbox) of a key scheduling process.

FIG. 18 is a diagram showing register storage data and a process example of a key scheduling process.

FIG. 19 is a diagram showing register storage data and a process example of a key scheduling process.

FIG. 22 is a diagram showing register storage data and a process example of a key scheduling process.

FIG. 23 is a diagram showing register storage data and a process example of a key scheduling process.

FIG. 24 is a diagram showing register storage data and a process example of a key scheduling process.

FIG. 30 is a diagram showing register storage data and a process example of a pre-calculation process of a nonlinear conversion process (Sbox).

FIG. 47 is a diagram showing register storage data and a process example of a round key generation updating process.

FIG. 50 is a diagram showing register storage data and a process example of a round key generation updating process.

FIG. 53 is a diagram showing register storage data and a process example of a round key generation updating process.

FIG. 60 is a diagram illustrating a data process example at the time of executing a cryptographic process.

FIG. 62 is a diagram illustrating register storage data and a process example at the time of executing a linear conversion process executed in a cryptographic process.

FIG. 63 is a diagram illustrating register storage data and a process example at the time of executing a linear conversion process executed in a cryptographic process.

FIG. 67 is a diagram illustrating register storage data and a process example at the time of executing a linear conversion process executed in a cryptographic process.

FIG. 70 is a diagram illustrating register storage data and a process example at the time of executing a linear conversion process executed in a cryptographic process.

FIG. 71 is a diagram showing an apparatus configuration example for executing a cryptographic process.

DESCRIPTION OF EMBODIMENTS

Figure 1:
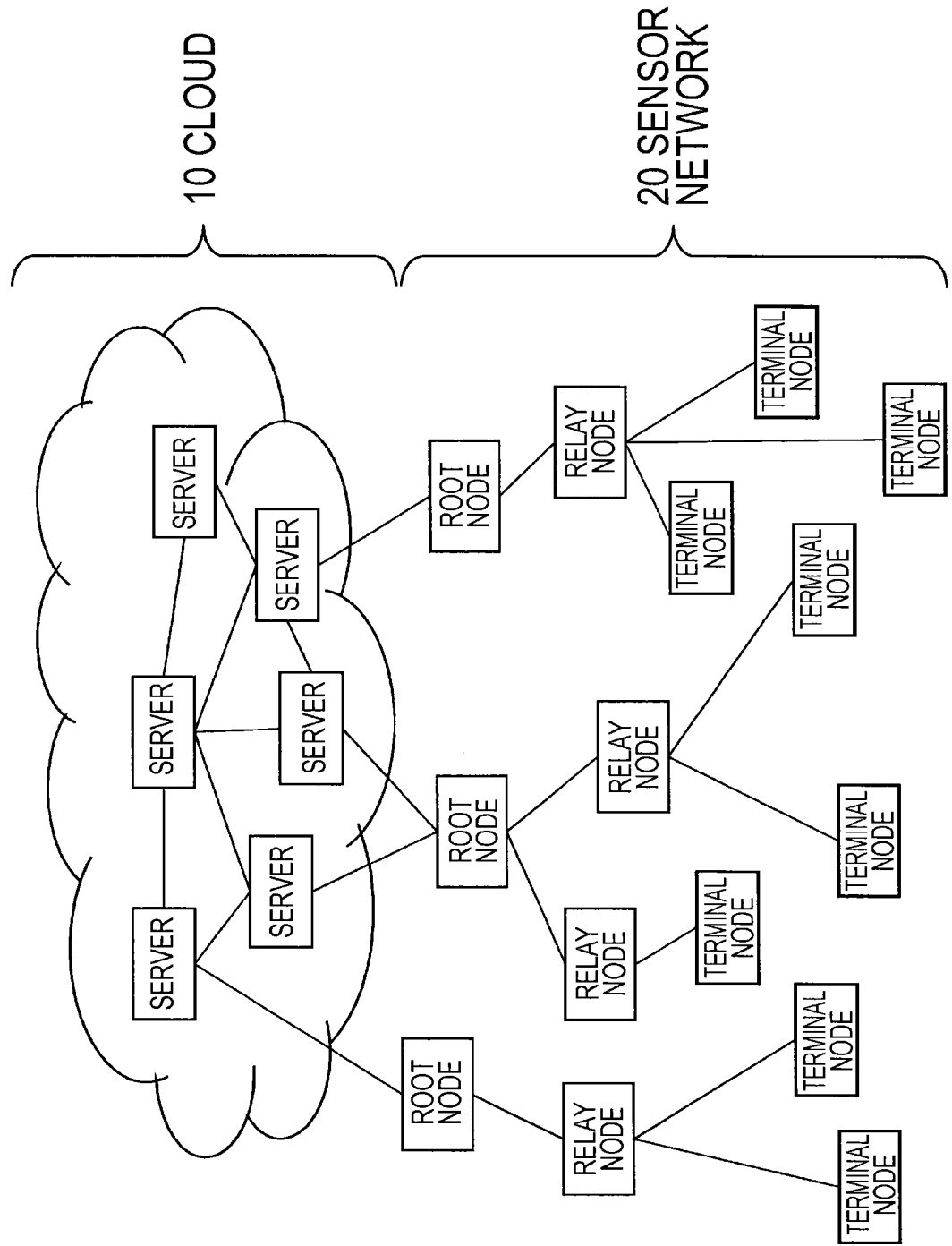
FIG. 1 is a diagram illustrating one example of a system to which a process of the present disclosure is applicable.

Hereinafter, an information processing apparatus, an information processing method, and a program according to the present disclosure will be described in detail with reference to the drawings. The description will be performed according to the following order.

1. One Example of System to which Configuration of Present Disclosure is Applicable
2. Lightweight Block Cryptographic Algorithm "PRESENT"
3. Configuration of Information Processing Apparatus (Cryptographic processing Apparatus) and Outline of Process Sequence
4. Key Conversion Process and Data Conversion Process
5. Key Scheduling Process (Key Scheduling Process Example 1)
6. Key Scheduling Process (Key Scheduling Process Example 2)
 6-1. Pre-Calculation Process of Nonlinear Conversion (Sbox)
 6-2. Generation and Updating Process of Round Key
7. Cryptographic process
8. Configuration Example of Information Processing Apparatus and Cryptographic processing Apparatus
9. Summary of Configurations of Present Disclosure

[1. One Example of System to which Configuration of Present Disclosure is Applicable]

For example, a configuration of collecting information from communication terminals such as mobile phones or smart phones owned by individuals, RFIDs installed in various products, or sensors disposed in houses, to perform a process in a server is assumed.

Small-sized hardware for executing a cryptographic process algorithm can be installed in a plurality of apparatuses on an information transmission side, to rapidly generate and transmit encrypted data.

However, it is necessary for a server to receive mass encrypted data transmitted by a plurality of terminals or sensors and perform a decryption process. In addition, a case in which a server has to generate a plurality of encrypted data items to be transmitted to the plurality of terminals, is also assumed.

It is expected that necessity of collection, analysis, and usage of big data having massive quantities and covering a wide range, gradually increases in the future.

It is considered that usage of cloud computing is effective in a process of such massive data. For example, by using cloud computing in analysis of mass encrypted data collected from the plurality of terminals or sensors, software operable in a general-purpose processor of a server on a network is used to perform a cryptographic process (including both encryption and decryption processes).

The most important point is to install the hardware in the RFID or the sensor at low cost and low power consumption and the best option is to perform the encryption process with a lightweight cryptogram, but as described above, the process of the lightweight cryptogram is slowly performed in general software installation to be operated in a general-purpose processor of a server on the cloud.

Cloud computing is advantageous when performing a process using a plurality of information processing apparatuses connected to the network, but it is disadvantageous from a viewpoint of cost, when aiming to speed-up the process by installing hardware for executing a specific cryptographic process algorithm on all apparatuses connected to the network.

In a case of collecting mass encrypted data to upload the data to a server having a cloud configuration, and performing analysis thereof with the cloud, it is desirable to perform a scale-out method of using software (program) executable on a plurality of inexpensive servers to perform a process.

As described above, for example, in a case of performing the cryptographic process using a technology of cloud computing or the like, it is necessary to perform the cryptographic process (encryption process and decryption process) using the software (program). However, as described above, there is a problem of a decrease in a process speed of the cryptographic process according to the software in the lightweight cryptography, and a method of realizing an increase in the process speed is required.

There are various cryptographic algorithms, and there is an algorithm called a block cryptogram as one example of a basic technology. In the general software installation of the block cryptogram, Sbox for performing a nonlinear conversion process is mounted with table reference, and accordingly there is a threat of a cache attack. The cache attack is one of side-channel attacks, and is a timing attack for extracting a cryptographic key using a difference in memory access time due to presence or absence of a cache hit.

The configurations of the present disclosure are to solve such problems, for example. An example of a system to which the configurations of the present disclosure are applicable will be described with reference to FIG. 1 and the subsequent drawings.

As the system to which the configurations of the present disclosure are applicable, there is a network system shown in FIG. 1, for example.

FIG. 1 shows a sensor network 20 in which a plurality of terminal nodes are connected to each other, and a cloud 10 which is configured with a network connection server group for collecting transmission data of the terminal nodes to perform a data process.

The terminal nodes include, for example, a portable terminal such as a PC, a mobile phone, a smart phone, or a tablet terminal owned by a user, a power consumption detection sensor disposed in a house or an office, a sensor or a health care device which is disposed in a house of an aged person living alone to collect safety and health management information, a terminal or a sensor provided on a road or in a car to be used for traffic congestion detection and alleviation, or various other devices.

In addition, hereinafter, various devices configuring the terminal nodes will be collectively described as a sensor. The sensor includes various devices described above.

The sensor configuring the terminal node transmits various information items to the cloud 10 configured with the network connection server group for performing the data process.

In addition, in many cases, the transmission data is provided to the network connection server configuring the cloud 10 through relay nodes or the like, for example.

The data collected by such a system includes, for example, individual's private or confidential information in many cases, and the data is encrypted and transmitted in order to prevent data leakage.

The sensor executes encryption of the transmission data and transmits the encrypted data. Dedicated hardware for executing a lightweight cryptographic algorithm, for example, is installed in the sensor, and the sensor performs the encryption using this. As a cryptographic key for this encryption, an individual cryptographic key retained by each sensor in a memory, or a key which can be extracted from a sensor ID with a predetermined operation, for example, is used.

Figure 2:
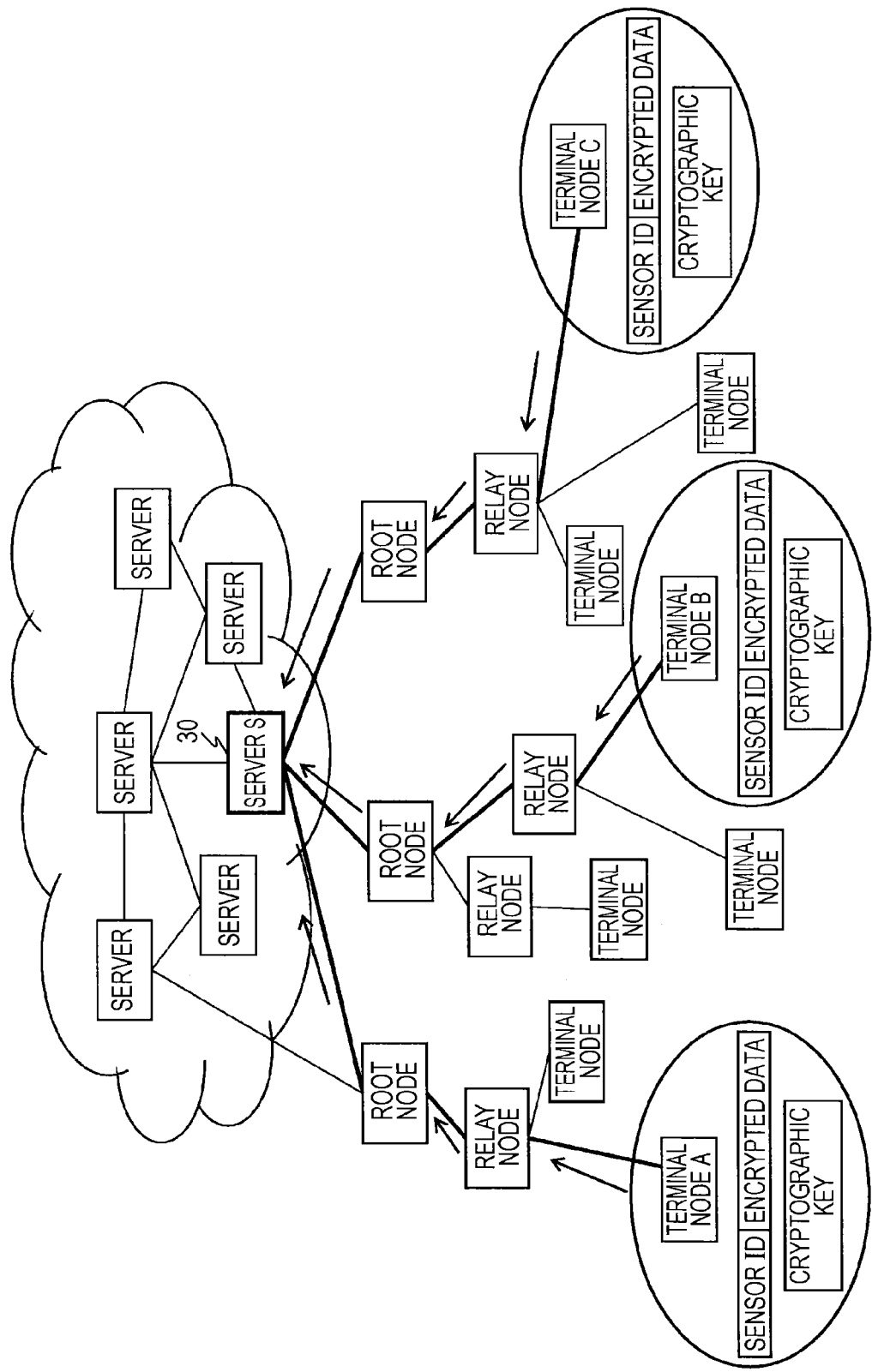
FIG. 2 is a diagram illustrating an operation example of a system to which a process of the present disclosure is applicable.

The number of sensors is huge, and as shown in FIG. 2, each sensor applies a sensor ID to the encrypted data and transmits the encrypted data to the cloud.

In an example shown in FIG. 2, terminal nodes A, B, and C are shown as representative examples of data transmission nodes. Each node executes the encryption of the transmission data using the cryptographic key which is a unique node key to generate a block (for example, 64 bits) configured with the encrypted data, applies a sensor ID which is an identifier of each sensor (terminal node) to the generated encrypted data, and transmits the encrypted data.

Mass encrypted data is transmitted also from the plurality of sensors other than the sensors A to C shown as the representative examples, to the server on the cloud, for example, a server S 30 shown in FIG. 2.

In addition, in examples which will be described later, a data length of the encrypted data generated by each sensor is described as one block of a block length of a lightweight block cryptographic algorithm used for the encryption process. One block is, for example, data having unique bits such as 64 bits. Each sensor generates an encrypted block having 64 bits by performing the encryption process using the unique sensor key (for example, 80 bits) and transmits the encrypted block.

The data of the encrypted data generated by each sensor is not limited to one block, and may be the plurality of blocks. Each sensor transmits data with clear relationship between each encrypted data item and the sensor ID. In addition, in a case where data order information of each block is necessary, for example, serial numbers or time stamps showing the data order are included in the data, and those are applied to the data as block attribute information and transmitted.

Further, in a case where the sensor network is, for example, managed as a tree structure, the transmission data from the sensor which is the terminal node is transmitted to the relay node from the sensor, and then to a root node which is set as a host node of the relay node, and is transmitted to the server on the cloud from the root node.

(Outline of Process in Server on Cloud)

Next, an outline of a process executed by the server on the cloud which collects the transmission data of the sensor (terminal node) to perform the process, in the network system described with reference to FIG. 1 and FIG. 2, will be described.

The server on the cloud collects the plurality of encrypted data blocks transmitted from the plurality of sensors (terminal nodes) and executes the cryptographic process using software (program) which can be operated on a general-purpose processor. For example, the server executes a process of decrypting the plurality of encrypted data. Alternatively, the sensor performs a generation process or the like of the plurality of encrypted data to be transmitted to each terminal node.

The server executes a bit slice cryptographic process, as the cryptographic process (including encryption and decryption processes) using the software (program).

In addition, in the following description, the "cryptographic process" includes both the encryption process and the decryption process of the data.

The bit slice cryptographic process (including encryption and decryption processes) is a process proposed by Biham in 1997, and this shows that a cryptographic algorithm of a certain class is more rapidly installed by bit slice installation, than the software installation of the related art.

The bit slice cryptographic process is, for example, specifically disclosed in NPL 2 "Eli Biham, "A Fast New DES Implementation in Software", FSE'97, 1997". In the most basic bit slice installation, the process is performed by cutting out data from heads of the plurality of data blocks which are cryptographic process targets, in a bit unit, and setting a new block configured with an assembly of data items (bit slice expression data block) having the same orders of bits or bits at every n bits which are cut out from each data block, and herein n is a power of 2 such as 2, 4, 8, 16, 64, 128, or the like.

For example, a bit slice decryption process example in a case of collectively decrypting each encrypted data item transmitted by each sensor will be described with reference to FIG. 3.

FIG. 3 shows diagrams illustrating (A) retention data and (B) a cryptographic process sequence (decryption) of the server S 30 shown in FIG. 2.

A cryptographic key 31 in the retention data of the server shown in FIG. 3(A) is data previously retained in the server S 30, as a unique key of each sensor (terminal node).

Each data of a sensor ID 32 and encrypted data 33 is data received from each sensor through the network.

The cryptographic key applied to the encryption process of each encrypted data item can be selected based on the sensor ID.

FIG. 3(B) is a diagram illustrating a process executed in a cryptographic processing unit 50 of the server S 30. In addition, the cryptographic processing unit 50 shown in the drawing is a data processing unit configured with a CPU or the like having a program execution function, and executes the cryptographic process (encryption and decryption processes) by performing a data process according to a program defining a sequence of a predetermined cryptographic algorithm. That is, the cryptographic processing unit executes the cryptographic process using the software (program).

FIG. 3(B) shows a process example of a case of performing the decryption process of the encrypted data received from each sensor through the network.

The server, first selects each cryptographic key 31 used for the decryption, using the sensor ID 32 added to the encrypted data 33. The server on the cloud retains the cryptographic key used in each server as management data associated with the sensor ID. Alternatively, the unique cryptographic key of each sensor may be extracted from each sensor ID with a predetermined operation.

In the server, as shown in FIG. 3(B), the cryptographic keys 31 of each sensor are arranged in the order corresponding to each block of the encrypted data 33 generated by each sensor.

When the encrypted data 33 and the cryptographic keys 31 having the predetermined block number which is previously defined as a processing unit of the bit slice cryptographic process are assembled, a data decryption process according to the bit slice cryptographic process is performed.

As described above, in the bit slice cryptographic process, the process is performed by cutting out data from heads of each block which is the cryptographic process target, in a bit unit, and setting an assembly of data items (bit slice expression data block) having the same orders of bits or bits at every n bits of each block, and herein n is a power of 2 such as 2, 4, 8, 16, 64, 128, or the like.

First, the server generates the plurality of bit slice expression data blocks such as a block in which only data items of the order of 1 bit are assembled (bit slice expression data block), a block in which only data items of the order of 2 bit are assembled (bit slice expression data block), and blocks in which only data at the same bit position to the subsequent final bit (bit slice expression data block), from a plurality of encrypted data blocks configuring the encrypted data 33 received from the plurality of sensors.

By doing so, the server generates the plurality of bit slice expression data blocks from the plurality of encrypted data blocks configuring the encrypted data 33.

In addition, the same process is performed also for the cryptographic key 31 used for generation of the encrypted data 33, that is to say, a plurality of bit slice expression key blocks corresponding to a plurality of key data items are generated.

Further, each of the cryptographic key 31 is a cryptographic key block configured with key data of 80 bits, for example, and regarding the cryptographic key 31, an assembly of data (bit slice expression key block) having the same orders of bits or bits at every n bits of each cryptographic key block, is set, and herein n is a power of 2 such as 2, 4, 8, 16, 64, 128, or the like.

This block conversion process is a process executed as a key conversion process (Key Conversion) in Step S11 and a data conversion process (Data Conversion) in Step S21 shown in the cryptographic processing unit 50 shown in FIG. 3(B).

The process using the bit slice expression block generated by the bit slice process as a processing unit is executed, and the process according to the predetermined cryptographic algorithm is executed.

In the apparatus of the present disclosure, an operation (AND, OR, XOR, or the like) using the bit slice expression block as a processing unit, a shifting process of register storage data, or a transposition process of a bit position such as shuffling, is executed as an application process of the software (program) to perform the process according to the predetermined cryptographic algorithm.

A round key is generated by performing a key scheduling process (Key Scheduling) in Step S12, with respect to the bit slice key data based on the plurality of cryptographic keys 31 generated by the key conversion process (Key Conversion) in Step S11 in the cryptographic processing unit 50.

Meanwhile, in the data conversion process (Data Conversion) in Step S21, a bit slice encrypted data block is generated by the bit slice process with respect to the plurality of encrypted data items 33 received from the sensor. This bit slice block is set as a processing target of the cryptographic process (encryption process or decryption process) in a cryptographic process (Data Processing) step in subsequent Step S22.

In the cryptographic process (Data Processing) in Step S22, the cryptographic process using the round key, herein the decryption process of the encrypted data is executed with respect to the bit slice expression data block generated based on the encrypted data in the data conversion process (Data Conversion) in Step S21.

In this cryptographic process step, for example, the process according to the predetermined cryptographic algorithm such as an addition (XOR) process with the round key, a linear conversion process, or a nonlinear conversion process, is executed according to the software (program).

In addition, in a key scheduling process (Key Scheduling) in Step S12, a round key used in each round of this round operation is generated.

In subsequent Step S23, a reverse data conversion process (Data Conversion$^{-1}$) is executed with respect to a block group obtained as a result of the cryptographic process (Data Processing) in Step S22. With this process, a process of returning the bit-sliced block to the original block is performed. With this process, plain text data 70 corresponding to the encrypted data 33 transmitted from the sensor is generated.

Figure 4:
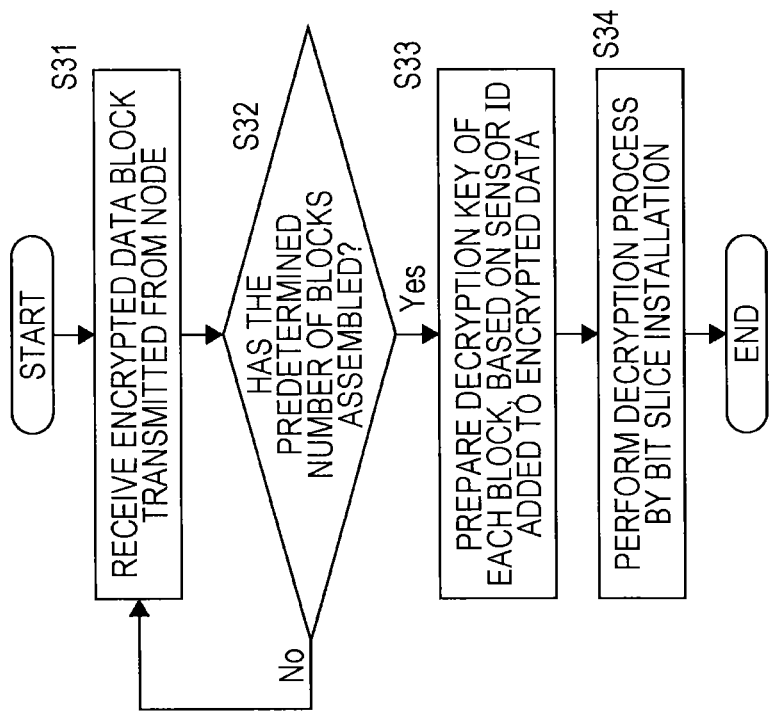
FIG. 4 is a diagram illustrating a sequence example of a process executed in a server configuring a system shown in FIG. 1 and FIG. 2 to which process of the present disclosure is applicable.
Figure 5:
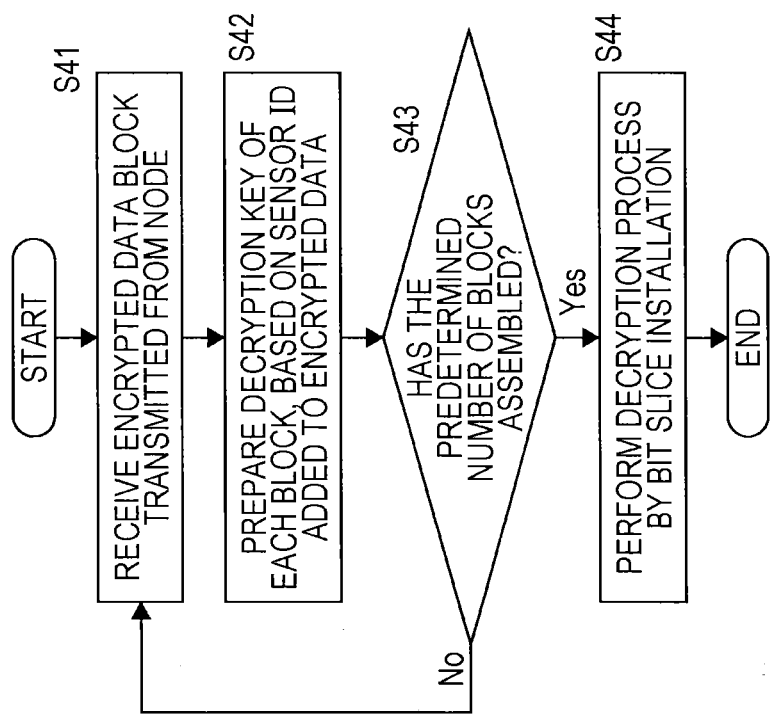
FIG. 5 is a diagram illustrating a sequence example of a process executed in a server configuring a system shown in FIG. 1 and FIG. 2 to which process of the present disclosure is applicable.

FIG. 4 and FIG. 5 show two sequence examples of the process executed in the server.

A flowchart shown in FIG. 4 is a flowchart illustrating a sequence of a case of performing a step of preparing a decryption key of each block based on the sensor ID added to the encrypted data after assembling the encrypted data items having the predetermined number of blocks.

The flowchart shown in FIG. 5 is a flowchart illustrating a sequence of a case of performing a step of preparing a decryption key of each block based on the sensor ID added to the encrypted data each time when each cryptographic text data block arrives.

First, a process of each step of the flow shown in FIG. 4 will be described.

First, in Step S31, the encrypted data block transmitted from the node is received. This is combined data of the sensor ID 32 and the encrypted data 33 shown in FIG. 3(A).

Next, in Step S32, it is determined whether or not the encrypted data having the predetermined block number previously defined as a processing unit is received. In a case where the number thereof does not reach the predetermined block number, the process returns to Step S31 and the reception process is continued.

In a case where the number thereof has reached the predetermined block number, the process proceeds to Step S33, and the cryptographic key (=decryption key) of each encrypted data item is selected using the sensor ID added to the encrypted data.

Finally, in Step S34, a corresponding set of the encrypted data and the cryptographic key is input to the cryptographic processing unit 50 to execute the decryption process according to the bit slice cryptographic process.

The flow shown in FIG. 5 is a sequence of executing a process each time of arrival of the cryptographic text data block.

First, in Step S41, the encrypted data block transmitted from the node is received. This is combined data of the sensor ID 32 and the encrypted data 33 shown in FIG. 3(A).

Next, in Step S42, the cryptographic key (=decryption key) of each encrypted data item is selected using the sensor ID added to the encrypted data.

Next, in Step S43, it is determined whether or not the encrypted data having the predetermined block number previously defined as a processing unit is received. In a case where the number thereof does not reach the predetermined block number, the process returns to Step S41 and the reception process is continued.

In a case where the number thereof has reached the predetermined block number, the process proceeds to Step S44, and a corresponding set of the encrypted data and the cryptographic key is input to the cryptographic processing unit 50 to execute the decryption process according to the bit slice cryptographic process.

In addition, in the process example described above, the example of receiving the plurality of encrypted data items from the sensor and performing the decryption process in the server has been described, but for example, in a case of generating the encrypted data to be transmitted to the plurality of user terminals or the like, the server generates the plurality of encrypted data items by applying the bit slice cryptographic process with respect to the plurality of plain text data items. This encryption process is also executed by using the configuration of the cryptographic processing unit 50 shown in FIG. 3.

In a case of performing the encryption process, the plurality of blocks formed of the plain text data and the cryptographic key corresponding to each plain text data are input to execute the process, and the plurality of encrypted data items are generated.

For example, the cryptographic key corresponding to each plain text data item is selectively acquired from a storage unit based on a device ID of a transmission destination to which the encrypted data is transmitted, and a bit slice expression key is generated by the bit slice process with respect to the cryptographic key selectively acquired from the storage unit.

In addition, the encryption process is executed according to the process sequence shown in the cryptographic processing unit 50 shown in FIG. 3(B) by using the bit slice expression data block based on the plain text data and the bit slice expression key block based on the cryptographic key, and the encrypted data is generated and output.

The bit slice cryptographic process executed by the cryptographic processing unit 50 is executed as a process using the software (program) operable on a general-purpose processor, as described above. That is, in a device such as a PC which does not have a dedicated hardware configuration for a specific cryptographic algorithm, the process is performed by executing the software (program) defining an execution sequence of the cryptographic process algorithm which will be described later.

The process executed according to the software (program) includes, for example, an operation (AND, OR, XOR, or the like) between block data items using the bit slice expression block data stored in the register, a shifting process of the data stored in the register, a movement and transposition process of the bit position such as shuffling, or the like.

In a case of performing the cryptographic process according to the software (program) by a processor including a 64-bit register, for example, the cryptographic process can be executed as a single instruction multiple data stream (SIMD) type parallel process of processing 64 blocks in parallel with each other. In a basic bit slice installation method, the parallel process can be performed for a bit width of the processor. Transposition of the bit position frequently used in the cryptographic algorithm can be realized by a renaming process of the register at zero cost and therefore speed-up of the process is realized.

In addition, the number of blocks which can be subjected to the parallel process in the bit slice cryptographic process varies depending on the cryptographic algorithm or the bit slice installation algorithm, processor architecture, or a size of the register used, and for example, 8, 16, 32, 64, 128, or the like can be set as the number parallel process block.

In addition, in the bit slice cryptographic process, since the cryptographic text block subjected to the parallel process is independent from each other, the block received from the plurality of sensors may be mixed or the blocks may be arranged in any order regardless of the received order, as long as the block is associated with the key data block. A function of performing the decryption process regardless of the order of encrypted sensing data received from the plurality of sensors in asynchronous manner, is also an advantage of this system which uses the bit slice cryptographic process.

In this bit slice type cryptographic process, there is a nonlinear conversion process (Sbox) as one element which is a major influencing factor to the process speed. It is important point to express this nonlinear conversion process with a small logical operation (command) to realize the speed-up of the process.

In addition, since the processor in recent years simultaneously issues the plurality of commands, the speed-up of the process can be realized, if a restriction of dependency of the register is reduced and the command is expressed by a command system which can be executed with the small cycle number as possible.

[2. Lightweight Block Cryptographic Algorithm "Present"]

Next, a lightweight block cryptographic algorithm "PRESENT" which is one example of the cryptographic process algorithm executed in the present disclosure will be described.

In the apparatus of the present disclosure, as the cryptographic process using the bit slice, for example, "PRESENT" which is a lightweight block cryptographic algorithm corresponding to a block size of 64 bits, and key lengths of 80 bits and 128 bits, is executed.

An outline of a cryptographic process sequence according to the lightweight block cryptographic algorithm "PRESENT" will be described with reference to FIG. 6.

Figure 6:
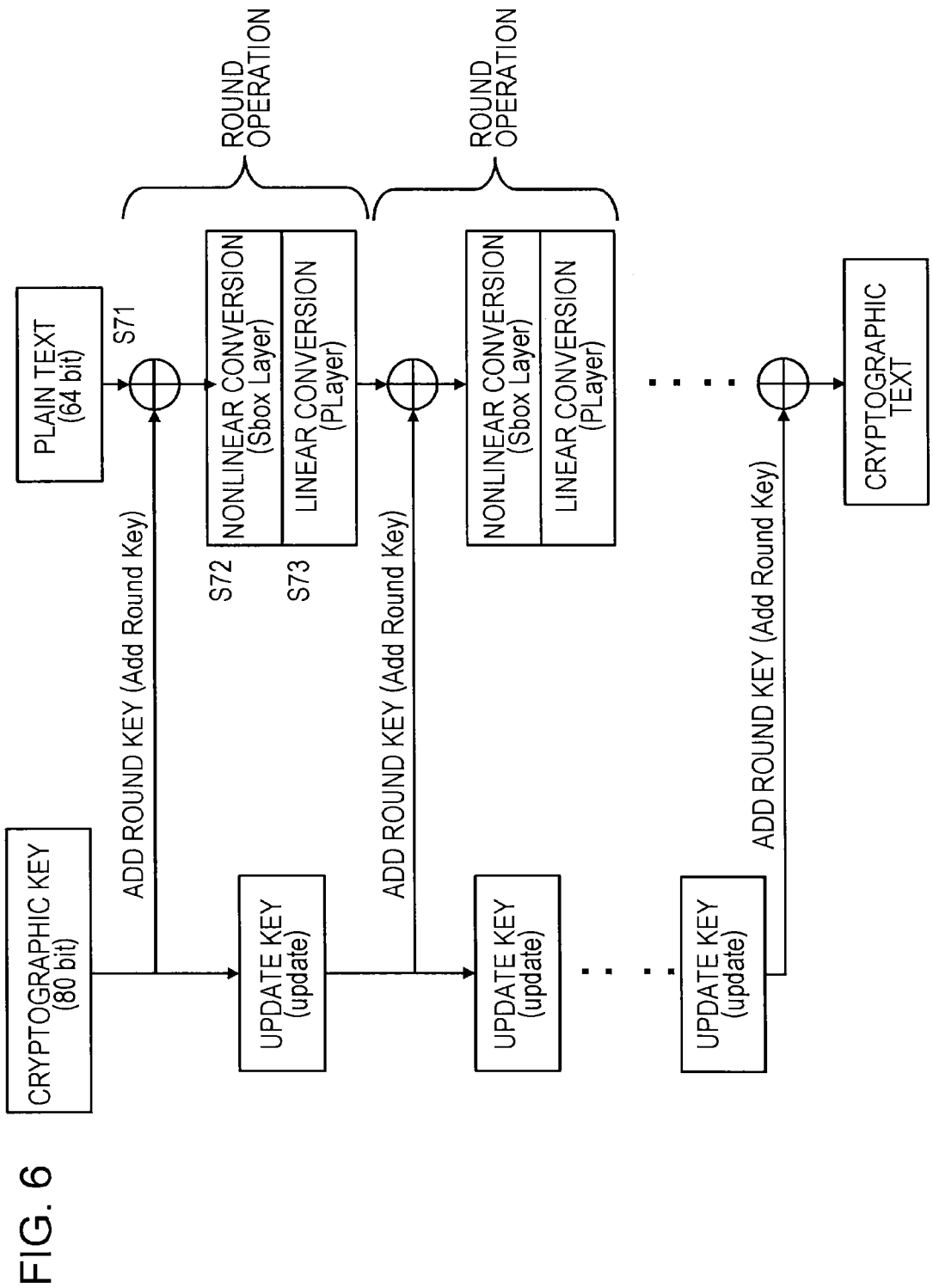
FIG. 6 is a diagram illustrating a process sequence of a cryptographic process algorithm PRESENT.

As shown in FIG. 6, in the lightweight block cryptographic algorithm "PRESENT", a plain text block having 64 bits and a cryptographic key having 80 bits, for example, are input.

First, a round key having 64 bits is generated based on the cryptographic key having 80 bits and the following process is performed.

(Step S71) An addition process (exclusive-OR operation: XOR) of the plain text block having 64 bits and the round key having 64 bits is executed.

(Step S72) In addition, a nonlinear conversion process (SboxLayer) with respect to the added result is executed.

(Step S73) Further, a linear conversion process (pLayer) is performed with respect to the nonlinear conversion result.

The processes in Steps S71 to S73, that is, the addition process with the round key, the nonlinear conversion process, and the linear conversion process are set as a round operation of 1 unit, and this round operation is repeatedly executed. For example, 31 rounds are repeatedly executed, and after the final round, the operation with the round key is executed again to generate and output the cryptographic text.

In addition, an updating process (Update) based on the input key data is sequentially executed, and a generation process of the round key (64 bits) used in each round is performed.

The information processing apparatus of the present disclosure, for example, executes the cryptographic process according to the lightweight block cryptographic algorithm "PRESENT" shown in FIG. 6, according to the software (program), by using the bit slice expression data block generated by the bit slice process as a processing unit. In detail, the cryptographic process according to the software (program) defining the process such as the inter-block operation (AND, OR, XOR, or the like), the shifting process of the register storage data, or the transposition process of the bit position, is realized.

[3. Configuration of Information Processing Apparatus (Cryptographic Processing Apparatus) and Outline of Process Sequence]

A configuration of the information processing apparatus (cryptographic processing apparatus) for executing the cryptographic process according to "PRESENT" of the present disclosure and a Process Sequence will be described with reference to FIG. 7.

Figure 7:
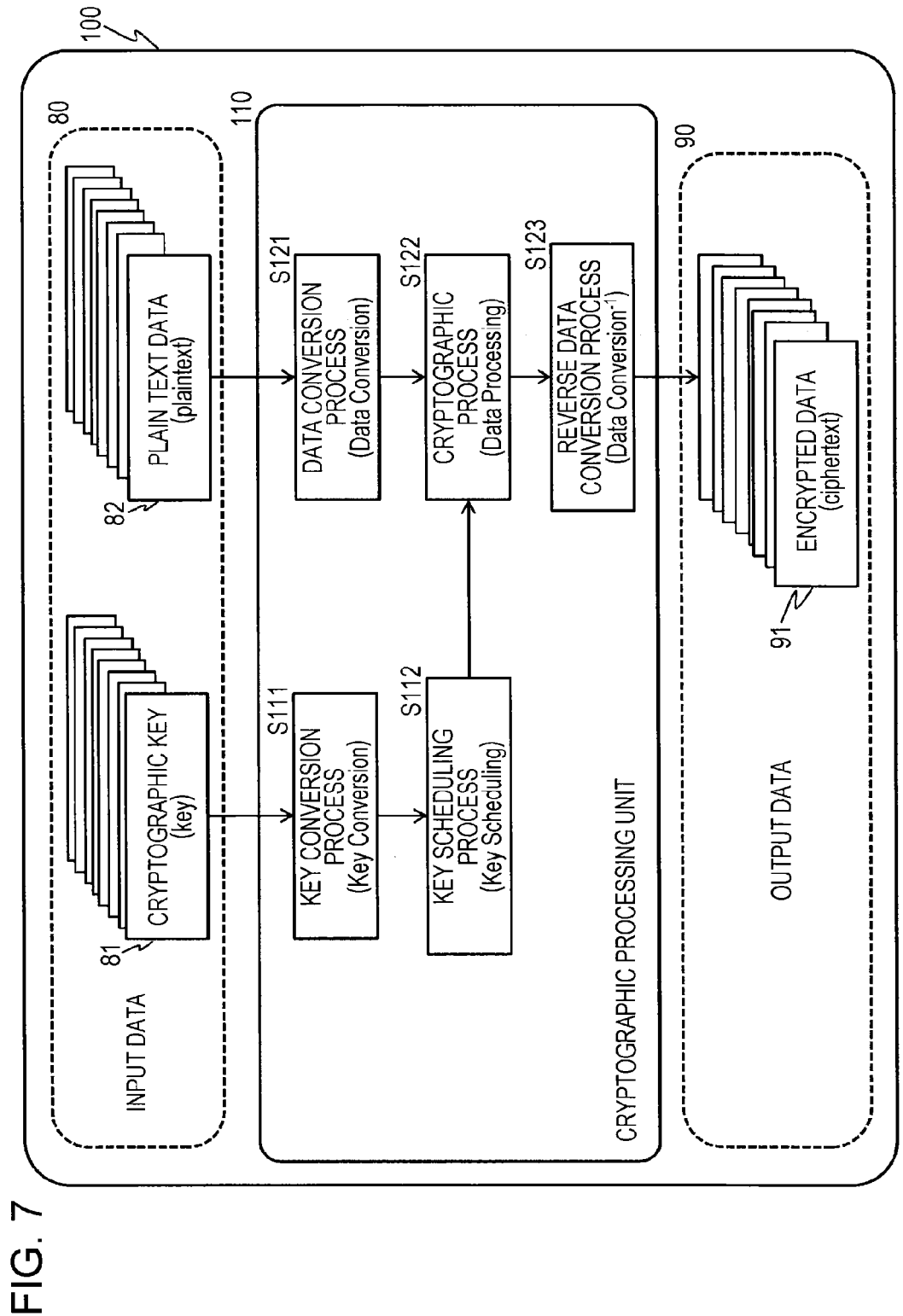
FIG. 7 is a diagram illustrating a process sequence of a cryptographic process of the present disclosure.

FIG. 7 is a diagram illustrating a configuration and a process of an information processing apparatus 100.

The information processing apparatus 100 can be configured with a PC or the like, for example, and can be configured as an apparatus which does not include dedicated hardware for executing the cryptographic process according to a specific algorithm as an essential configuration.

The information processing apparatus stores the software (program) for executing the cryptographic process in a memory and executes the process according to the program to perform the cryptographic process.

A cryptographic processing unit 110 of the information processing apparatus 100 shown in FIG. 7 is configured with, for example, a data processing unit configured with a CPU or the like having a program execution function, and a memory (RAM, ROM, a register, or the like) which stores data, various parameters, and programs, and the data processing unit (CPU or the like) executes processes in Steps S111 to S112 and Steps S121 to S123 shown in the drawing, according to the program, to perform the cryptographic process.

In addition, hereinafter, an encryption process example of inputting plain text data 82 and a cryptographic key 81 as input data 80, and generating and outputting encrypted data 91 as output data 90 will be described.

Further, as described above, the cryptographic processing unit 110 performs the cryptographic process according to the processes in Steps S111 and S112 and Steps S121 to S123 shown in the drawing, both in an encryption process of encrypting the plain text data to generate the encrypted data and in a decryption process of decrypting the encrypted data to generate the plain text data.

Hereinafter, an example of a case of performing the encryption process will be described as a representative example of the encryption process and the decryption process.

The input data 80 is the plurality of cryptographic keys 81 and the plurality of plain text data items 82.

The cryptographic keys and the plain text data items are associated in a one-to-one manner. That is, plain text data a encrypted by a cryptographic key a, plain text data b encrypted by a cryptographic key b, plain text data c encrypted by a cryptographic key c, . . . , and plain text data N encrypted by a cryptographic key N. The cryptographic processing unit 110 inputs N cryptographic keys and plain text data items as a processing unit, and executes the cryptographic process.

In addition, each of the plain text data items a, b, and c is configured with a data block (for example, 64 bits) having a predetermined data length.

In the same manner as described above, each of the cryptographic keys a, b, and c is also configured with a key data block (for example, 80 bits) having a predetermined data length.

In addition, the bit size is one example, and various bit sizes can be set for the data or the key.

The encrypted data 91 generated as the output data 90 is the following data, such as encrypted data a encrypted by the cryptographic key a, encrypted data b encrypted by the cryptographic key b, encrypted data c encrypted by the cryptographic key c, . . . , and encrypted data N encrypted by the cryptographic key N. The cryptographic processing unit 110 generates and outputs N encrypted data items.

For example, N encrypted data items are individually transmitted to N sensors (terminal nodes) through the network shown in FIG. 1 or FIG. 2, and the decryption process is executed in each sensor. In addition, the key used for the encryption and the key used for he decryption process can be set in the same manner, and the cryptographic key shown in FIG. 7 as the input data is configured as a unique sensor key retained in each sensor, for example.

Processes executed by the cryptographic processing unit 110 shown in FIG. 7 are the following processes, such as Step S111: the key conversion process, Step S112: the key scheduling process, Step S121: the data conversion process, Step S122: the cryptographic process, and Step S123: the reverse data conversion process.

The cryptographic processing unit 110 realizes the cryptographic process according to the lightweight block cryptographic algorithm "PRESENT" using the bit slice cryptographic process, by executing the steps described above.

First, the outline of each process and the flow of all processes will be briefly described, and then each process will be described in detail.

The key conversion process in Step S111 is a process of generating bit slice expression key data configured with the bit slice expression block which is an assembly of the data having the same orders of bits or bits at every n bits of the cryptographic keys 81, that is, the plurality of cryptographic key blocks formed of key data having 80 bits, for example, and herein n is a power of 2 such as 2, 4, 8, 16, 64, 128, or the like.

The data conversion process in Step S121 is a process of generating bit slice expression plain text data configured with the bit slice expression block which is an assembly of the data having the same orders of bits or bits at every n bits of the plain text data items 82, that is, the plurality of data blocks formed of plain text data having 64 bits, for example, and herein n is a power of 2 such as 2, 4, 8, 16, 64, 128, or the like.

The key scheduling process (Key Scheduling) in Step S112 is a process of generating the plurality of round keys to be used in the cryptographic process, by using the bit slice expression key data generated in the key conversion process (Key Conversion) in Step S111.

The cryptographic process (Data Processing) in Step S122 is a step of executing the cryptographic process using the round key, with respect to the bit slice expression data generated based on the plain text data in the data conversion process (Data Conversion) in Step S111.

The process according to the cryptographic algorithm such as the addition (XOR) process with the round key, the linear conversion process, or the nonlinear conversion process using the block configuring the bit slice expression data generated by the bit slice process as a unit, is executed according to the software (program).

In subsequent Step S123, the reverse data conversion process (Data Conversion$^{-1}$) is executed with respect to the result of the cryptographic process (Data Processing) in Step S122. This process is a process of returning the bit slice expression data to the assembly of encrypted data corresponding to the plain text data 82 before the bit slice process. With this process, the encrypted data 91 corresponding to the plain text data 82 is generated as the output data 90.

Hereinafter, the process in each step will be described in detail, in order.

[4. Key Conversion Process and Data Conversion Process]

First, the following processes of the cryptographic processing unit 110 shown in FIG. 7, that is, Step S111: the key conversion process and Step S121: the data conversion process will be described.

First, the key conversion process in Step S111 will be described with reference to FIG. 8.

The key conversion process in Step S111 is a process of generating the bit slice expression key block which is the assembly of data having the same orders of bits or bits at every n bits of the cryptographic keys 81 shown in FIG. 7 as the input data, that is, the plurality of cryptographic key blocks formed of the key data having 80 bits, for example, and herein n is a power of 2 such as 2, 4, 8, 16, 64, 128, or the like.

Figure 8:
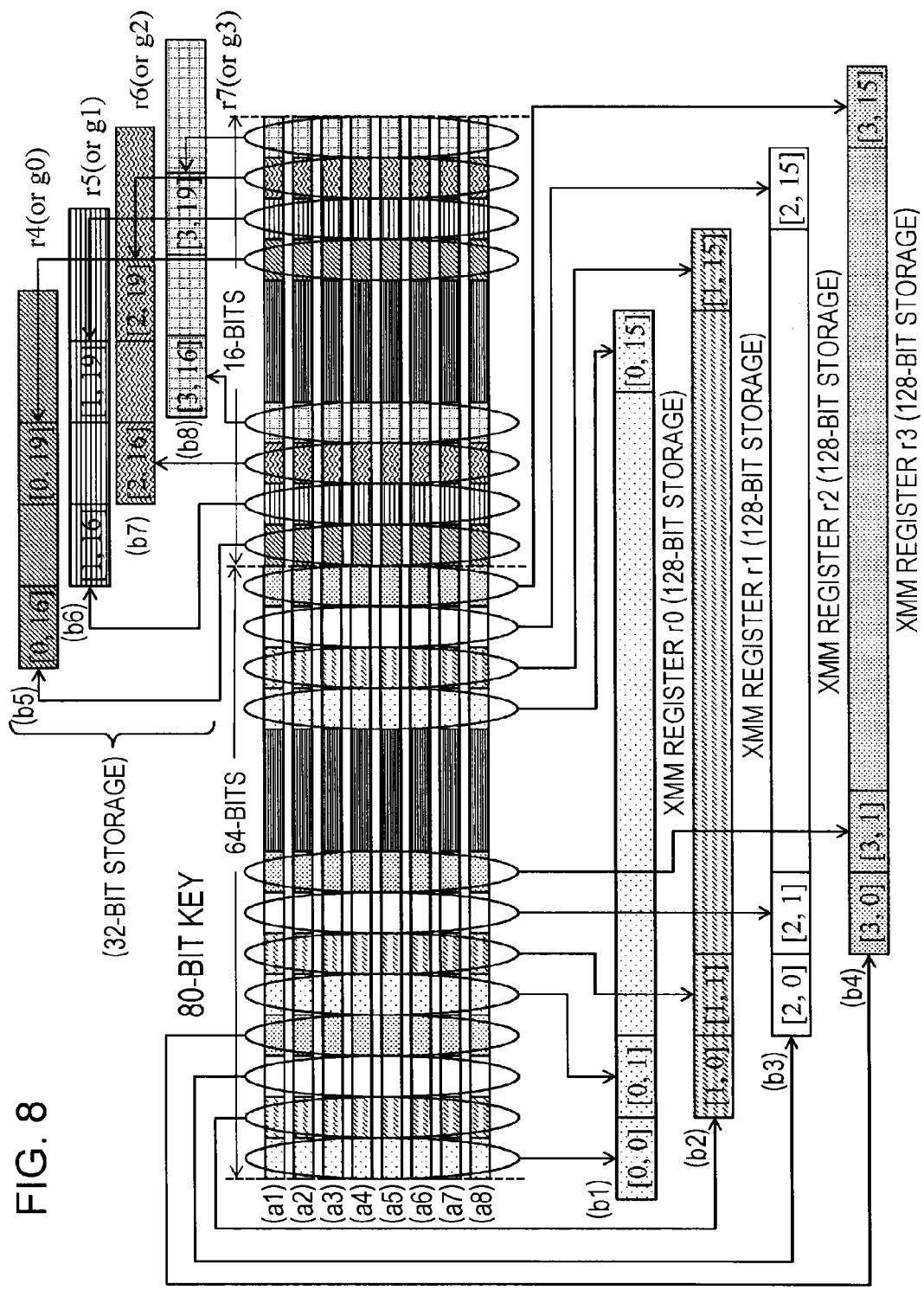
FIG. 8 is a diagram illustrating a generation process example of bit slice expression key data obtained by a key conversion process of key data.

FIG. 8 shows eight key data items (a1) to (a8) each having 80 bits, as the cryptographic keys 81 which are the input data.

In Step S111, the bit slice expression key block is generated from the eight key data items (a1) to (a8) each having 80 bits, and is stored in registers (XMM registers (r0 and the like) or general-purpose registers (g0 and the like)) configuring a memory in the information processing apparatus.

(b1) to (b8) shown in FIG. 8 are register storage data items which are the processed result of the key conversion process in Step S111, that is, storage data items of the bit slice expression key block. Herein, eight 128-bit registers are used as storage areas of the bit slice expression key block.

The cryptographic processing unit 110, for example, stores 8-bit data [0,0] in which only first bits of eight 80-bit key data items (a1) to (a8) which are input data item shown in FIG. 8 are collected, in the XMM register r0, as shown in (b1) of FIG. 8.

The 8-bit data [0,0] is an assembly formed of only first bits of eight 80-bit key data, and is one bit slice expression block.

Next, 8-bit data [1,0] in which only second bits of input data items (a1) to (a8) are collected, is stored in an XMM register r1, as shown in (b2) of FIG. 8.

Next, 8-bit data [2,0] in which only third bits of input data items (a1) to (a8) are collected, is stored in an XMM register r2, as shown in (b3) of FIG. 8.

Next, 8-bit data [3,0] in which only fourth bits of input data items (a1) to (a8) are collected, is stored in an XMM register r3, as shown in (b4) of FIG. 8.

Next, 8-bit data [0,1] in which only fifth bits of input data items (a1) to (a8) are collected, is stored in the XMM register r0, as shown in (b1) of FIG. 8.

As described above, the data is stored in the unit of eight bits in the XMM registers r0 to r3, in the unit of four bits, and the data of first 64 bits of the input data items (a1) to (a8) (8×64=512 bits) are stored in four XMM registers r0 to r3.

In addition, the data of $65^{th}$ bit and subsequent bits of the input data items (a1) to (a8) is stored in the unit of eight bits by using the general-purpose registers (g0 to g3) or the XMM registers (r4 to r7) in order.

8-bit data [0,16] in which only $65^{th}$ bits of input data items (a1) to (a8) are collected, is stored in the XMM register r4 (or general-purpose register g0), as shown in (b5) of FIG. 8.

Next, 8-bit data [1,16] in which only $66^{th}$ bits of input data items (a1) to (a8) are collected, is stored in the XMM register r5 (or general-purpose register g1), as shown in (b6) of FIG. 8.

Next, 8-bit data [1,16] in which only $67^{th}$ bits of input data items (a1) to (a8) are collected, is stored in the XMM register r6 (or general-purpose register g2), as shown in (b7) of FIG. 8.

Next, 8-bit data [1,16] in which only $68^{th}$ bits of input data items (a1) to (a8) are collected, is stored in the XMM register r7 (or general-purpose register g3), as shown in (b8) of FIG. 8.

As described above, the cryptographic processing unit 110 performs the bit slice process eight 80-bit keys and stores the keys in the plurality of registers. In detail, for example, in a case where the information processing apparatus 100 has a configuration of including eight XMM registers (r0 to r7) which are registers for Intel extension SIMD command, or four XMM registers (r0 to r3) and four general-purpose registers (g0 to g3), the bi slice data is dispersed and stored in the unit of eight bits by using the registers.

Each register storage data of each example shown in FIG. 8 is as follows.

First, fifth, ninth, . . . , and $61^{st}$ bits of eight 80-bit key data blocks (a1) to (a8) which are input data are stored in the XMM register r0, second, sixth, tenth, . . . , and $62^{nd}$ bits thereof are stored in the XMM register r1, third, seventh, eleventh, . . . , and $63^{rd}$ bits thereof are stored in the XMM register r2, and fourth, eighth, twelfth, . . . , and $64^{th}$ bits thereof are stored in the XMM register r3.

In addition, $65^{th}$, $69^{th}$, $73^{rd}$, and $77^{th}$ bits of eight 80-bit key data blocks (a1) to (a8) which are input data are stored in the XMM register r4 (or general-purpose register g0), $66^{th}$, $70^{th}$, $74^{th}$, and $78^{th}$ bits thereof are stored in the XMM register r5 (or general-purpose register g1), $67^{th}$, $71^{st}$, $75^{th}$, and $79^{th}$ bits thereof are stored in the XMM register r6 (or general-purpose register g2), and $68^{th}$, $72^{nd}$, $76^{th}$, and $80^{th}$ bits thereof are stored in the XMM register r7 (or general-purpose register g3).

As described above, 64 bits of the input data are repeatedly stored in four registers using the registers, in the unit of four bits. The $65^{th}$ bit and subsequent bits are also stored in the other four registers using the registers, in the unit of four bits.

In addition, any register storage data [i,j] shown in FIG. 8 is the bit slice expression block as the assembly of the same order of bits of eight key data items (a1) to (a8), and is 8-bit data.

Further, in [i,j] shown as an identifier of the register storage data, i is a parameter which is repeatedly set as 0, 1, 2, and 3 in the unit of four bits from the head of each input data of eight 80-bit key data blocks (a1) to (a8), and shows a variable indicating which bit is stored among the unit of four bits.

j corresponds to a parameter indicating the order of the data of the units of four bits, from the data of the unit of four bits of eight key data items (a1) to (a8).

For example, in a case where the data is divided from the head of each input data in the unit of four bits, since i is set as 0 in the first bit in the data of the unit of four bits, i is set as 1 in the second bit in the data of the unit of four bits, i is set as 2 in the third bit in the data of the unit of four bits, and i is set as 3 in the fourth bit in the data of the unit of four bits, i=2 when [i,j]=[2,1], indicates the third bit of the data of the unit of four bits.

In addition, j=1 when [i,j]=[2,1], is a parameter indicating the order of the data of the unit of four bits, from the data of the unit of four bits from the head of each input data.

j is set as 0 in the first data of the unit of four bits, j is set as 1 in the second data of the unit of four bits, and j is set as 2 in the third data of the unit of four bits.

When [i,j]=[2,1], j is 1, and therefore it is identified that the data is the second data of the unit of four bits.

As described above, in [2,1], for example, j is 1 and therefore it is identified that the data is the second data of the unit of four bits, and i is 2 and therefore it is identified that the data is the third data in the second data of the unit of four bits.

That is, it is identified that the block is configured with the assembly of data items of seventh bits from the head.

As described above, in the key conversion process in Step S111, the cryptographic processing unit 110 shown in FIG. 7 generates the bit slice expression key data formed of the bit slice expression blocks [0,0] to [3,19] and stores the bit slice expression key data in the register.

Next, the data conversion process in Step S121 will be described with reference to FIG. 9.

This data conversion process is the same conversion process of the data into the bit slice expression data as the key conversion process described with reference to FIG. 8. However, it is different therefrom on a point that the input is eight 64-bit plain text data items.

Figure 9:
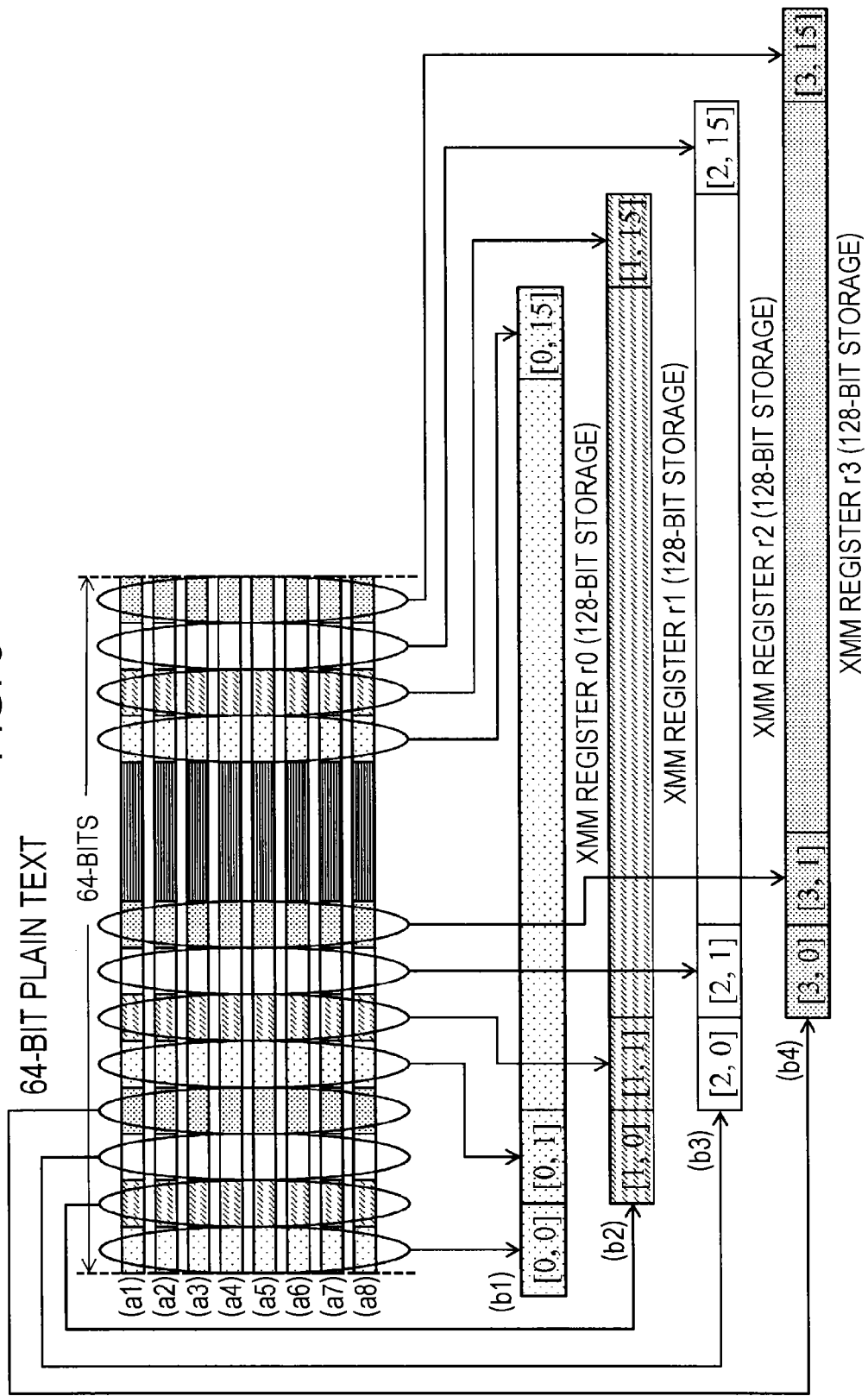
FIG. 9 is a diagram illustrating a generation process example of bit slice expression data obtained by a conversion process of data.

Each register storage data in the example shown in FIG. 9 is as follows.

First, fifth, ninth, . . . , and $61^{st}$ bits of eight 64-bit data blocks (a1) to (a8) which are input data items are stored in the XMM register r0, second, sixth, tenth, . . . , and $62^{nd}$ bits thereof are stored in the XMM register r1, third, seventh, eleventh, . . . , and $63^{rd}$ bits thereof are stored in the XMM register r2, and fourth, eighth, twelfth, . . . , and $64^{th}$ bits thereof are stored in the XMM register r3.

As described above, 64 bits of the input data are repeatedly stored in four registers using the registers, in the unit of four bits.

Any register storage data [i,j] shown in FIG. 9 is the assembly of the same orders of bits of the eight plain text data items (a1) to (a8), and is 8-bit data.

i is a parameter which is repeatedly set as 0, 1, 2, and 3 in the unit of four bits from the head of each input data of eight 64-bit plain text data items (a1) to (a8), and shows a variable indicating which bit is stored among the unit of four bits.

j is a parameter indicating the order of the data of the units of four bits, from the data of the unit of four bits of eight plain text data items (a1) to (a8).

[5. Key Scheduling Process (Key Scheduling Process Example 1)]

Next, a process in Step S112 executed by the cryptographic processing unit 110 shown in FIG. 7, that is, the key scheduling process will be described in detail.

The key scheduling process (Key Scheduling) in Step S112 is a process of generating a plurality of round keys to be used in the cryptographic process, by using the bit slice expression key blocks generated in the key conversion process (Key Conversion) in Step S111.

First, as described above with reference to FIG. 8, in Step S111, the bit slice expression key data items of eight 80-bit keys are dispersed and stored in the registers.

In Step S112, a generation process of the round keys is performed using the bit slice expression key data items stored in the registers.

The generation process of the round keys will be described in detail with reference to FIG. 10 and the subsequent drawings. In addition, FIG. 10 and the subsequent drawings illustrate the data expression [i,j] of the each register storage data shown in FIG. 8 by simplifying and rewriting to expression with the numbers from 79 to 0, as described below. [0,0]=79,

[1,0]=78, [2,0]=77, [3,0]=76, [0,1] to [3,1]=75 to 72, [0,2] to [3,2]=71 to 68, . . . , [0,14] to [3,14]=7 to 4, [0,15]=3, [1,15]=2, [2,15]=1, and [3,15]=0.

In addition, in an initial state, [0,0]=79 is 8-bit data in which first bits of eight 80-bit keys are assembled. Hereinafter, 78, 77, 76, 75, . . . , and 0 correspond to 8-bit data in which second, third, fourth, fifth, . . . , and final ($80^{th}$) bits of eight 80-bit keys are assembled.

The register storage data of the bit slice expression key data generated in Step S111 is as shown in FIG. 10.

As shown in FIG. 10, 80 bit slice blocks from 0 to 79 are dispersed and stored in the registers.

Each block is a block (bit slice expression block) formed of 8-bit data formed of the assembly of the same orders of bits of the eight cryptographic keys.

As will be described hereinafter, by executing the process of the block unit using this block as a unit, the same process as the cryptographic process individually using the eight keys can be executed in a single cryptographic process.

In Step S112, the round keys are generated using the eight bit-slice expressed 80-bit keys stored in the registers. 32 round keys corresponding to the round number are necessary in the cryptographic process algorithm "PRESENT", and in Step S112, 32 round keys are generated using the bit slice expression data stored in the registers.

In addition, the round keys generated by the process described below are round keys used in the process of the block (bit slice expression block) unit.

For example, in the normal PRESENT algorithm shown in FIG. 6, the round keys of each round used in the 64-bit plain text has 64 bits, but the cryptographic process in Step S122 of executing the cryptographic process using the bit slice data shown in FIG. 7, is executed as the process of the bit slice expression block unit.

That is, the plain text is subjected to the cryptographic process using 64 blocks as a unit, and therefore the round keys to be used in this cryptographic process are also the round keys with 64 blocks.

In the example, in one key block (bit slice expression key block), the data of the same order of bits of the eight original cryptographic keys 81, that is, eight bits are stored.

The round keys to be used in the bit slice cryptographic process of the present disclosure are the round keys with 64 blocks, that is, the round keys with 64×8 bits=512 bits.

The plain text which is the encryption process target is processed in the same manner as described above, and the plain text input has 64 bits in the normal PRESENT algorithm shown in FIG. 6, but in the bit slice cryptographic process of the present disclosure, 64 blocks of the bit slice expression data, that is, 64 blocks with 64×8 bits=512 bits are input to execute the process.

In Step S112, 32 round keys formed of 64 blocks to be used in the cryptographic process between the bit slice expression blocks are generated.

Figure 11:
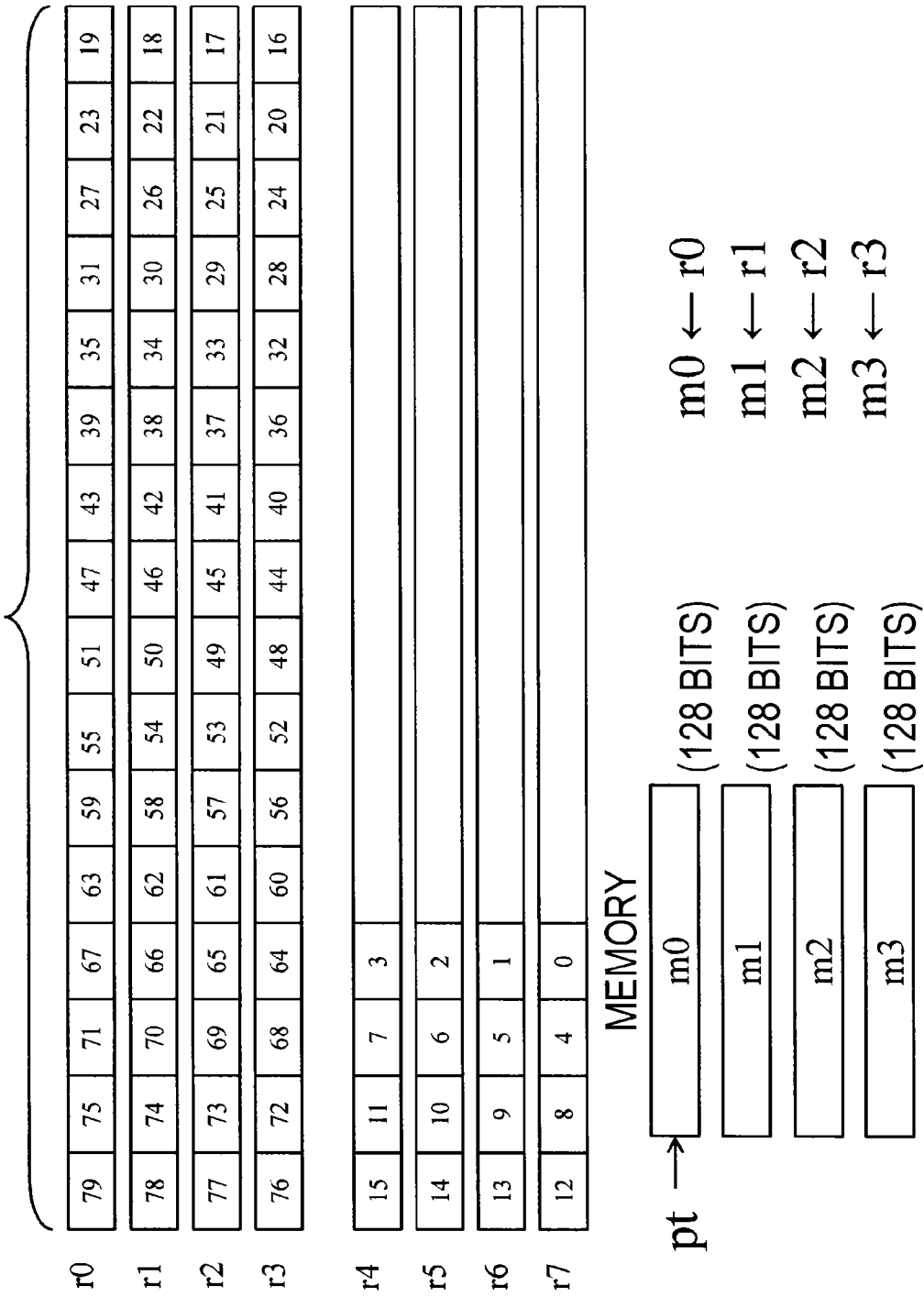
FIG. 11 is a diagram showing one example of register storage data of a key scheduling process.

As shown in FIG. 11, the generated round keys are written in memory areas (m0 to m3) designated by a key pointer (pt).

Figure 12:
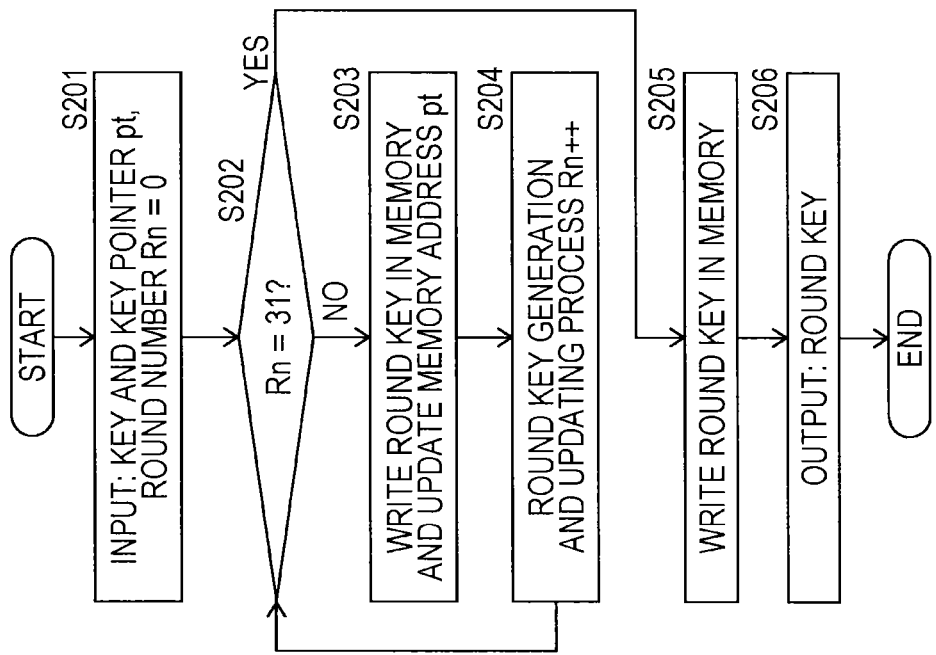
FIG. 12 is a diagram showing a flowchart illustrating a sequence of a key scheduling process.

FIG. 12 shows a specific flow of the key scheduling process executed in Step S112.

First, in Step S201, the input data and initial data are set.

In detail, the bit slice expression key data stored in the register is input as the input data. In addition, the pointer (pt) indicating the memory area for writing the generated round key, and the round number Rn of the generated round key are set. Rn is set as 0, in the initial setting, and subsequently Rn increases to 1, 2, 3, . . . and 31, and 32 round keys are generated.

In Step S202, it is determined whether or not the Rn has reached 31. In a case where the Rn is smaller than 31, the process proceeds to Step S203, and the pointer (pt) indicating a memory address for writing the generated round key is updated. The point (pt) may be updated while securing the storage area of the round key.

In Step S204, the round key generation updating process is executed and the round number Rn increases by one.

This specific process will be described later.

Next, the process returns to Step S202, and it is determined whether or not the Rn has reached 31. In a case where the Rn is smaller than 31, Step S203 and the subsequent processes are repeated. In Step S202, in a case where it is determined that the Rn has reached 31, the process proceeds to Step S204, and a process of writing the generated round key in the memory is executed. Finally, in Step S205, the generated round key is read out and the process transitions to the execution of the cryptographic process.

Figure 13:
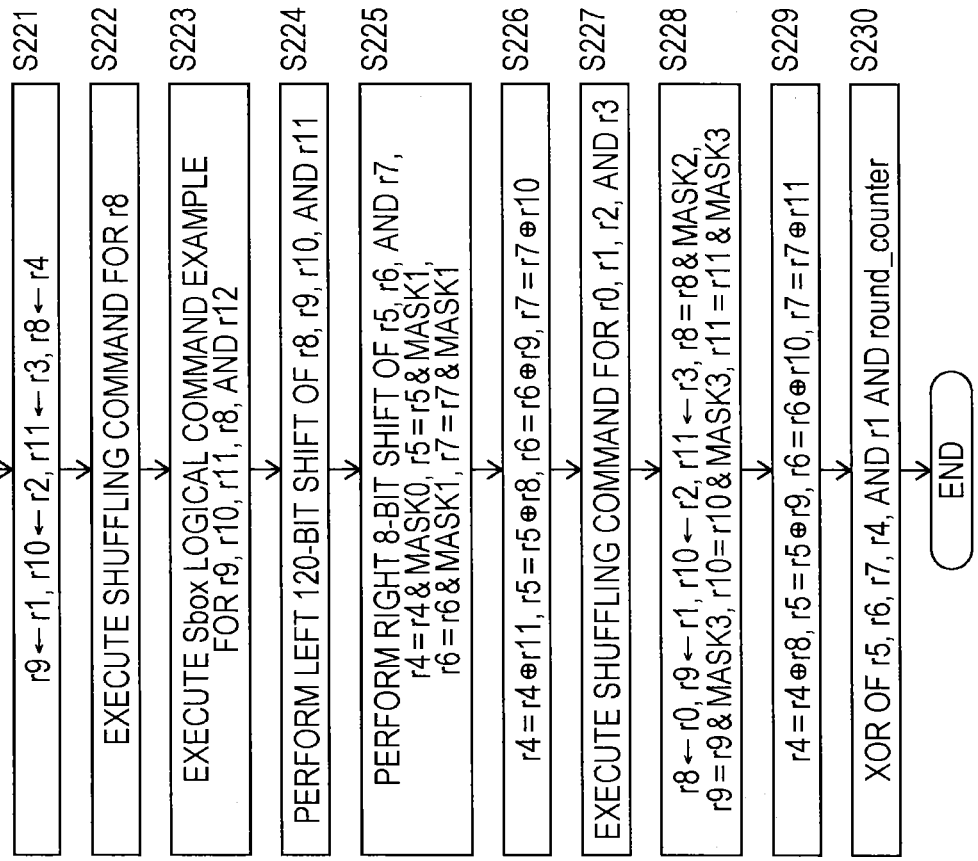
FIG. 13 is a diagram showing a flowchart illustrating a specific process sequence of a round key generation updating process executed in a key scheduling process.

FIG. 13 shows a specific process flow of the round key generation updating process executed in Step S203.

In addition, as shown in FIG. 11, the bit slice expression key blocks generated by the bit slice process are stored in the registers r0, r1, r2, r3, r4, r5, r6, and r7.

First, in Step S221 of the flowchart shown in FIG. 13, the registers r1, r2, r3, and r4 are copied to registers r9, r10, r11, and r8.

That is, as shown in FIG. 14, the registers r1, r2, r3, and r4 are copied to the registers r9, r10, r11, and r8.

Next, in Step S222, a shuffling command is executed in the register r8, and replacement of the storage data in the register 8 is performed.

In addition, the shuffling executed in the apparatus of the present disclosure is a process of replacing the data stored in one register in the block unit to store the data in the same register. That is, it is a process of replacing the data of the block unit in the register, in the block unit.

For example, in a case where the storage data in the register r8 is the following data in the unit of eight bits from the head, [0,0], [0,1], [0,2], [0,3], [0,4], [0,5], [0,6], [0,7], [0,8], [0,9], [0,10], [0,11], [0,12], [0,13], [0,14], and [0,15], the shifting process in Step S222 is executed as the following shifting process.

([0,0], [0,1], [0,2], [0,3], [0,4], [0,5], [0,6], [0,7], [0,8], [0,9], [0,10], [0,11], [0,12], [0,13], [0,14], [0,15])→([0,1], [0,2], [0,3], [0,0], [0,0], [0,0], [0,0], [0,0], [0,0], [0,0], [0,0], [0,0], [0,0], [0,0], [0,0]), that is, left direction shifting of the 8-bit data unit is executed.

The results thereof are data shown in FIG. 15.

Next, in Step S223, an operation process corresponding to predetermined nonlinear conversion (Sbox logical command example) is executed with respect to the storage data in registers r9, r10, r11, and r8.

As shown in FIG. 16, results of the nonlinear conversion (Sbox logical command example) process executed with respect to the bocks 18, 17, 16, and 15 which are the storage data items in the registers r9, r10, r11, and r8, are stored in the registers r8, r9, r10, and r11. The results of the nonlinear conversion process are the following data shown in FIG. 16.

The data items are data S0 in the register r8, data S1 in the register R9, data S2 in the register r10, and data S3 in the register r11, and the nonlinear conversion (Sbox logical command example) process used in the example is executed as an operation process of executing the logical command example shown in FIG. 17, for example, between the storage data items between the registers.

Registers x3, x2, x1, x0, and x4 shown as the logical command example of FIG. 17 correspond to the registers r9, r10, r11, r8, and r12 shown in FIG. 16, respectively.

In addition, the register r12 shown in FIG. 16 corresponds to the register x4 in the logical command example shown in FIG. 17, and is used as a temporary area for storing intermediate data or the like in the operation process.

Next, in Step S224, the storage data items in the registers r8, r9, r10, and r11 are shifted to the left by 120 bits.

FIG. 18 shows results of the left 120-bit shifting of the storage data items in the registers r8, r9, r10, and r11.

Next, in Step S225, the storage data items in the registers r5, r6, and r7 are shifted to the right by eight bits, and an AND operation of the register r4 and a MASK0 formed of predetermined data and an AND operation of the registers r5, r6, and r7, and a MASK1 formed of predetermined data are performed.

In addition, a value of the MASK is not necessarily retained in the register.

As shown in FIG. 19, the MASK0 is a mask in which only bits in the second to fourth blocks of the data unit of eight bits are set as 1 and the other bits are set to 0.

As shown in FIG. 19, the MASK1 is a mask in which only bits in the second to fifth blocks of the data unit of eight bits are set as 1 and the other bits are set to 0.

As shown in FIG. 19, with the AND process with the mask data items, the 8-bit data items of the head of the registers r4 to r7 are rewritten as 0.

Next, in Step S226, the exclusive-OR operation (XOR) of the registers r4, r5, r6, and r7 and the registers r11, r8, r9, and r10 is executed, and the output thereof is stored in the registers r4, r5, r6, and r7.

Figure 20:
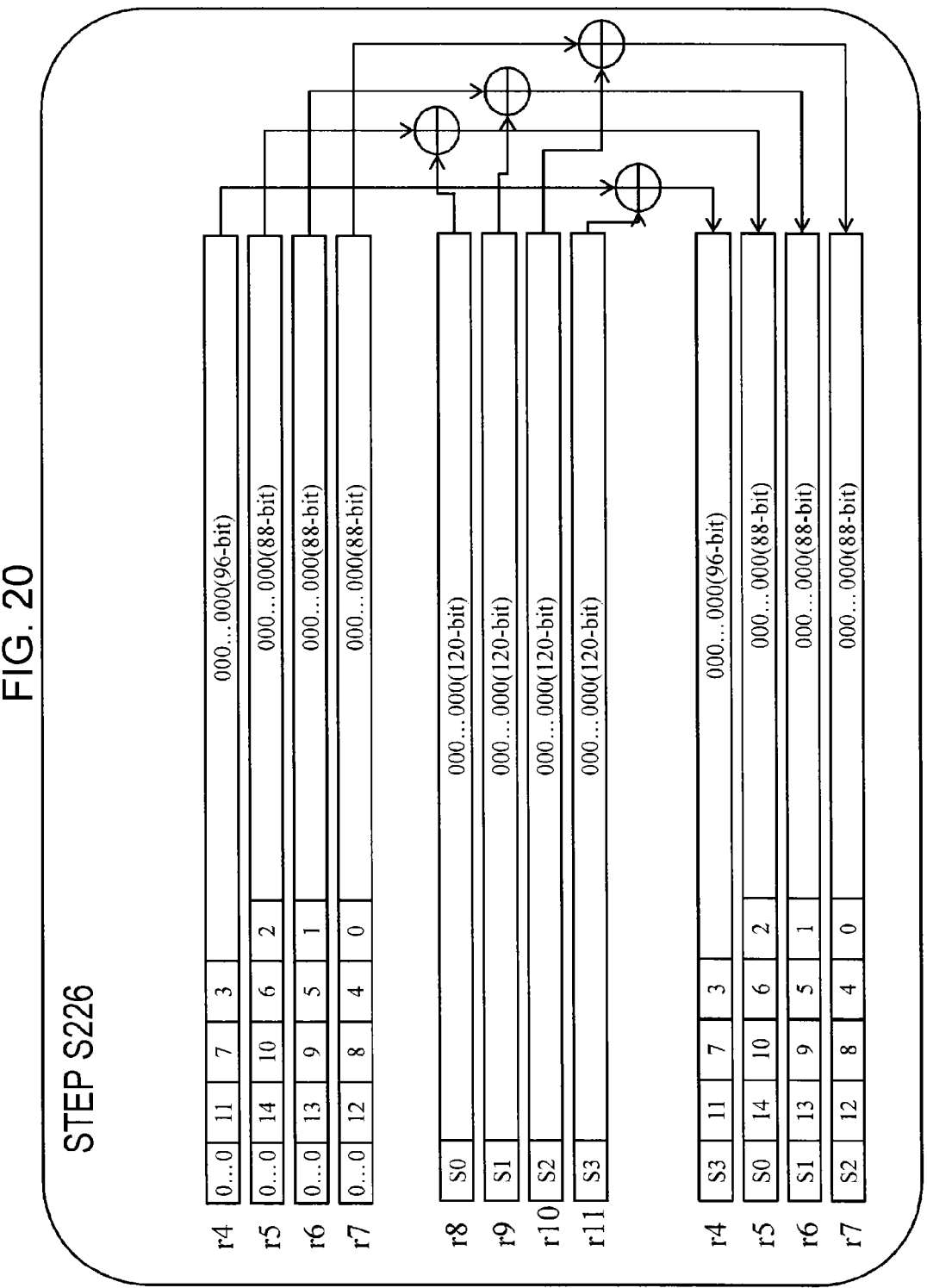
FIG. 20 is a diagram showing register storage data and a process example of a key scheduling process.

FIG. 20 shows the exclusive-OR operation (XOR) process and storage data items of the process result.

As a result of the exclusive-OR operation (XOR) process, the operation results of the nonlinear conversion process (Sbox) in Step S223 which are 8-bit data items of the heads of the registers r11, r8, r9, and r10 are stored in eight bits of the heads of the registers r4, r5, r6, and r7.

Next, in Step S227, the shuffling command is executed with respect to the registers r0, r1, r2, and r3, and the shuffled results are stored in the registers r0, r1, r2, and r3.

Figure 21:
FIG. 21 is a diagram showing register storage data and a process example of a key scheduling process.

FIG. 21 shows the storage data items of the registers r0, r1, r2, and r3 before and after the shuffling process.

The order of data rearrangement in this shuffling process is different between the register r0, and the registers r1, r2, and r3. The data items of the unit of eight bits in each register are [0,0], [0,1], [0,2], [0,3], [0,4], [0,5], [0,6], [0,7], [0,8], [0,9], [0,10], [0,11], [0,12], [0,13], [0,14], and [0,15] from the head.

In the shuffling process in Step S227, the following setting is executed with respect to the register r0.

([0,0], [0,1], [0,2], [0,3], [0,4], [0,5], [0,6], [0,7], [0,8], [0,9], [0,10], [0,11], [0,12], [0,13], [0,14], [0,15])→([0,12], [0,13], [0,14], [0,15], [0,0], [0,1], [0,2], [0,3], [0,4], [0,5], [0,6], [0,7], [0,8], [0,9], [0,10], [0,11])

In addition, the following setting is executed with respect to the registers r1, r2, and r3.

([0,0], [0,1], [0,2], [0,3], [0,4], [0,5], [0,6], [0,7], [0,8], [0,9], [0,10], [0,11], [0,12], [0,13], [0,14], [0,15])→([0,11], [0,12], [0,13], [0,14], [0,15], [0,0], [0,1], [0,2], [0,3], [0,4], [0,5], [0,6], [0,7], [0,8], [0,9], [0,10])

Next, in Step S228, the data items in the registers r0, r1, r2, and r3 are copied to the registers r8, r9, r10, and r11, the AND process of the register r8 and MASK2 and the AND process of the registers r9, r10, and r11 and MASK3 are executed, and the results thereof are stored in the registers r8, r9, r10, and r11.

The process results thereof are shown in FIG. 22.

In addition, as shown in FIG. 22, the MASK2 is mask data in which 32 bits at the head are 0 and subsequent 96 bits are 1.

As shown in FIG. 22, the MASK3 is mask data in which 40 bits at the head are 0 and subsequent 88 bits are 1.

As a result of this process, 32 bits of the head of the register r8 are set to 0, and 40 bits of the head of the registers r9, r10, and r11 are set to 0.

Next, in Step S229, the exclusive-OR operation (XOR) of the registers r4, r5, r6, and r7, and the registers r8, r9, r10, and r11 is executed, and the results thereof are stored in the registers r4, r5, r6, and r7.

This exclusive-OR operation (XOR) process is shown in FIG. 23.

Next, in Step S230, the exclusive-OR operation (XOR) of round counter values which are preset count values, is performed with respect to right eight bits of the registers r5, r6, r7, and r4 and left eight bits of the registers r1.

The round counter is set to each count value of 00000 to 11111 as binary expression according to the round number of 0 to 31.

For example, in a case of generating the round key with the round number of 13, the round counter is set to each count value of 01101 indicating 13 as the binary expression.

The XOR operation with the right eight bits of the registers r5, r6, r7, and r4 and left eight bits of the register r1 is performed with respect to the count value of 01101.

In addition, the order of the XOR operation with the count values of 00000 to 11111 of the round counter is the order from the high-order bit of the original data of the storage value of each register. In the example shown in FIG. 24, the order thereof is the order from the large value and is the order of 38, 37, 36, 35, and 34.

That is, the order of the registers is r5, r6, r7, r4, and r1.

As shown in FIG. 24, from the high-order bit, the XOR operation of the right 8-bit data in the register r5 ([38] in the register r5 shown in FIG. 24) is executed with respect to the first bit 0 of the count value of 01101, the XOR operation of the right 8-bit data in the register r6 ([37] in the register r6 shown in FIG. 24) is executed with respect to the second bit 1 of the count value of 01101, the XOR operation of the right 8-bit data in the register r7 ([36] in the register r7 shown in FIG. 24) is executed with respect to the third bit 1 of the count value of 01101, the XOR operation of the right 8-bit data in the register r4 ([35] in the register r6 shown in FIG. 24) is executed with respect to the fourth bit 0 of the count value of 01101, and the XOR operation of the left 8-bit data in the register r1 ([34] in the register r1 shown in FIG. 24) is executed with respect to the fifth bit 1 of the count value of 01101, and each data is updated.

Figure 25:
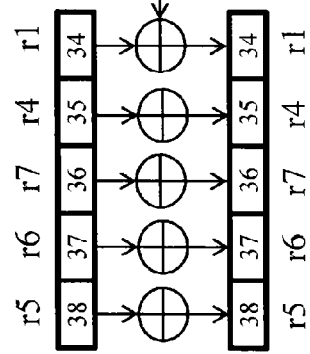
FIG. 25 is a diagram showing register storage data and a process example of a key scheduling process.

In addition, in this exclusive-OR operation (XOR), it is possible to use MASK4 and MASK5 as shown in FIG. 25.

The MASK4 is mask data in which first 120 bits are set to 0 and last eight bits are set to 1.

The MASK5 is mask data in which first eight bits are set to 1 and last 120 bits are set to 0.

The MASK4 is used for the XOR with the registers r5, r6, r7, and r4, and the MASK5 is used for the XOR with the register r1.

In addition, from five bits of the round counter of 00000 to 11111, even when it is set to execute the process with respect to the register corresponding to the bit set as 1 as a target and not to execute the process with respect to the register corresponding to the bit set as 0, the same result of the exclusive-OR operation (XOR) in Step S230 is obtained.

That is, in a case where the value of the round counter, for example is 13=01101, with respect to the register order of r5, r6, r7, r4, and r1 from the high order of the original data described above, since only the second, third, and fifth bits of the round counter are set to 1, only the XOR operation of the register r6 and r7, and the MASK4, and the XOR operation of the register r1 and the MASK5 may be executed with respect to the registers r5, r6, r7, r4, and r1.

The storage data in the registers r5, r6, r7, r4, r1, r2, r3, and r0 obtained as a result in Step S230 are set as blocks for next round key generation.

64 blocks from the blocks stored in the registers r5, r6, r7, r4, r1, r2, r3, and r0 are set as the round keys of the next round.

Hereinafter, the process according to the flow of FIG. 13 is repeated using the updated register storage blocks, and 32 round keys are generated.

Figure 26:
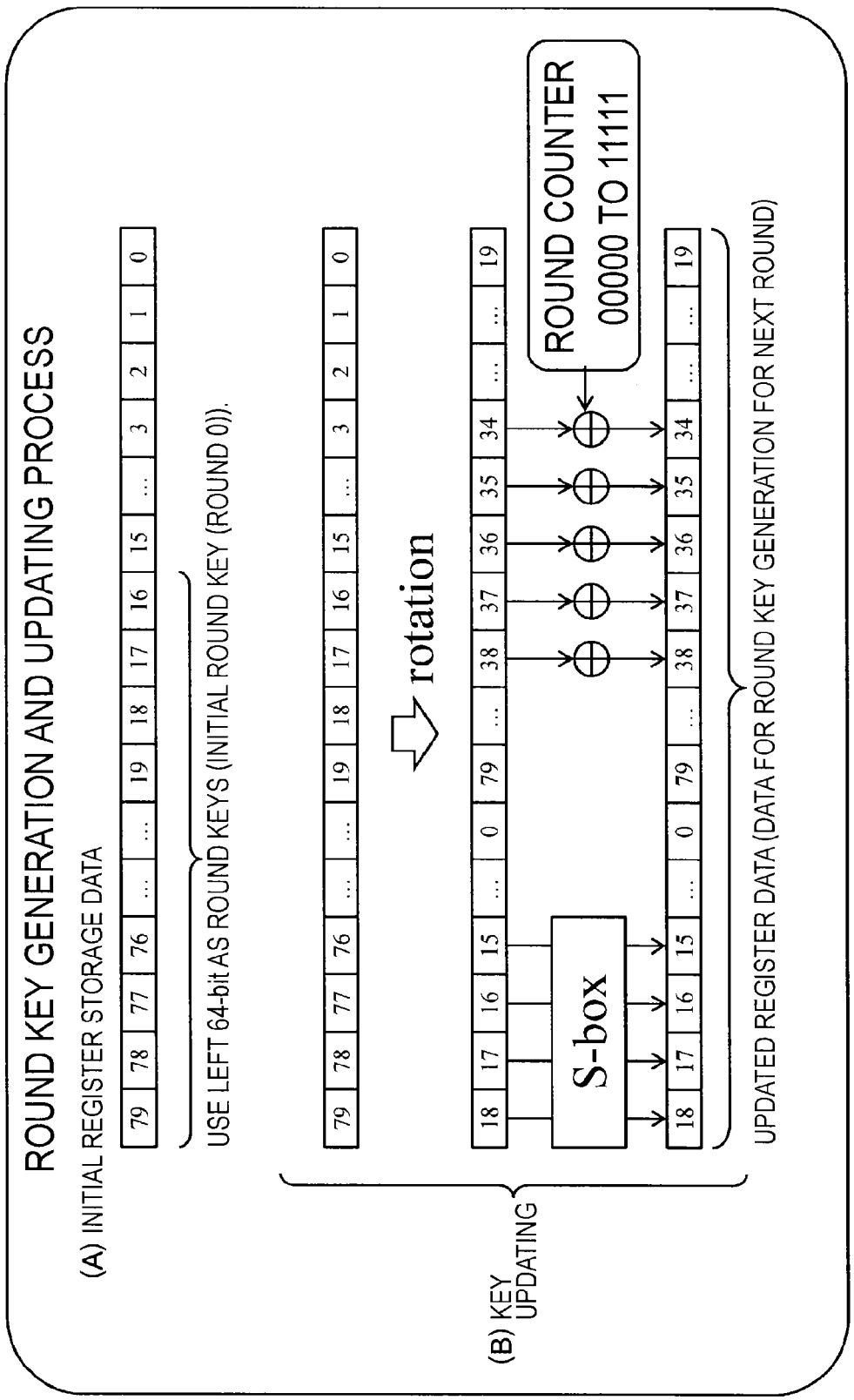
FIG. 26 is a diagram showing register storage data and a process example of a key scheduling process.

Hereinabove, the specific process according to the flowchart shown in FIG. 13 has been described, but the round key generation and updating process can be simplified and collectively shown as FIG. 26.

FIG. 26(A) is initial register storage data in which 80 blocks stored in the plurality of registers shown in FIG. 10 are arranged from the high order of 79 to 0.

64 blocks from the initial set blocks are selected as initial round keys.

After that, the process according to the flow shown in FIG. 13 is executed with respect to 80 blocks which are the initial register storage data shown in FIG. 26(A). That is, the processes described with reference to FIG. 14 to FIG. 25 are performed to update the registers.

FIG. 26(B) collectively shows the register updating process.

The register updating process is executed as a process including each process of (a) a rotation process such as the shifting process or the shuffling process of the block unit, (b) the nonlinear conversion process (Sbox) of the block unit, and (c) the exclusive-OR operation of the block and the round counter (00000 to 111111).

As a result, register updated data, that is, data for generating the next round keys, shown at a lowest stage of FIG. 26(B) is set. 64 blocks are selected from the left of the blocks of the registers and those are set as the round keys.

After that, the key updating of FIG. 26(B) is repeatedly performed with respect to the register updated data shown at a lowest stage of FIG. 26(B) to perform the register updating, and the round keys are sequentially generated.

By doing so, the round keys are generated in the key scheduling process in Step S112 shown in FIG. 7.

[6. Key Scheduling Process (Key Scheduling Process Example 2)]

Next, another example of the key scheduling process in Step S112 executed in the cryptographic processing unit 110 shown in FIG. 7 will be described.

In the key scheduling unit described in [5. Key Scheduling Process (Key Scheduling Process Example 1)] described above, it is necessary to perform the Sbox, that is, the nonlinear conversion process for each round. That is the nonlinear conversion process (Sbox) with respect to four blocks described with reference to FIG. 16 and FIG. 17.

This nonlinear conversion process has a large number of operation steps as shown in FIG. 17, and thus increases the processing time.

Hereinafter, as a key scheduling process example 2, a method in which the number of times of execution of the nonlinear conversion process (Sbox) is decreased to 2, will be described.

Figure 27:
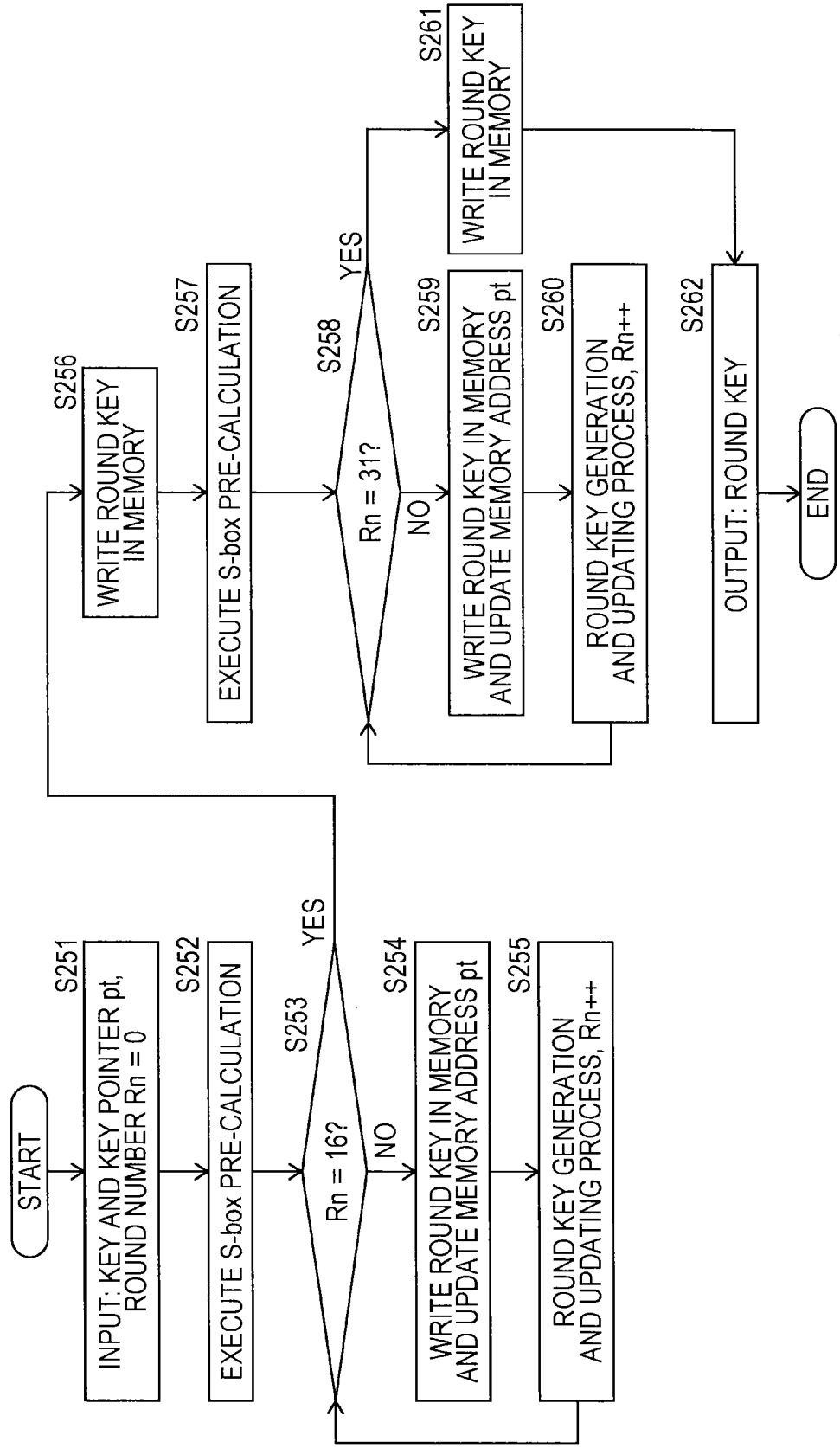
FIG. 27 is a diagram showing a flowchart illustrating a sequence of a key scheduling process.

FIG. 27 shows a flow illustrating the process executed by the key scheduling unit of the process example.

The differences between this process and the key scheduling process described above with reference to FIG. 12 are the performing of pre-calculation of the nonlinear conversion (Sbox) in Step S252 for the first round and before the $17^{th}$ round and Step S257, and the content of the round key generation and updating process in Step S255 and Step S260.

The process in Step S251 of the flow of FIG. 27 is the same process as the process in Step S201 of the flow of FIG. 12.

The process in Steps S254 and S259 of the flow of FIG. 27 is the same process as the process in Step S203 of the flow of FIG. 12.

The process in Steps S256 and S261 of the flow of FIG. 27 is the same process as the process in Step S205 of the flow of FIG. 12.

The process in Step S262 of the flow of FIG. 27 is the same process as the process in Step S206 of the flow of FIG. 12.

The description of the processes will be omitted, and hereinafter the process different from the key scheduling process described with reference to FIG. 12 will be described.

(6-1. Pre-Calculation Process of Nonlinear Conversion (Sbox))

Figure 28:
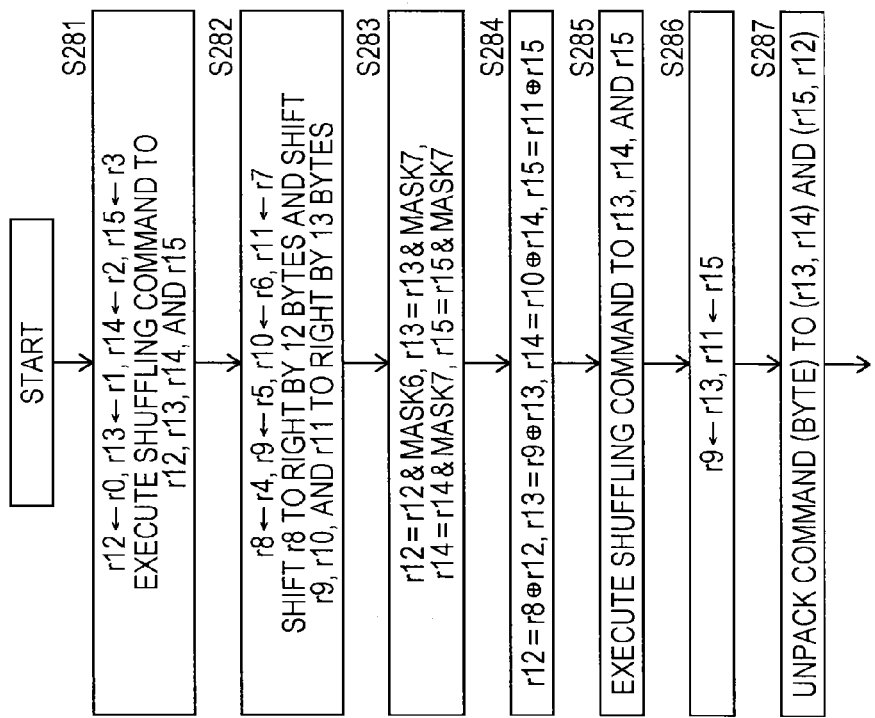
FIG. 28 is a diagram showing a flowchart illustrating a specific sequence of a pre-calculation process of a nonlinear conversion process (Sbox) executed in a key scheduling process.
Figure 29:
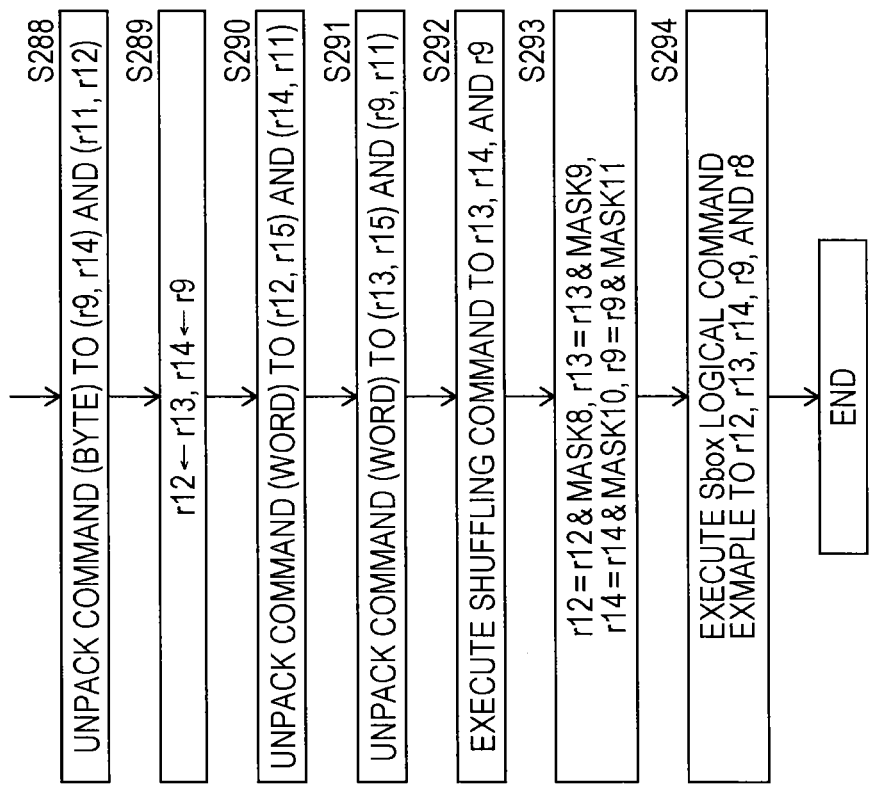
FIG. 29 is a diagram showing a flowchart illustrating a specific sequence of a pre-calculation process of a nonlinear conversion process (Sbox) executed in a key scheduling process.

FIG. 28 and FIG. 29 show flows illustrating specific sequences of the pre-calculation process of the nonlinear conversion process (Sbox) executed in Step S252 and Step S257.

As shown in FIG. 30, in the initial state, bit slice expression key blocks of 79 to 0 are stored in the registers. This is the same as in the setting described above with reference to FIG. 10 and FIG. 11.

For example, the bit slice expression key block of [79] is 8-bit data in which the first bits of eight 80-bit keys are assembled. Hereinafter, 78, 77, 76, 75, . . . and 0 correspond to 8-bit data items in which the second, third, fourth, fifth, . . . , and final ($80^{th}$) bits of eight 80-bit keys are assembled.

According to the flows shown in FIG. 28 and FIG. 29, the specific sequences of the pre-calculation of nonlinear conversion (Sbox) executed in Step S252 and Step S257 of the flow of FIG. 27 will be described.

Figure 31:
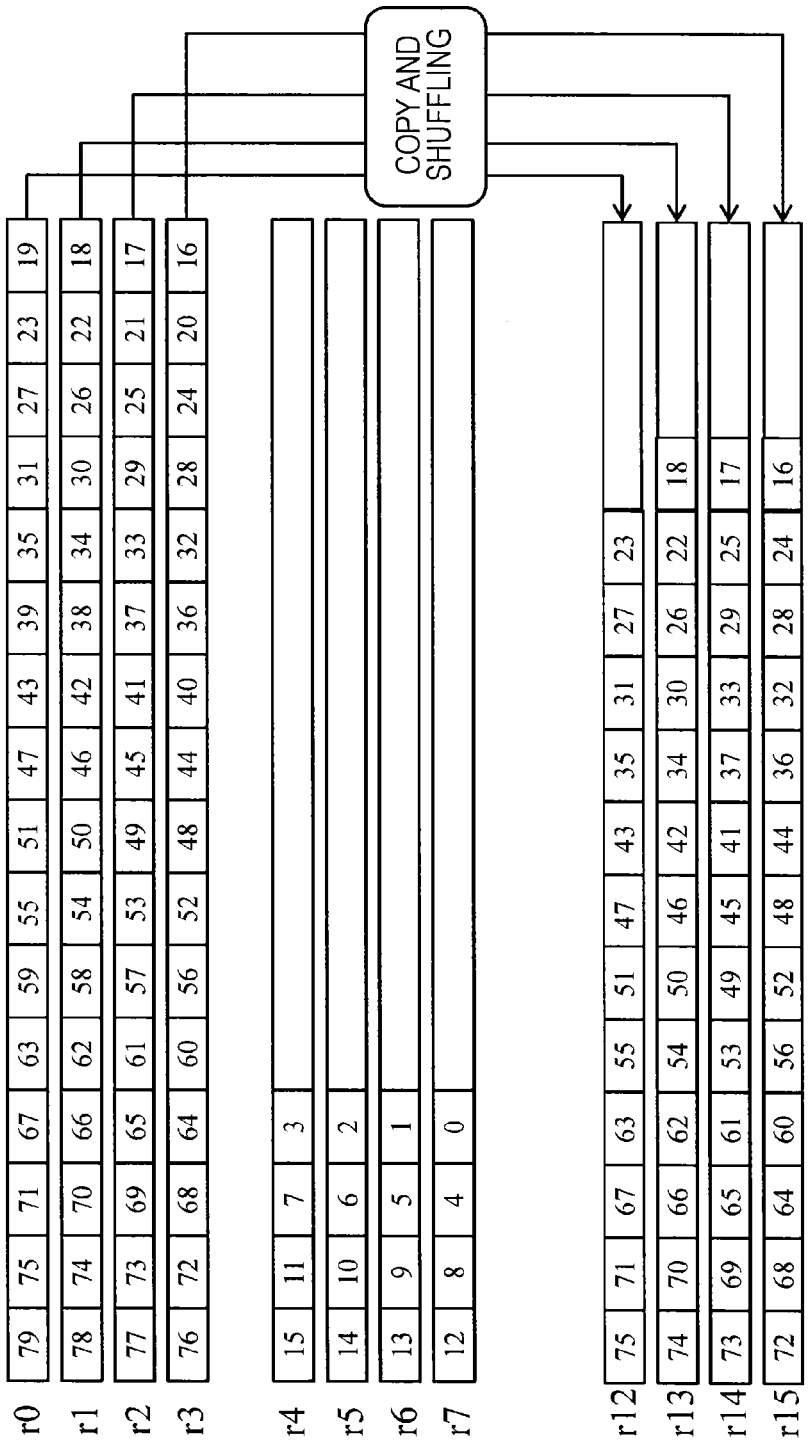
FIG. 31 is a diagram showing register storage data and a process example of a pre-calculation process of a nonlinear conversion process (Sbox).

First, in Step S281 shown in the flow of FIG. 28, as shown in FIG. 31, the registers r0, r1, r2, and r3 are copied to the registers r12, r13, r14, and r15, and the shuffling command is performed with respect to the registers r12, r13, r14, and r15.

The order of rearrangement in this shuffling process is different between the registers.

When the arrangement of data in the registers r12, r13, r14, and r15 before the shuffling (same as in registers r0, r1, r2, and r3) is set as [0,0], [0,1], [0,2], [0,3], [0,4], [0,5], [0,6], [0,7], [0,8], [0,9], [0,10], [0,11], [0,12], [0,13], [0,14], and [0,15] from the left, the shuffling of each register is set as below.

Registers r12 and r13

([0,0], [0,1], [0,2], [0,3], [0,4], [0,5], [0,6], [0,7], [0,8], [0,9], [0,10], [0,11], [0,12], [0,13], [0,14], [0,15])→([0,1], [0,2], [0,3], [0,4], [0,6], [0,7], [0,8], [0,9], [0,11], [0,12], [0,13], [0,14], [0,15], [0,0], [0,0], [0,0])

Register r14

([0,0], [0,1], [0,2], [0,3], [0,4], [0,5], [0,6], [0,7], [0,8], [0,9], [0,10], [0,11], [0,12], [0,13], [0,14], [0,15])→([0,1], [0,2], [0,3], [0,4], [0,6], [0,7], [0,8], [0,9], [0,10], [0,11], [0,12], [0,13], [0,15], [0,0], [0,0], [0,0])

Register r15

([0,0], [0,1], [0,2], [0,3], [0,4], [0,5], [0,6], [0,7], [0,8], [0,9], [0,10], [0,11], [0,12], [0,13], [0,14], [0,15])→([0,1], [0,2], [0,3], [0,4], [0,5], [0,6], [0,7], [0,8], [0,10], [0,11], [0,12], [0,13], [0,15], [0,0], [0,0], [0,0])

Figure 32:
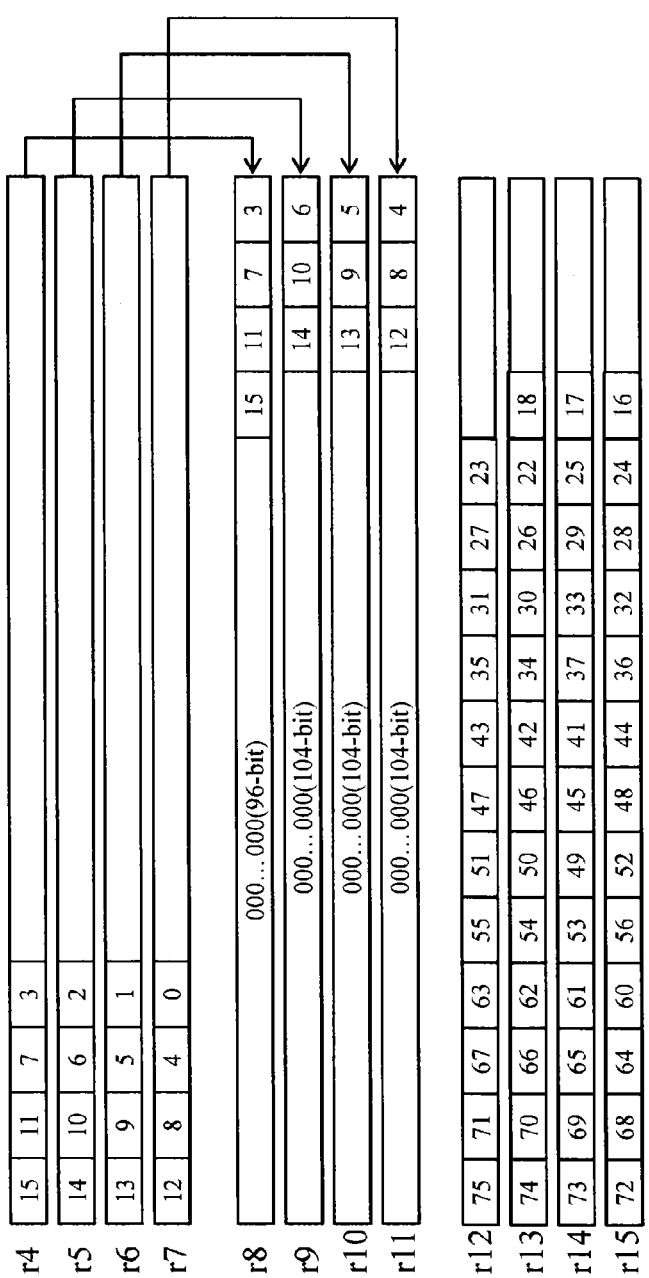
FIG. 32 is a diagram showing register storage data and a process example of a pre-calculation process of a nonlinear conversion process (Sbox).

Next, in Step S282, as shown in FIG. 32, the data in the registers r4, r5, r6, and r7 are stored in the registers r8, r9, r10, and r11, and the register r8 is subjected to a right 12-byte logical shift and registers r9, r10, and r11 are subjected to a right 13-byte logical shift.

Figure 33:
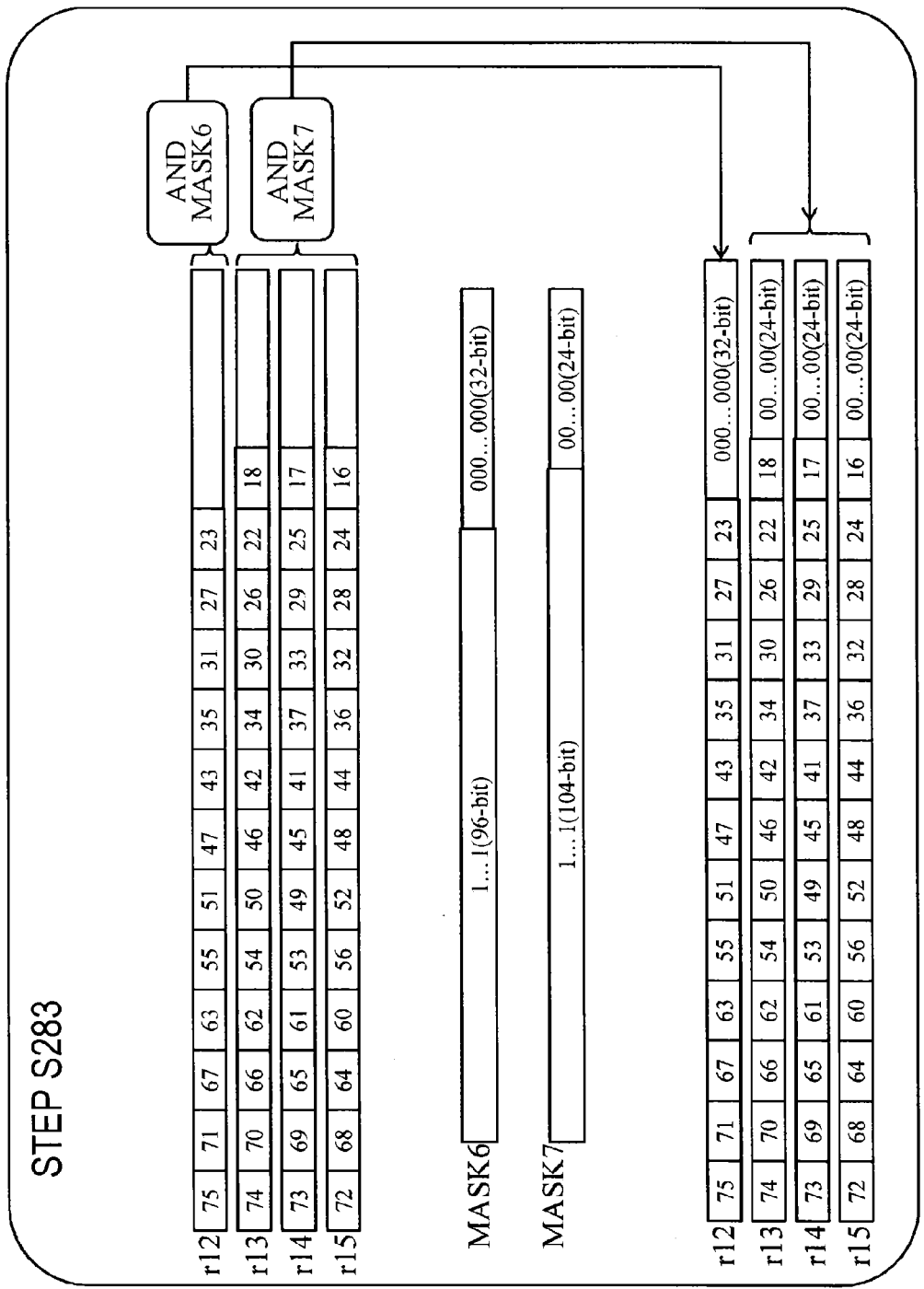
FIG. 33 is a diagram showing register storage data and a process example of a pre-calculation process of a nonlinear conversion process (Sbox).

Next, in Step S283, as shown in FIG. 33, the AND process of the register r12 and MASK6 and the AND process of the registers r13, r14, and r15 and MASK7 are executed.

The MASK6 is a mask in which first 96 bits are set to 0 and last 32 bits are set to 1.

The MASK7 is a mask in which first 104 bits are set to 0 and last 24 bits are set to 1.

Figure 34:
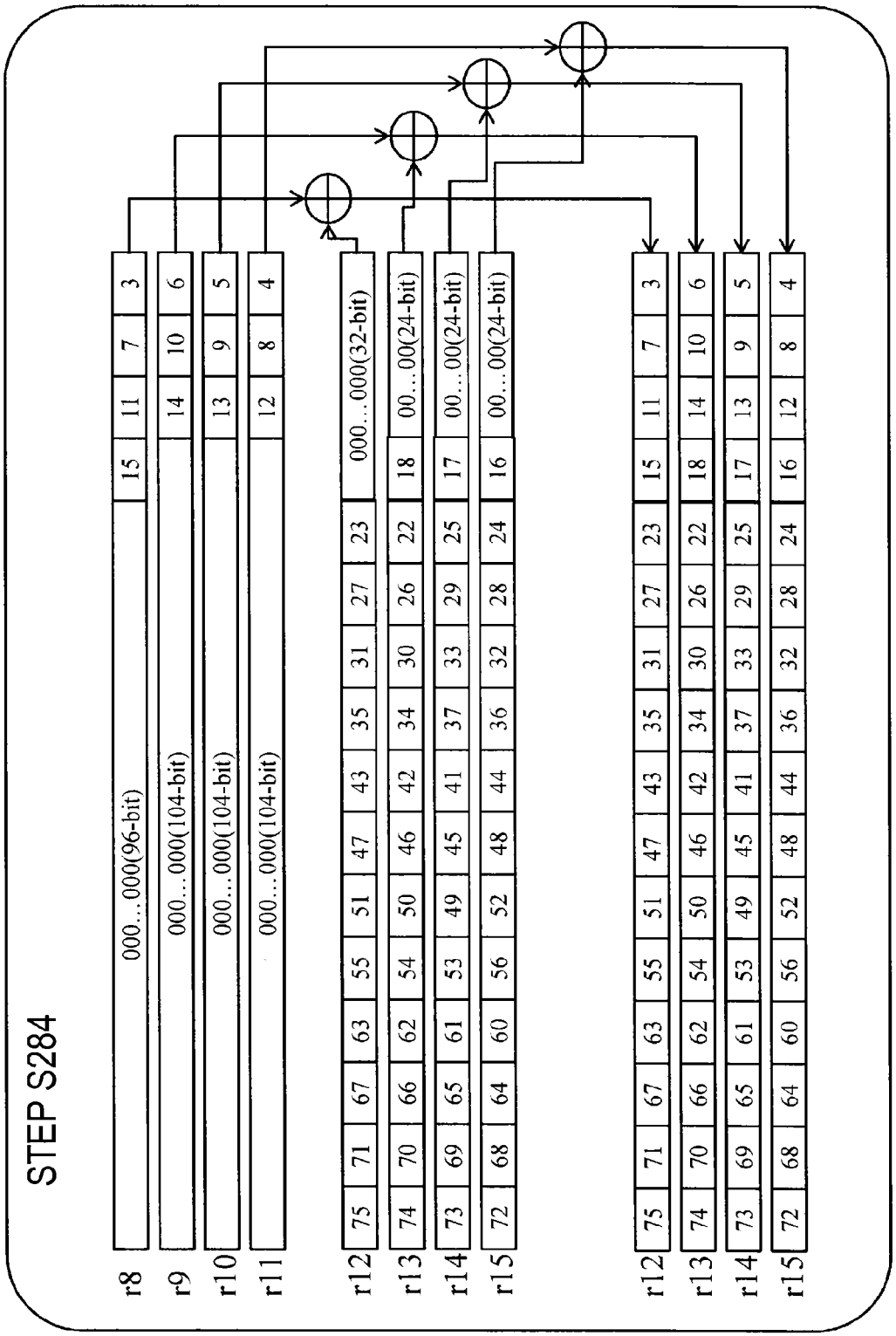
FIG. 34 is a diagram showing register storage data and a process example of a pre-calculation process of a nonlinear conversion process (Sbox).

Next, in Step S284, as shown in FIG. 34, the exclusive-OR operation (XOR) of the registers r8, r9, r10, and r11 and the registers r12, r13, r14, and r15 is performed, and the results thereof are stored in the registers r12, r13, r14, and r15.

Figure 35:
FIG. 35 is a diagram showing register storage data and a process example of a pre-calculation process of a nonlinear conversion process (Sbox).

Next, in Step S285, as shown in FIG. 35, the shuffling command is performed with respect to the registers r13, r14, and r15.

When the arrangement of data in the registers r13, r14, and r15 before the shuffling (same as in registers r0, r1, r2, and r3) is set as [0,0], [0,1], [0,2], [0,3], [0,4], [0,5], [0,6], [0,7], [0,8], [0,9], [0,10], [0,11], [0,12], [0,13], [0,14], and [0,15] from the left, the shuffling of each register is set as below.

Register r13

([0,0], [0,1], [0,2], [0,3], [0,4], [0,5], [0,6], [0,7], [0,8], [0,9], [0,10], [0,11], [0,12], [0,13], [0,14], [0,15])→([0,12], [0,13], [0,14], [0,15], [0,0], [0,1], [0,2], [0,3], [0,4], [0,5], [0,6], [0,7], [0,8], [0,9], [0,10], [0,11])

Register r14

([0,0], [0,1], [0,2], [0,3], [0,4], [0,5], [0,6], [0,7], [0,8], [0,9], [0,10], [0,11], [0,12], [0,13], [0,14], [0,15])→([0,8], [0,9], [0,10], [0,11], [0,12], [0,13], [0,14], [0,15], [0,0], [0,1], [0,2], [0,3], [0,4], [0,5], [0,6], [0,7])

Register r15

([0,0], [0,1], [0,2], [0,3], [0,4], [0,5], [0,6], [0,7], [0,8], [0,9], [0,10], [0,11], [0,12], [0,13], [0,14], [0,15])→([0,4], [0,5], [0,6], [0,7], [0,8], [0,9], [0,10], [0,11], [0,12], [0,13], [0,14], [0,15], [0,0], [0,1], [0,2], [0,3])

Figure 36:
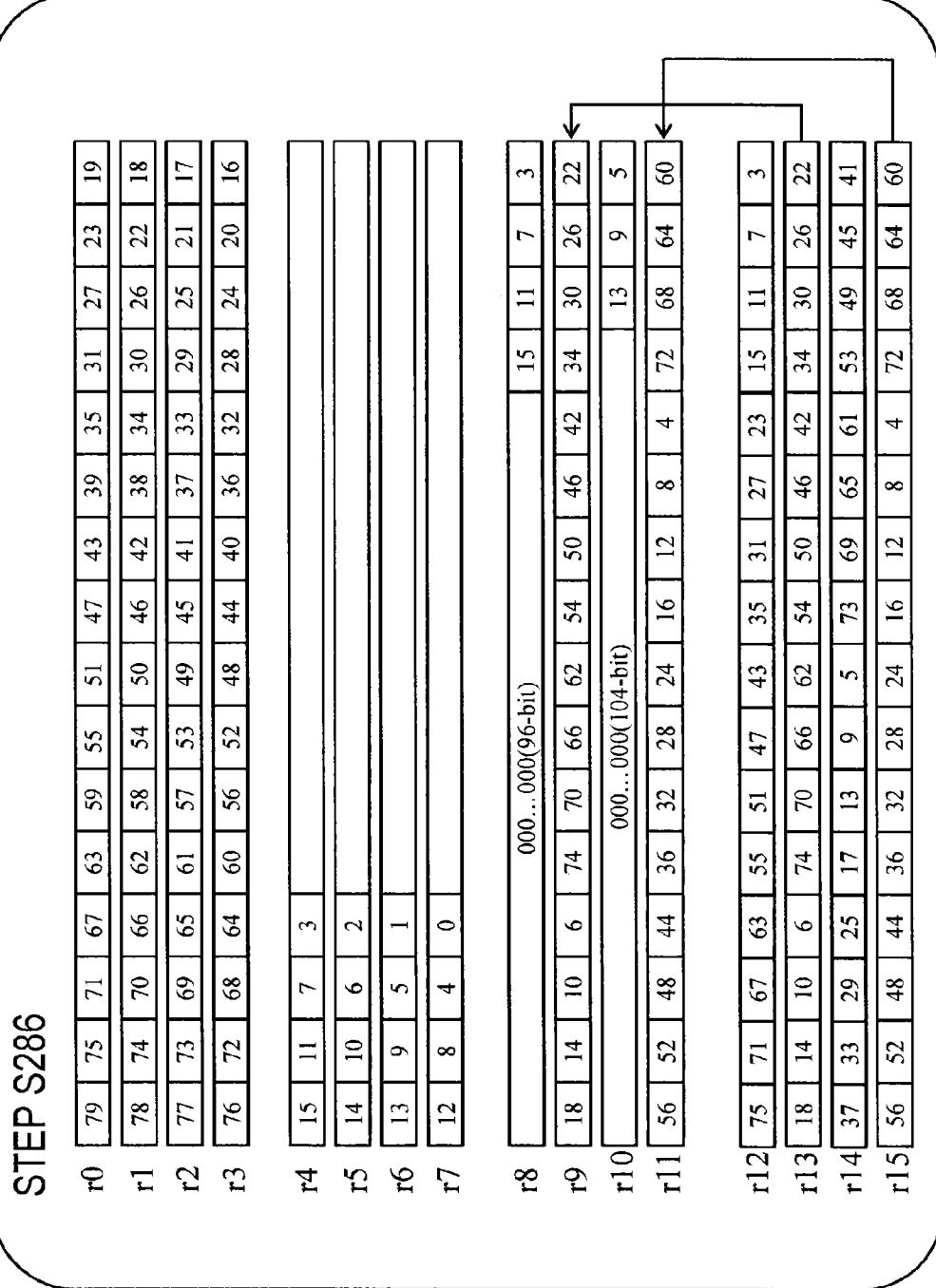
FIG. 36 is a diagram showing register storage data and a process example of a pre-calculation process of a nonlinear conversion process (Sbox).

Next, in Step S286, as shown in FIG. 36, the registers r13 and r15 are copied to the registers r9 and r11.

Figure 37:
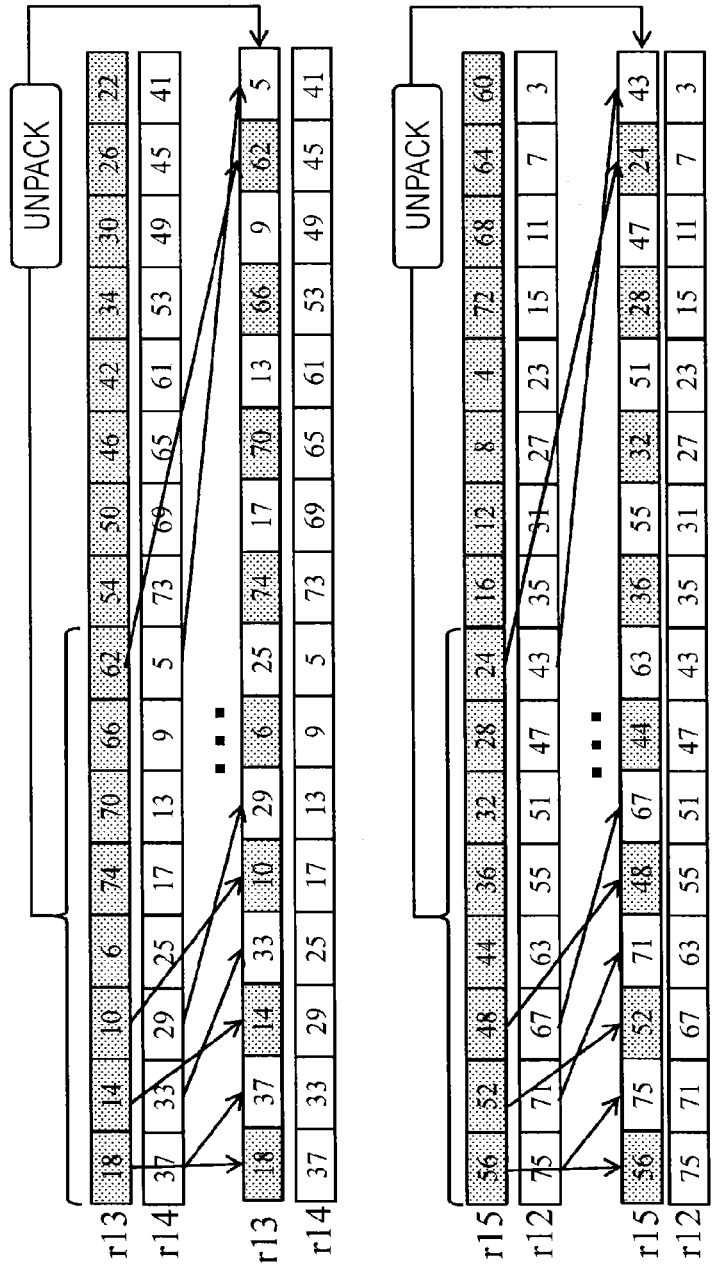
FIG. 37 is a diagram showing register storage data and a process example of a pre-calculation process of a nonlinear conversion process (Sbox).

Next, in Step S287, as shown in FIG. 37, an unpacking process of a byte unit is executed with respect to left 64 bits of the registers r13, r14, r15, and r12.

In addition, the unpacking process in the process of the present disclosure is a process of selecting the data stored in two registers, for example, from a high order or a low order using the block as a minimum unit, and alternately storing the data in one register of the two registers.

In detail, for example, this is a process of selecting half blocks of all blocks stored in each register from two registers, and re-storing the blocks in one register.

As shown in FIG. 37, the unpacking process of alternately storing left eight blocks (64 bits) of the register r13 and the register r14 in the block (eight bits) unit, in the register r13 from the left, is executed.

In the same manner as described above, the unpacking process of alternately storing left eight blocks (64 bits) of the register 15 and the register r12 in the block (eight bits) unit, in the register r15 from the left, is executed.

Figure 38:
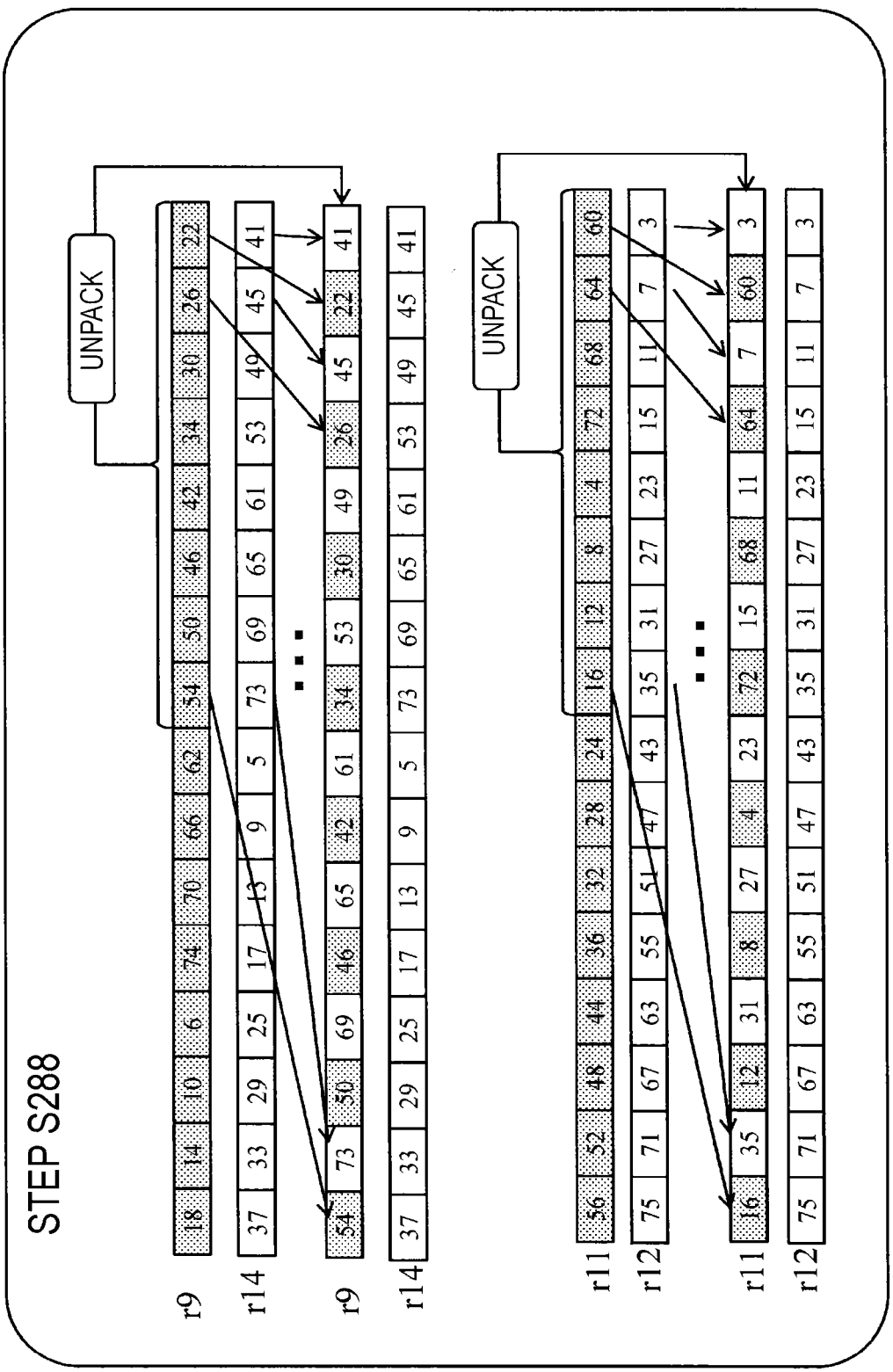
FIG. 38 is a diagram showing register storage data and a process example of a pre-calculation process of a nonlinear conversion process (Sbox).

Next, in Step S288, as shown in FIG. 38, the unpacking process in the byte unit is executed with respect to right 64 bits of the registers r9, r14, r11, and r12.

As shown in FIG. 38, the unpacking process of alternately storing right eight blocks (64 bits) of the register r9 and the register r14 in the block (eight bits) unit, in the register r9 from the right, is executed.

In the same manner as described above, the unpacking process of alternately storing right eight blocks (64 bits) of the register 11 and the register r12 in the register r11 from the right, in the block (eight bits) unit, is executed.

Figure 39:
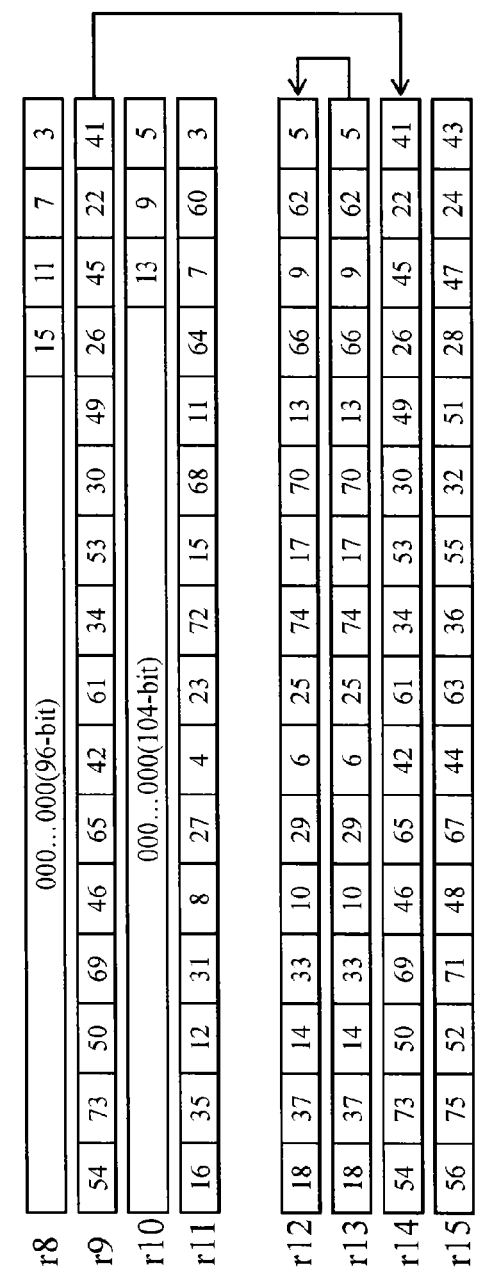
FIG. 39 is a diagram showing register storage data and a process example of a pre-calculation process of a nonlinear conversion process (Sbox).

Next, in Step S289, as shown in FIG. 39, the registers r13 and r9 are copied to the registers r12 and r14.

Figure 40:
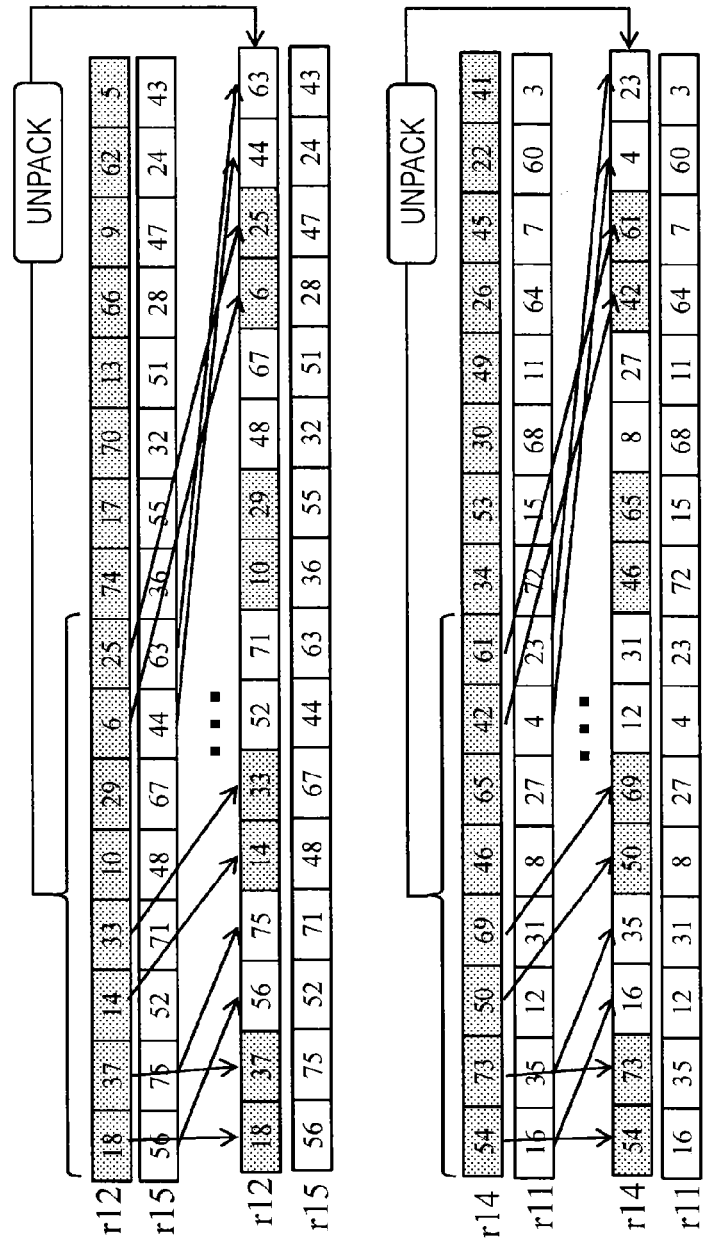
FIG. 40 is a diagram showing register storage data and a process example of a pre-calculation process of a nonlinear conversion process (Sbox).

Next, in Step S290, as shown in FIG. 40, unpacking is performed in a word unit of two units of 8-bit blocks, with respect to left 64 bits of the registers r12 and r15, and the registers r14 and r11.

As shown in FIG. 40, the unpacking process of alternately storing the left eight blocks (64 bits) of the register r12 and the register r15 in the register r12 from the left, in the word unit of two blocks (16 bits), is executed.

In the same manner as described above, the unpacking process of alternately storing the left eight blocks (64 bits) of the register r14 and the register r11 in the register r14 from the left, in the word unit of two blocks (16 bits), is executed.

Figure 41:
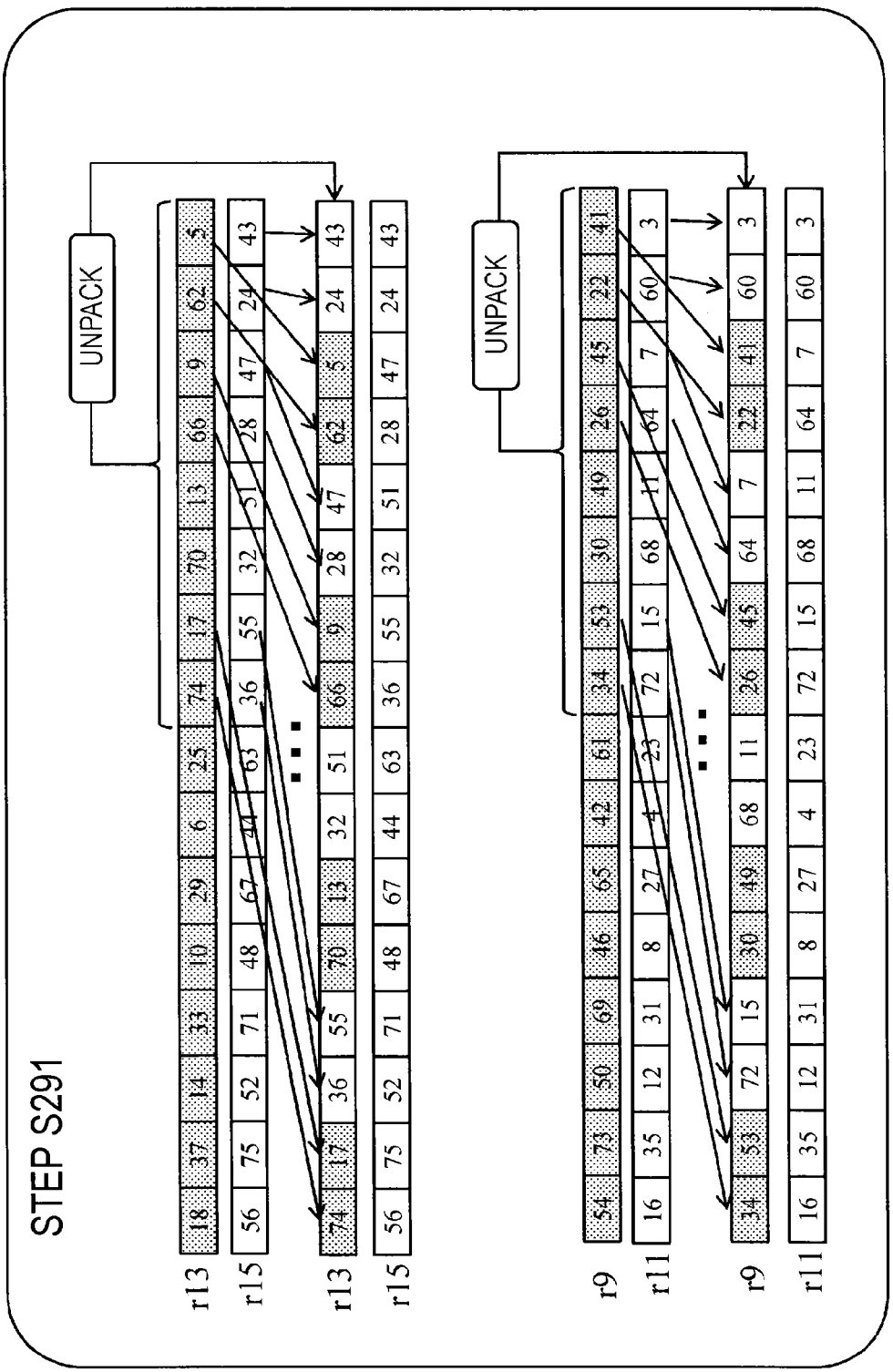
FIG. 41 is a diagram showing register storage data and a process example of a pre-calculation process of a nonlinear conversion process (Sbox).

Next, in Step S291, as shown in FIG. 41, unpacking is performed in a word unit of two units of 8-bit blocks, with respect to left 64 bits of the registers r13 and r15, and the registers r9 and r11.

As shown in FIG. 41, the unpacking process of alternately storing the right eight blocks (64 bits) of the register r13 and the register r15 in the register r13 from the left, in the word unit of two blocks (16 bits), is executed.

In the same manner as described above, the unpacking process of alternately storing the right eight blocks (64 bits) of the register r9 and the register r11 in the register r9 from the left, in the word unit of two blocks (16 bits), is executed.

Figure 42:
FIG. 42 is a diagram showing register storage data and a process example of a pre-calculation process of a nonlinear conversion process (Sbox).

Next, in Step S292, as shown in FIG. 42, the shuffling command is executed with respect to the registers r13, r14, and r9.

When the arrangement of data in the registers r13, r14, and r9 before the shuffling (same as in registers r0, r1, r2, and r3) is set as [0,0], [0,1], [0,2], [0,3], [0,4], [0,5], [0,6], [0,7], [0,8], [0,9], [0,10], [0,11], [0,12], [0,13], [0,14], and [0,15] from the left, the shuffling of each register is set as below.

Register r13

([0,0], [0,1], [0,2], [0,3], [0,4], [0,5], [0,6], [0,7], [0,8], [0,9], [0,10], [0,11], [0,12], [0,13], [0,14], [0,15])→([0,1], [0,2], [0,3], [0,0], [0,5], [0,6], [0,7], [0,4], [0,9], [0,10], [0,11], [0,8], [0,13], [0,14], [0,15], [0,12])

Register 14

([0,0], [0,1], [0,2], [0,3], [0,4], [0,5], [0,6], [0,7], [0,8], [0,9], [0,10], [0,11], [0,12], [0,13], [0,14], [0,15])→([0,2], [0,3], [0,0], [0,1], [0,6], [0,7], [0,4], [0,5], [0,10], [0,11], [0,8], [0,9], [0,14], [0,15], [0,12], [0,13])

Register 9

([0,0], [0,1], [0,2], [0,3], [0,4], [0,5], [0,6], [0,7], [0,8], [0,9], [0,10], [0,11], [0,12], [0,13], [0,14], [0,15])→([0,3], [0,0], [0,1], [0,2], [0,7], [0,4], [0,5], [0,6], [0,8], [0,11], [0,9], [0,10], [0,15], [0,12], [0,13], [0,14])

Figure 43:
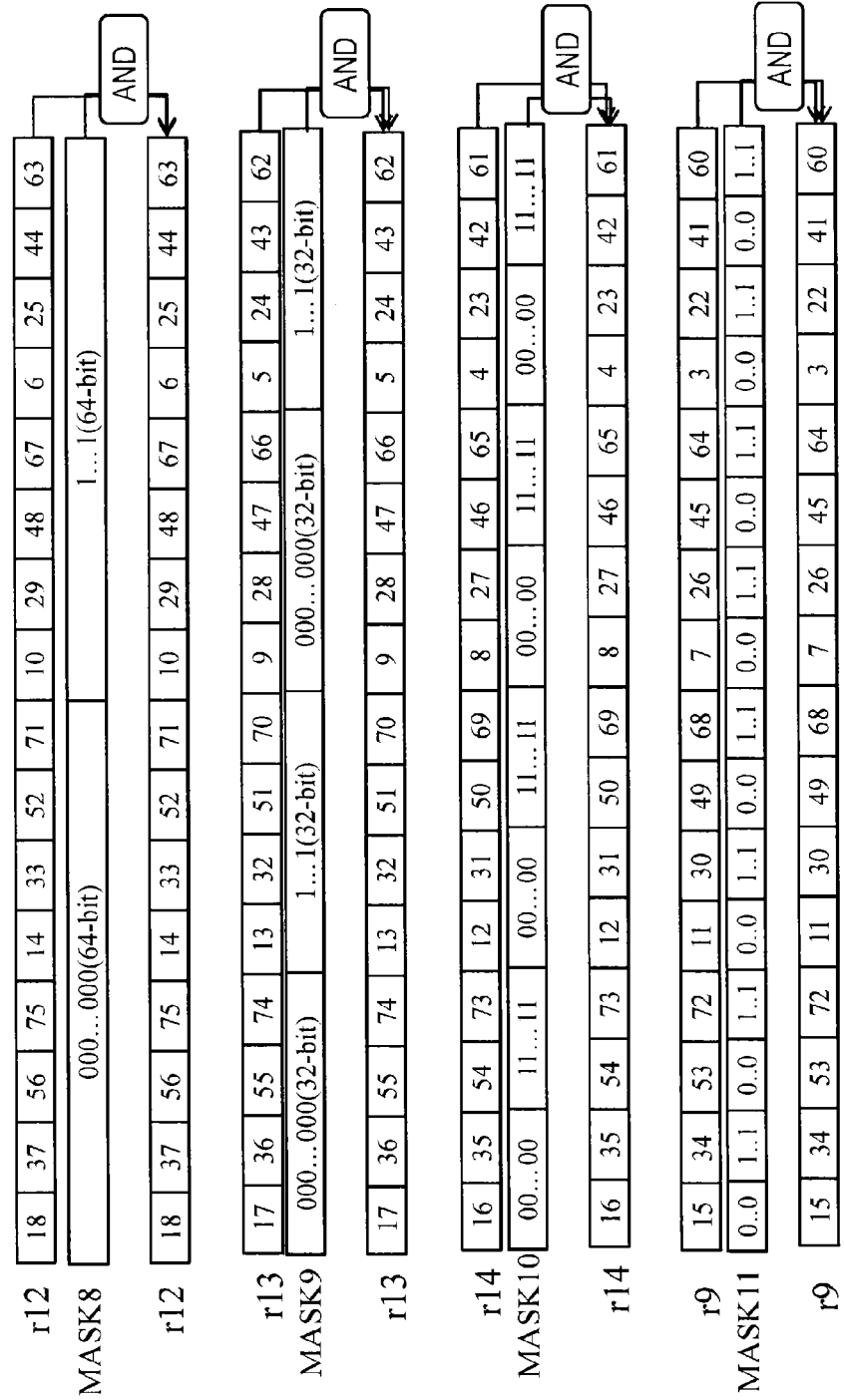
FIG. 43 is a diagram showing register storage data and a process example of a pre-calculation process of a nonlinear conversion process (Sbox).

Next, in Step S293, as shown in FIG. 43, the AND of the registers r12, r13, r14, and r9 and MASK8, MASK9, MASK10, and MASK11 is acquired and stored in each register.

In addition, the MASK8 is a mask in which first 64 bits are set to 0 and last 64 bits are set to 1, and the MASK9 is a mask in which the bits are set to 0, 1, 0, 1, in the unit of 32 bits from the head.

The MASK10 is a mask in which 16 bits from the head are continuously set to 0 and subsequent 16 bits are continuously set to 1, and alternately appears, and the MASK11 is a mask in which eight bits from the head are continuously set to 0 and subsequent eight bits are continuously set to 1, and alternately appears.

Figure 44:
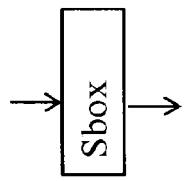
FIG. 44 is a diagram showing register storage data and a process example of a pre-calculation process of a nonlinear conversion process (Sbox).

Next, in Step S294, as shown in FIG. 44, the nonlinear conversion process (Sbox) with respect to the data items in the registers r12, r13, r14, and r9 is executed.

The nonlinear conversion process is the process described above with reference to FIG. 17.

The results of this nonlinear conversion process are stored in the registers r9, r14, r13, and r12. In addition, the register r8 is used as a temporary area, when performing the process.

Figure 45:
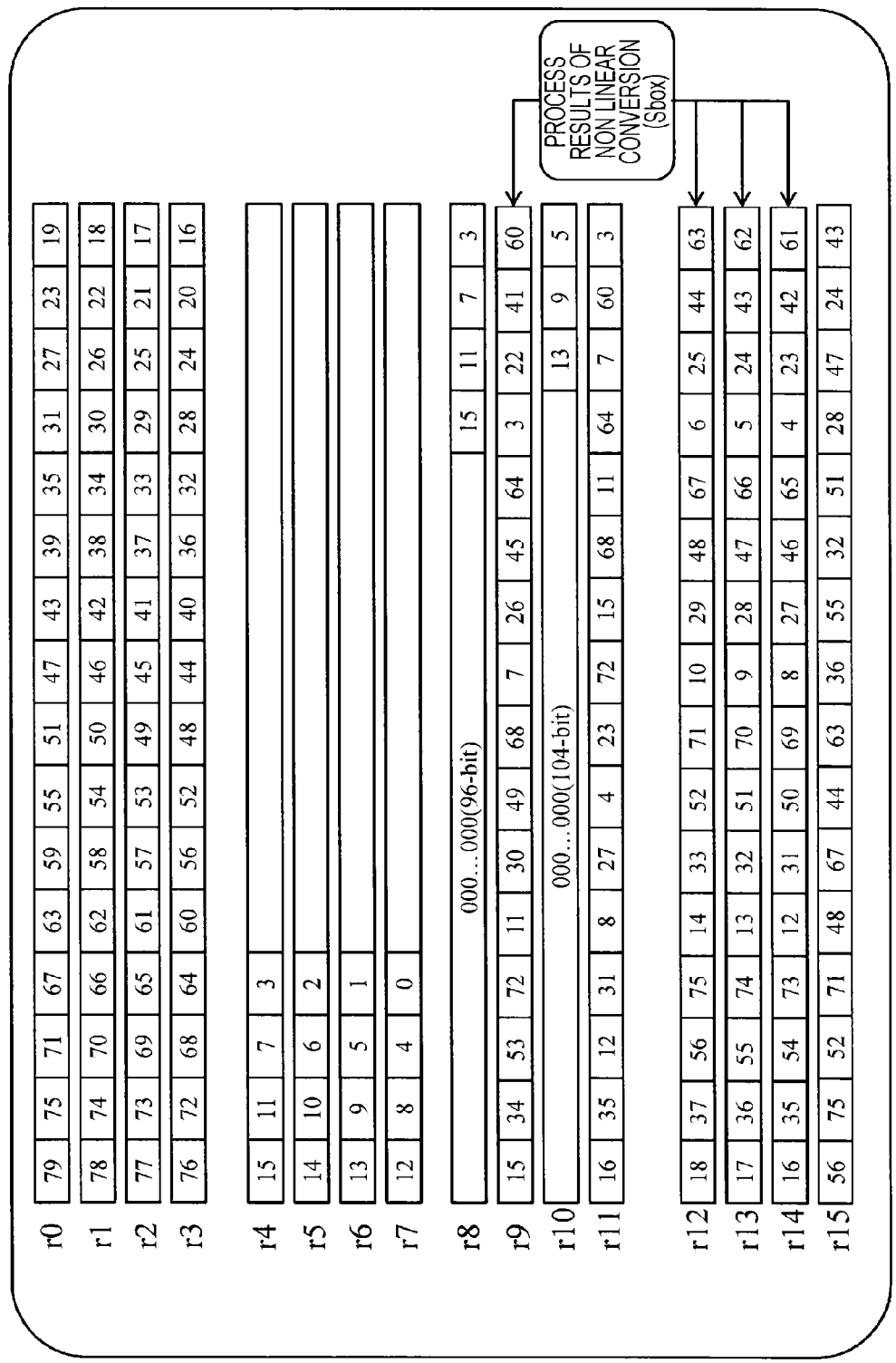
FIG. 45 is a diagram showing register storage data and a process example of a pre-calculation process of a nonlinear conversion process (Sbox).

The data stored in 16 blocks each having eight bits from the left of the registers r9, r14, r13, and r12 shown in FIG. 45 obtained as a result thereof, is the result of the nonlinear conversion process (Sbox) for 16 rounds.

In addition, after the pre-calculation of the Sbox, the registers r9, r14, r13, and r12 are stored in the registers r12, r13, r14, and r15 before executing the key updating process.

Further, the replacement process of the registers can be executed by a process of only reading the registers again on the program.

By doing so, in the pre-calculation of Sbox in Step S252 shown in FIG. 27, the results of the nonlinear conversion process (Sbox) to be used in the round key generation of 1 to 16 rounds are generated, and in the pre-calculation of Sbox in Step S257 shown in FIG. 27, the results of the nonlinear conversion process (Sbox) to be used in the round key generation of 17 to 32 rounds are generated.

In the example, it is possible to generate the results of the nonlinear conversion process (Sbox) which are necessary for the round key generation of all rounds, only by performing the nonlinear conversion process (Sbox) two times.

(6-2. Generation and Updating Process of Round Key)

Next, the round key generation and updating process in Step S255 and Step S260 of the flow shown in FIG. 27 will be described in detail with reference to FIG. 46 and the subsequent drawings.

Figure 46:
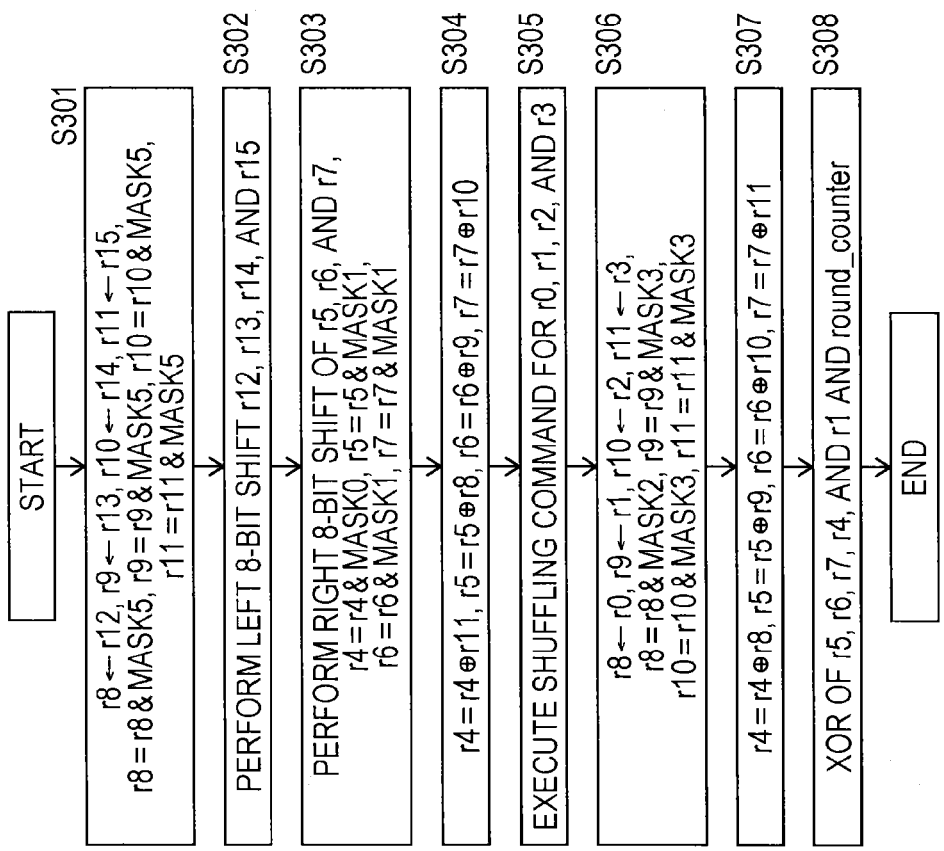
FIG. 46 is a diagram showing a flowchart illustrating a sequence of a round key generation updating process.

FIG. 46 is a flowchart illustrating a specific sequence of the round key generation and updating process in Step S255 and Step S260 of the flow shown in FIG. 27.

According to the flow shown in FIG. 46, the specific sequence of the round key generation and updating process executed in Step S255 and Step S260 of the flow of FIG. 27 will be described.

In addition, the register setting before starting the generation and updating of the round key is as shown in FIG. 47.

As shown in FIG. 47, the keys in the bit slice expression are stored in the registers r0, r1, r2, r3, r4, r5, r6, and r7.

In addition, the results of the pre-calculated nonlinear conversion (Sbox) process generated by the process described in (6-1. Pre-Calculation Process of Nonlinear Conversion (Sbox)) are stored in the registers r12, r13, r14, and r15.

Figure 48:
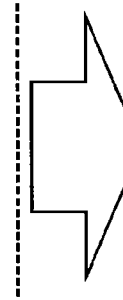
FIG. 48 is a diagram showing register storage data and a process example of a round key generation updating process.

First, in Step S301 of FIG. 46, as shown in FIG. 48, the registers r12, r13, r14, and r15 in which the results of the nonlinear conversion (Sbox) process are stored, are copied to the registers r8, r9, r10, and r11, and the AND process with the MASK5 is executed.

In addition, herein, a process example of the round key generation and updating using the Sbox value of the first round will be described, as an example.

For the pre-calculated nonlinear conversion process (Sbox) value, the left eight bits of the registers r12, r13, r14, and r15 are used.

Figure 49:
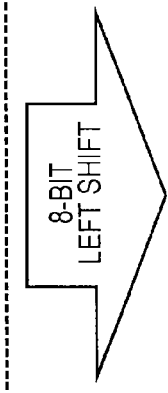
FIG. 49 is a diagram showing register storage data and a process example of a round key generation updating process.

Next, in Step S302, as shown in FIG. 49, the registers r12, r13, r14, and r15 are subjected to left 8-bit logical shift.

Next, in Step S303, as shown in FIG. 50, the registers r5, r6, and r7 are subjected to right 8-bit logical shift, and the AND of the register r4 and the MASK0 and the AND of the registers r5, r6, and r7 and the MASK1 are acquired.

This process is the same process as the process in Step S225 of the flow of FIG. 13.

The storage data items in the register r5, r6, and r7 are shifted to right by eight bits, and the AND process of the register r4 and the MASK0 formed of predetermined data and the AND process of the registers r5, r6, and r7, and the MASK1 formed of predetermined data are performed.

In addition, a value of the MASK is not necessarily retained in the register.

As shown in FIG. 50, the MASK0 is a mask in which only bits in the second to fourth blocks of the data unit of eight bits are set as 1 and the other bits are set to 0.

As shown in FIG. 50, the MASK1 is a mask in which only bits in the second to fifth blocks of the data unit of eight bits are set as 1 and the other bits are set to 0.

As shown in FIG. 50, with the AND process with the mask data items, the 8-bit data items of the head of the registers r4 to r7 are rewritten as 0.

Figure 51:
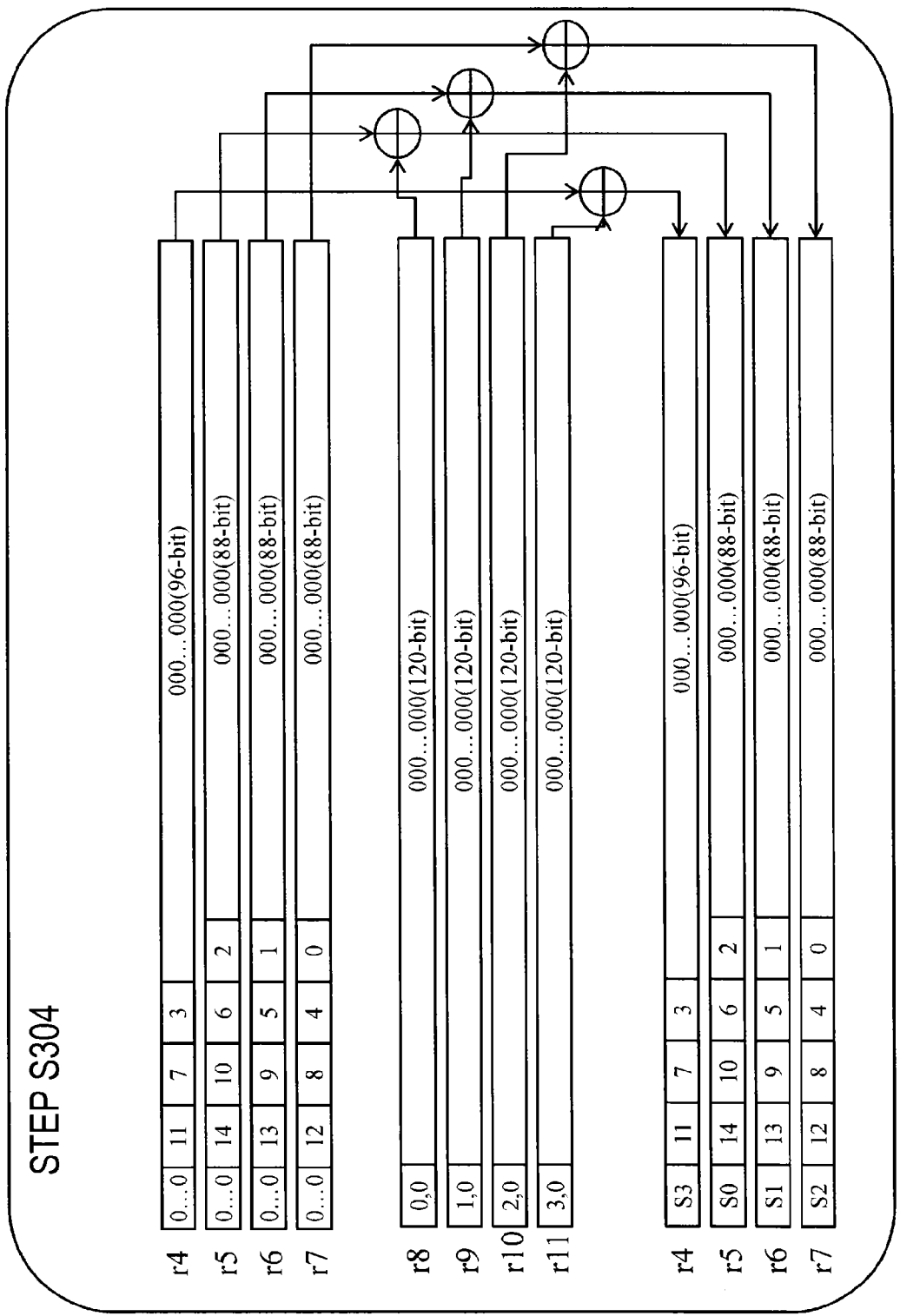
FIG. 51 is a diagram showing register storage data and a process example of a round key generation updating process.

Next, in Step S304, as shown in FIG. 51, the exclusive-OR operation (XOR) of the registers r4, r5, r6, and r7 and the registers r11, r8, r9, and r10 is executed, and the output thereof is stored in the registers r4, r5, r6, and r7.

This process is the same process as the process in Step S226 of the flow of FIG. 13.

As a result of the exclusive-OR operation (XOR) process, the operation results of the nonlinear conversion process (Sbox) in Step S223 which are 8-bit data items of the heads of the registers r11, r8, r9, and r10 are stored in eight bits of the heads of the registers r4, r5, r6, and r7.

Figure 52:
FIG. 52 is a diagram showing register storage data and a process example of a round key generation updating process.

Next, in Step S305, as shown in FIG. 52, the shuffling command is executed with respect to the registers r0, r1, r2, and r3, and the shuffled results are stored in the registers r0, r1, r2, and r3.

FIG. 52 shows the storage data items of the registers r0, r1, r2, and r3 before and after the shuffling process.

This process is the same process as the process in Step S227 of the flow of FIG. 13.

The order of data rearrangement in this shuffling process is different between the register r0, and the registers r1, r2, and r3. The data items of the unit of eight bits in each register are [0,0], [0,1], [0,2], [0,3], [0,4], [0,5], [0,6], [0,7], [0,8], [0,9], [0,10], [0,11], [0,12], [0,13], [0,14], and [0,15] from the head.

In the shuffling process in Step S305, the following setting is executed with respect to the register r0.

([0,0], [0,1], [0,2], [0,3], [0,4], [0,5], [0,6], [0,7], [0,8], [0,9], [0,10], [0,11], [0,12], [0,13], [0,14], [0,15])→([0,12], [0,13], [0,14], [0,15], [0,0], [0,1], [0,2], [0,3], [0,4], [0,5], [0,6], [0,7], [0,8], [0,9], [0,10], [0,11])

In addition, the following setting is executed with respect to the registers r1, r2, and r3.

([0,0], [0,1], [0,2], [0,3], [0,4], [0,5], [0,6], [0,7], [0,8], [0,9], [0,10], [0,11], [0,12], [0,13], [0,14], [0,15])→([0,11], [0,12], [0,13], [0,14], [0,15], [0,0], [0,1], [0,2], [0,3], [0,4], [0,5], [0,6], [0,7], [0,8], [0,9], [0,10])

Next, in Step S306, as shown in FIG. 53, the data items in the registers r0, r1, r2, and r3 are copied to the registers r8, r9, r10, and r11, the AND process of the register r8 and MASK2 and the AND process of the registers r9, r10, and r11 and MASK3 are executed, and the results thereof are stored in the registers r8, r9, r10, and r11.

This process is the same process as the process in Step S228 of the flow of FIG. 13.

In addition, as shown in FIG. 53, the MASK2 is mask data in which 32 bits at the head are 0 and subsequent 96 bits are 1.

As shown in FIG. 53, the MASK3 is mask data in which 40 bits at the head are 0 and subsequent 88 bits are 1.

As a result of this process, 32 bits of the head of the register r8 are set to 0, and 40 bits of the head of the registers r9, r10, and r11 are set to 0.

Figure 54:
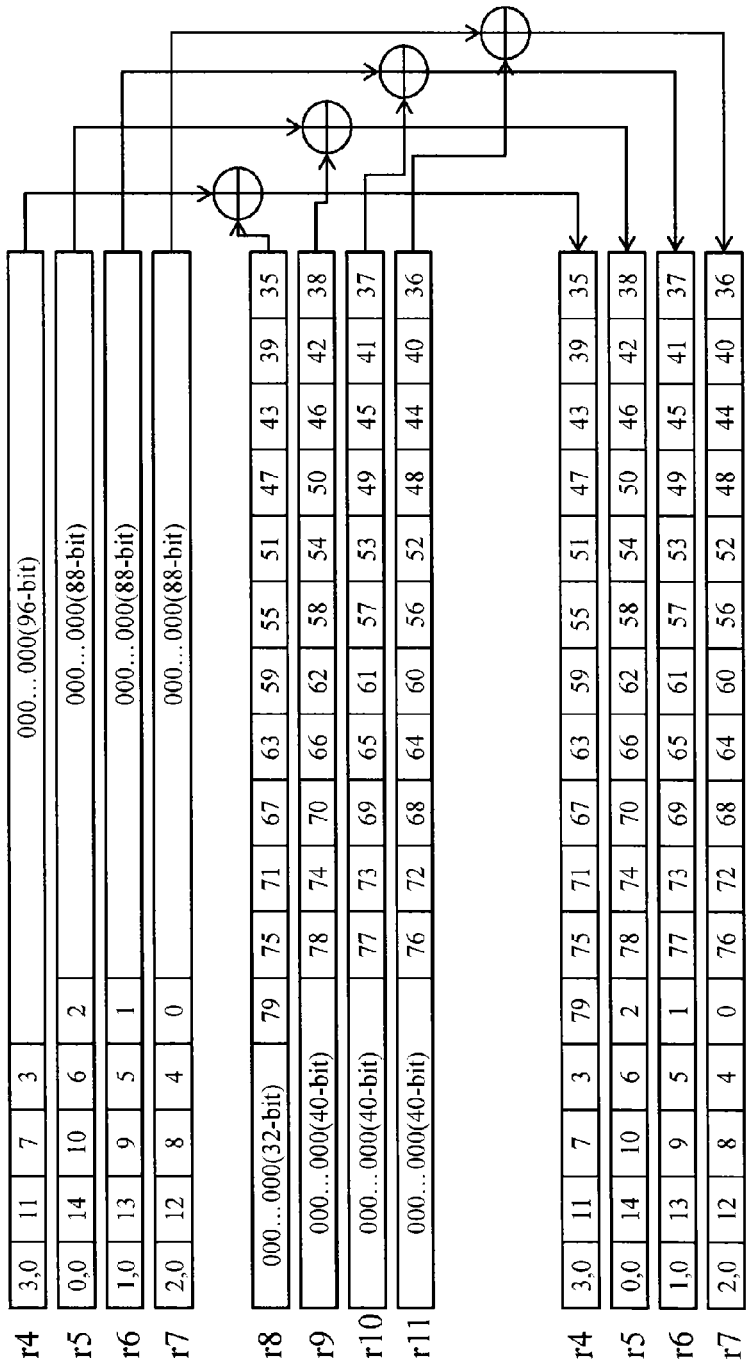
FIG. 54 is a diagram showing register storage data and a process example of a round key generation updating process.

Next, in Step S307, as shown in FIG. 54, the exclusive-OR operation (XOR) of the registers r4, r5, r6, and r7, and the registers r8, r9, r10, and r11 is executed, and the results thereof are stored in the registers r4, r5, r6, and r7.

This process is the same process as the process in Step S229 of the flow of FIG. 13.

Figure 55:
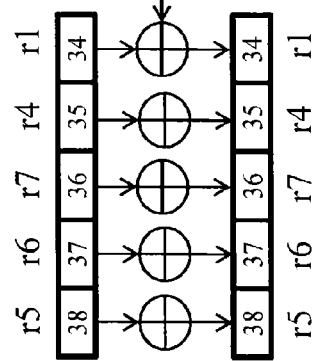
FIG. 55 is a diagram showing register storage data and a process example of a round key generation updating process.
Figure 56:
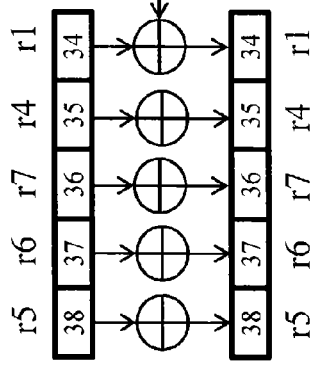
FIG. 56 is a diagram showing register storage data and a process example of a round key generation updating process.

Next, in Step S308, as shown in FIG. 55, the exclusive-OR operation (XOR) of round counter values which are preset count values, is performed with respect to the right eight bits of the registers r5, r6, r7, and r4 and the left eight bits of the registers r1.

This process is the same process as the process in Step S230 of the flow of FIG. 13.

The round counter is set to each count value of 00000 to 11111 as binary expression according to the round number of 0 to 31.

For example, in a case of generating the round key with the round number of 13, the round counter is set to each count value of 01101 indicating 13 as the binary expression.

The XOR operation with the right eight bits of the registers r5, r6, r7, and r4 and left eight bits of the register r1 is performed with respect to the count value of 01101.

In addition, the order of the XOR operation with the count values of 00000 to 11111 of the round counter is the order from the high-order bit of the original data of the storage value of each register. In the example shown in FIG. 24, the order thereof is the order from the large value and is the order of 38, 37, 36, 35, and 34.

That is, the order of the registers is r5, r6, r7, r4, and r1.

As shown in FIG. 55, from the high-order bit, the XOR operation of the right 8-bit data in the register r5 ([38] in the register r5 shown in FIG. 55) is executed with respect to the first bit 0 of the count value of 01101, the XOR operation of the right 8-bit data in the register r6 ([37] in the register r6 shown in FIG. 55) is executed with respect to the second bit 1 of the count value of 01101, the XOR operation of the right 8-bit data in the register r7 ([36] in the register r7 shown in FIG. 55) is executed with respect to the third bit 1 of the count value of 01101, the XOR operation of the right 8-bit data in the register r4 ([35] in the register r6 shown in FIG. 55) is executed with respect to the fourth bit 0 of the count value of 01101, and the XOR operation of the left 8-bit data in the register r1 ([34] in the register r1 shown in FIG. 55) is executed with respect to the fifth bit 1 of the count value of 01101, and each data is updated.

In addition, in this exclusive-OR operation (XOR), it is possible to use the MASK4 and the MASK5 as shown in FIG. 55.

The MASK4 is mask data in which first 120 bits are set to 0 and last eight bits are set to 1.

The MASK5 is mask data in which first eight bits are set to 1 and last 120 bits are set to 0.

The MASK4 is used for the XOR with the registers r5, r6, r7, and r4, and the MASK5 is used for the XOR with the register r1.

In addition, from five bits of the round counter of 00000 to 11111, even when it is set to execute the process with respect to the register corresponding to the bit set as 1 as a target and not to execute the process with respect to the register corresponding to the bit set as 0, the same result of the exclusive-OR operation (XOR) in Step S230 is obtained.

That is, in a case where the value of the round counter, for example is 13=01101, with respect to the register order of r5, r6, r7, r4, and r1 from the high order of the original data described above, since only the second, third, and fifth bits of the round counter are set to 1, only the XOR operation of the register r6 and r7, and the MASK4, and the XOR operation of the register r1 and the MASK5 may be executed with respect to the registers r5, r6, r7, r4, and r1.

The storage data in the registers r5, r6, r7, r4, r1, r2, r3, and r0 obtained as a result in Step S308 are set as blocks for next round key generation.

64 blocks from the blocks stored in the registers r5, r6, r7, r4, r1, r2, r3, and r0 are set as the round keys of the next round.

Hereinafter, the process according to the flow of FIG. 46 is repeated using the updated register storage blocks, and 32 round keys are generated.

As described above, in the (key scheduling process example 2), it is possible to reduce four times of execution of the nonlinear conversion process (Sbox) necessary in the key scheduling process example 1, into two times.

The effect of reduction of the number of processes of the (key scheduling process example 2) will be considered.

The comparison of the number of the process steps between two key scheduling processes described above, which are (A) key scheduling process example 1 (process according to the flows of FIG. 12 and FIG. 13) and (B) key scheduling process example 2 (process according to the flows of FIG. 27 to FIG. 29 and FIG. 46) is as follows.

(A) Key Scheduling Process Example 1

The number of commands necessary for the key updating process with no Sbox pre-calculation is as follows.

Key updating process: 1847 (=57×31+80)

(B) Key Scheduling Process Example 2

The number of commands necessary for the key updating process with Sbox pre-calculation is as follows.

Sbox pre-calculation+key updating process: 1411 (Sbox pre-calculation: 132 (=66×2), key updating process: 1289 (39×31+80))

As described above, compared to the (A) key scheduling process example 1, (B) key scheduling process example 2 can reduce the number of process steps, and the process is more rapidly realized.

[7. Cryptographic Process]

Next, the process in Step S122 executed by the cryptographic processing unit 110 shown in FIG. 7, that is, the cryptographic process will be described in detail.

The cryptographic process (Data Processing) in Step S122 is a step of executing the cryptographic process using the round key, with respect to the bit slice expression data generated based on the plain text data in the data conversion process (Data Conversion) in Step S111.

The process according to the cryptographic algorithm such as the addition (XOR) process with the round key, the linear conversion process, or the nonlinear conversion process using the block configuring the bit slice expression data generated by the bit slice process as a unit, is executed according to the software (program).

This cryptographic process will be described in detail with reference to FIG. 57 and the subsequent drawings.

Figure 57:
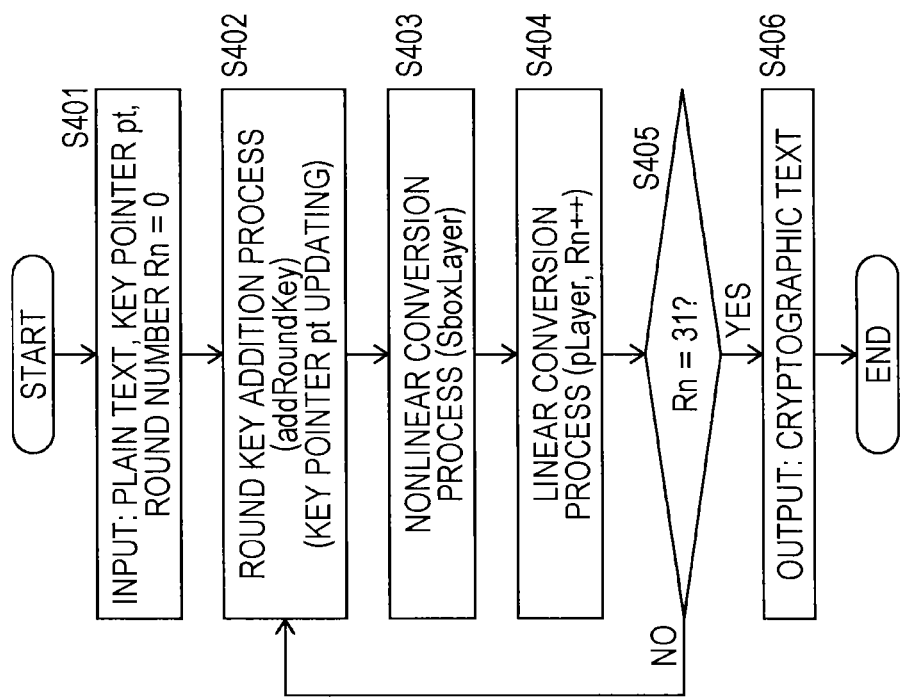
FIG. 57 is a diagram showing a flowchart illustrating a specific sequence of a cryptographic process.

A flowchart shown in FIG. 57 is a flowchart illustrating a specific sequence of the process in Step S122 executed by the cryptographic processing unit 110 shown in FIG. 7, that is, the cryptographic process.

The data input and initial setting are performed in Step S401.

In detail, the bit slice expression data of the plain text data which is the encryption process target stored in the register is input.

This is the data generated in the data conversion process in Step S121 of FIG. 7, and is the bit slice expression data generated by the conversion process of the plain text data 82 described above with reference to FIG. 9. That is, 64 blocks of the bit slice expression blocks [0,0] to [3,15] shown in FIG. 9 are input.

In the example, the bit slice expression blocks [0,0] to [3,15] shown in FIG. 9 are blocks in which the same orders of bits of eight plain text items which are the cryptographic process targets are stored, and are 8-bit data items, respectively.

In Step S401, the bit slice expression data is input, and the initial setting of setting the round number Rn corresponding to the count value of the round number of the cryptographic process as 0, and the initial setting of the key pointer (pt) indicating the memory area in which the round key is stored, are performed. The key pointer (pt) represents the memory address of the round key written in the memory area. The initial value of the round number Rn is set to 0, and Rn increases after the completion of each round.

Steps S402 to S404 are process of the cryptographic process in each round unit, and in Step S402, the round key addition, that is, exclusive-OR operation (addRoundKey) of the round key and the input plain text data (bit slice expression data) is executed, in Step S403, the nonlinear conversion process (SboxLayer) with respect to the results of the round key addition is executed, and in Step S404, the linear conversion process (pLayer) with respect to the results of the nonlinear conversion process is executed.

In addition, the processes will be described later in detail.

In Step S405, it is confirmed whether or not the process round has reached Rn=31 which is the final round.

In a case where the Rn is smaller than 31, the processes in Step S402 to S404 are executed as the next round process.

In Step S405, in a case where it is determined that the process round has reached Rn=31 which is the final round, the cryptographic text is output in Step S406.

The reverse data conversion process in Step S23 shown in FIG. 7 is executed with respect to the output cryptographic text, and the output cryptographic text is output as final cryptographic text 90.

Figure 58:
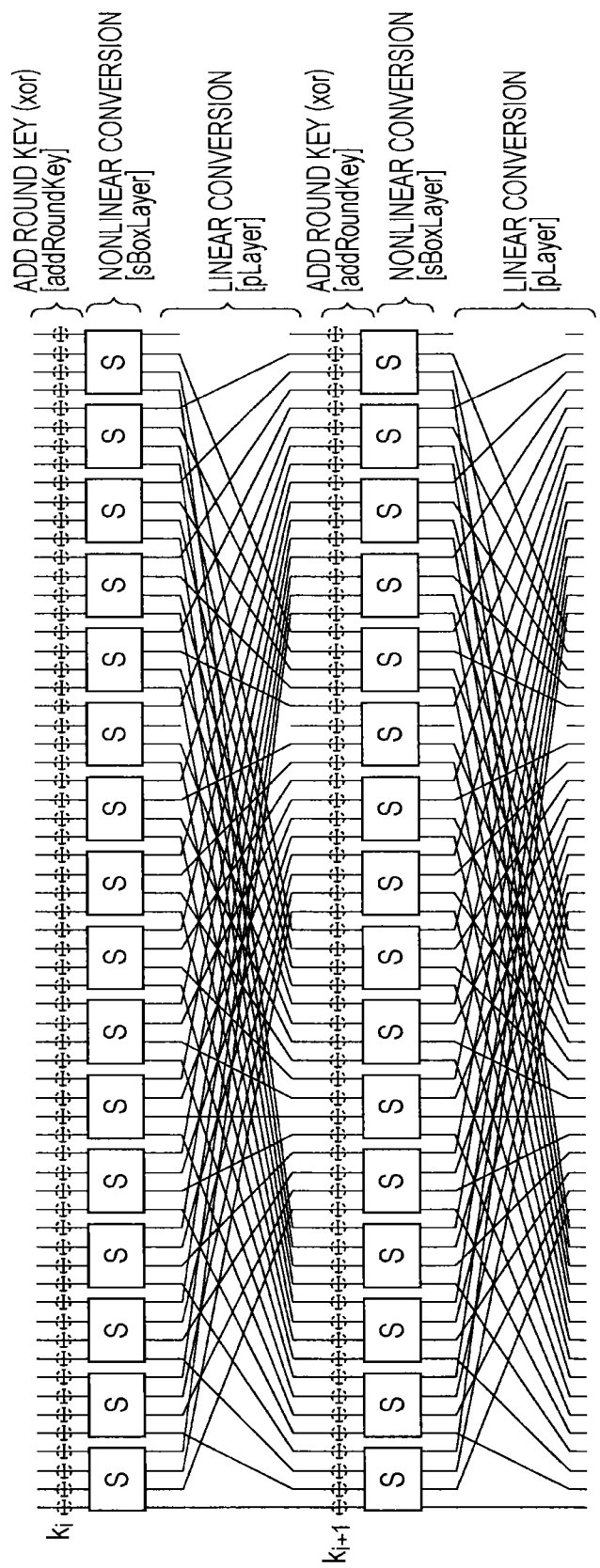
FIG. 58 is a diagram showing a hardware configuration example for performing a cryptographic process executed by a cryptographic processing unit.

FIG. 58 shows a configuration example of a case of executing the cryptographic process step in Step S122 executed by the cryptographic processing unit 110 shown in FIG. 7, with the hardware configuration, for example.

FIG. 58 shows three processes which are (a) round key addition (addRoundKey), (b) nonlinear conversion (Sbox-Layer), and (c) linear conversion (pLayer), for two rounds.

The round operation with the three processes is repeatedly executed in the plurality of rounds, and the cryptographic text is output.

In the apparatus of the present disclosure, the round operation by the operation process with respect to the bit slice expression data stored in the register or the shifting process of the register storage data, that is, the three processes in Step S402 to S404 shown in the flow of FIG. 57 which are (a) round key addition (addRoundKey), (b) nonlinear conversion (SboxLayer), and (c) linear conversion (pLayer), are executed, without using the dedicated hardware for the cryptographic process as shown in FIG. 58, for example.

Hereinafter, each process executed by the apparatus of the present disclosure will be described in detail.

First, the key addition process (addRoundKey) in Step S402 will be described with reference to FIG. 59.

The round key addition in Step S402 is the exclusive-OR operation (addRoundKey) of the round key and the input plain text data (bit slice expression data).

The round key is the round key generated by the key conversion process in Step S111 and the key scheduling process in Step S112 of the cryptographic processing unit 110, with the input of the cryptographic key 81 shown in FIG. 7.

The round key generation process is the process described in [4. Key Conversion Process and Data Conversion Process], [5. Key Scheduling Process (Key Scheduling Process Example 1)], and [6. Key Scheduling Process (Key Scheduling Process Example 2)] described above.

The round key is stored in the memory and the round key is acquired from the area indicated by the key point (pt).

The plain text data which is the cryptographic process target is the bit slice expression data of the plain text data 82 shown in FIG. 7, as described in [4. Key Conversion Process and Data Conversion Process] described above. That is, the plain text data is the bit slice expression data stored in the register by the process described above with reference to FIG. 9.

In addition, in the example, description will be made on the assumption that the cryptographic process with respect to the bit slice expression data generated based on the eight 64-bit plain text items (a1) to (a8) is performed as shown in FIG. 9.

Figure 59:
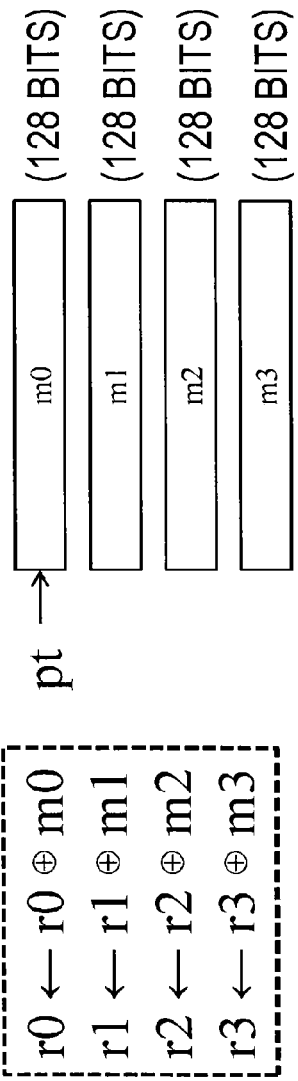
FIG. 59 is a diagram illustrating register storage data at the time of executing a cryptographic process and a data process example.

FIG. 59 shows the bit slice expression data stored in the four 128-bit registers r0 to r3. [i,j] which is the register storage data of FIG. 59 is the bit slice expression block formed of the assembly of the same orders of bits of the eight plain text items (a1) to (a8) shown in FIG. 9.

The bit slice expression block formed of the assembly of the first bits of the eight plain text items (a1) to (a8) is set as [0,0], the bit slice expression block formed of the assembly of the second bits thereof is set as [1,0], the bit slice expression block formed of the assembly of the third bits thereof is set as [2,0], the bit slice expression block formed of the assembly of the fourth bits thereof is set as [3,0], the bit slice expression block formed of the assembly of the fifth bits thereof is set as [0,1], . . . , the bit slice expression block formed of the assembly of the $63^{rd}$ bits thereof is set as [2,15], and the bit slice expression block formed of the assembly of the $64^{th}$ bits thereof is set as [3,15], and the bit slice expression blocks [0,0] to [3,15] each formed of eight bits are dispersed and stored in four registers r0 to r3.

The key addition process in Step S402 of the flow of FIG. 57 is executed as the exclusive-OR operation (XOR) process of the storage data of the four 128-bit registers r0 to r3 shown in FIG. 59 and the round key stored in the memory.

Both the plain text and the round key to be subjected to the exclusive-OR operation (XOR) process are data for 64 blocks of the 8-bit bit slice expression block.

The exclusive-OR operation (XOR) process with the round key (128 bits (16 blocks)) stored in the memory position designated by the pointer (pt) is executed in the unit of each register (=128-bit register (for 16 blocks)).

For the round key, the data in the area designated by the key pointer (pt) is used.

While moving the key pointer (pt) forward by 16 blocks (128 bits) for each exclusive-OR operation (XOR) of one register (128 bits), the exclusive-OR operation (XOR) with the bit slice expression data of the plain text data which is the encryption target stored in four registers r0 to r3 is executed, and the operation results are stored in the registers.

Next, the process in Step S403 of the flowchart shown in FIG. 57 will be described.

Step S403 is the nonlinear conversion process (SboxLayer) with respect to the round key addition process in Step S402.

The nonlinear conversion process (SboxLayer) is executed as the operation process between the registers using four 128-bit registers in which the round key addition results are stored and one temporary register.

In detail, as shown in FIG. 60, the process is executed as the operation process between registers.

The process is realized by the operation process.

From the registers x3, x2, x1, x0, and x4 shown in FIG. 17, the registers x3 to x0 correspond to the four 128-bit registers in which the round key addition results are stored, and the register x4 corresponds to the register used as the temporary area.

The results of the nonlinear conversion process (Sbox-Layer) are stored in the four 128-bit registers, for example, registers r0 to r4.

Next, the process in Step S404 of the flowchart shown in FIG. 57 will be described.

The process in Step S404 is the linear conversion process (pLayer) with respect to the results of the nonlinear conversion in Step S403.

Figure 61:
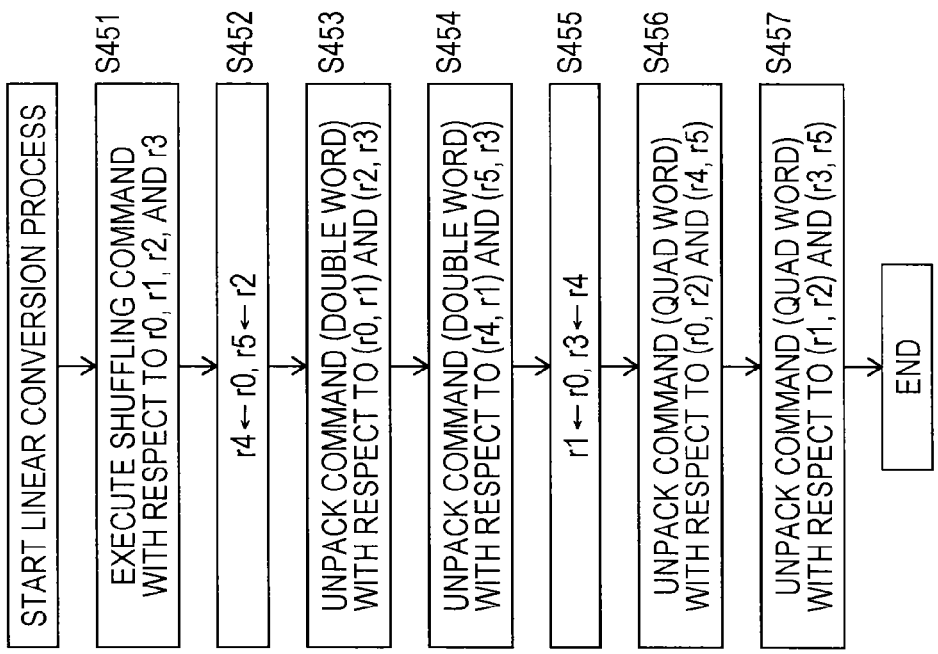
FIG. 61 is a diagram showing a flowchart illustrating a specific sequence of a linear conversion process executed in a cryptographic process.

FIG. 61 shows a flowchart illustrating the specific sequence of this linear conversion process (pLayer).

The processes in each step of the flowchart shown in FIG. 61 will be described in order.

In addition, the data which is the process target of the linear conversion process (pLayer) is the result of the nonlinear conversion in Step S403, and the result of the nonlinear conversion in Step S403 are stored in the four 128-bit registers r0 to r3, as shown in FIG. 62.

Figure 63:
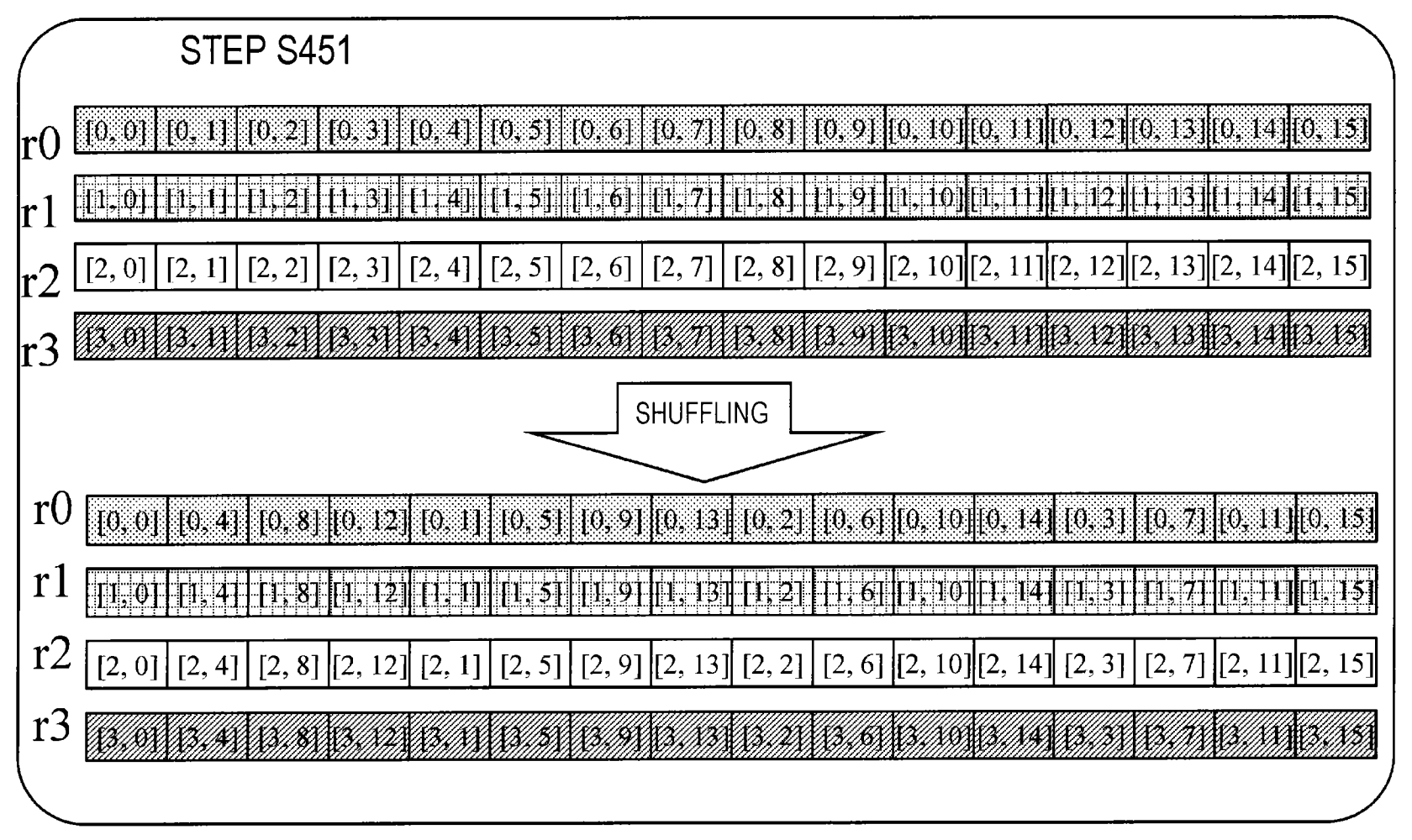

First, in Step S451, as shown in FIG. 63, the shuffling command is executed with respect to the registers r0, r1, r2, and r3 and the results thereof are stored in the registers r0, r1, r2, and r3.

When the arrangement of data in the registers r0, r1, r2, and r3 before the shuffling (same as in registers r0, r1, r2, and r3) is set as [i,0], [i,1], [i,2], [i,3], [i,4], [i,5], [i,6], [i,7], [i,8], [i,9], [i,10], [i,11], [i,12], [i,13], [i,14], and [i,15] from the left, and herein i={0, 1, 2, 3}, the shuffling of each register is set as below.

Register ri
i={0, 1, 2, 3}
([i,0], [i,1], [i,2], [i,3], [i,4], [i,5], [i,6], [i,7], [i,8], [i,9], [i,10], [i,11], [i,12], [i,13], [i,14], [i,15])→([i,0], [i,4], [i,8], [i,12], [i,1], [i,5], [i,9], [i,13], [i,2], [i,6], [i,10], [i,14], [i,3], [i,7], [i,11], [i,15])

Figure 64:
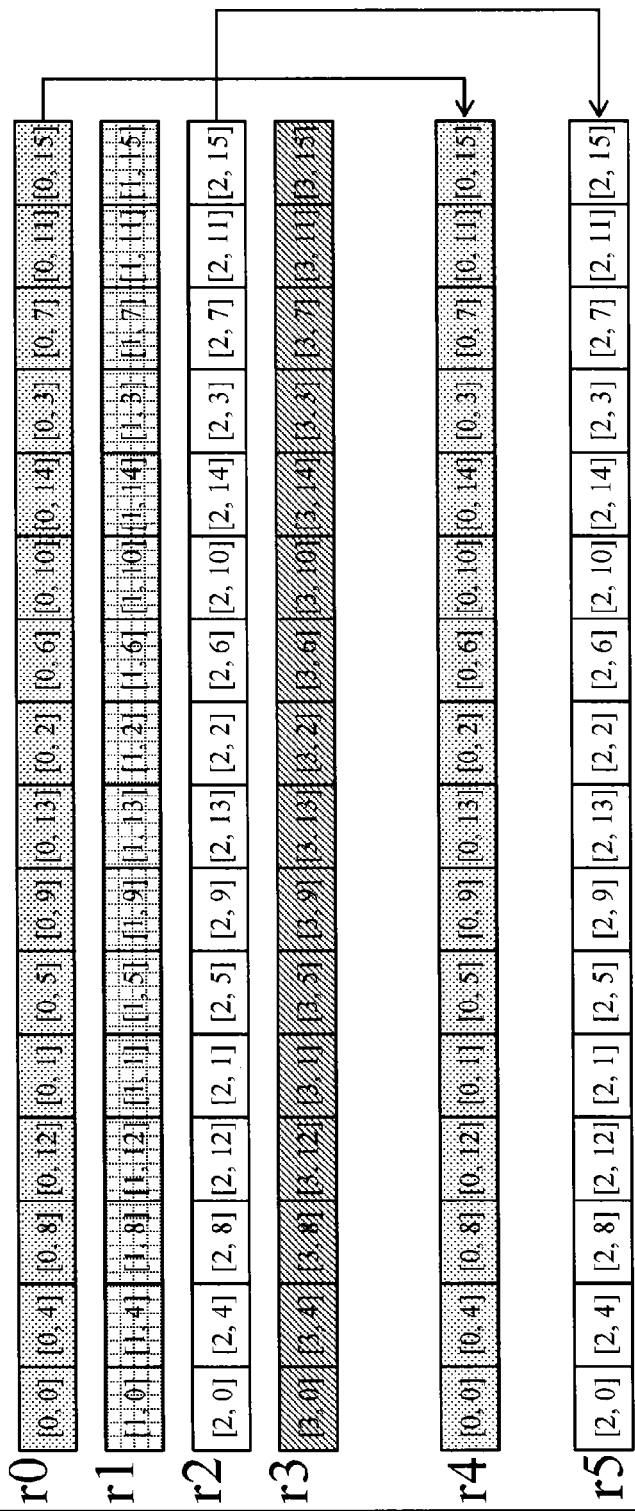
FIG. 64 is a diagram illustrating register storage data and a process example at the time of executing a linear conversion process executed in a cryptographic process.

Next, in Step S452, as shown in FIG. 64, the registers r0 and r2 are copied to the registers r4 and r5.

Figure 65:
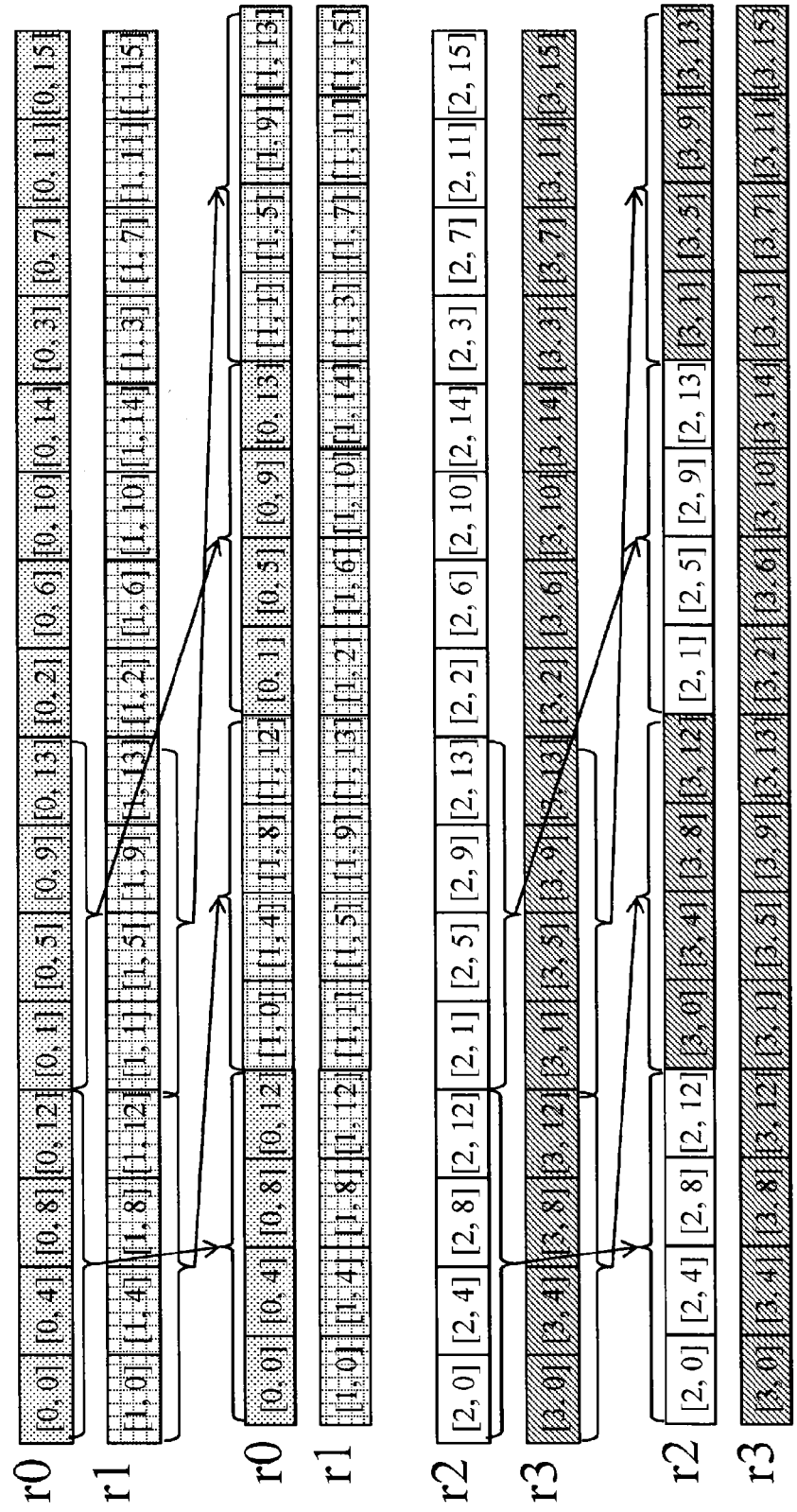
FIG. 65 is a diagram illustrating register storage data and a process example at the time of executing a linear conversion process executed in a cryptographic process.

Next, in Step S453, as shown in FIG. 65, the unpacking command is executed with respect to the left 64 bits of the registers r0 and r1 and the registers r2 and r3, in a double word unit.

As shown in FIG. 65, the unpacking process of alternately storing the left eight blocks (64 bits) of the register r0 and the register r2 in the register r0 from the left, in the double word (32 bits (four blocks)) unit, is executed.

In the same manner as described above, the unpacking process of alternately storing the left eight blocks (64 bits) of the register r2 and the register r3 in the register r2 from the left, in the double word (32 bits (four blocks)) unit, is executed.

Figure 66:
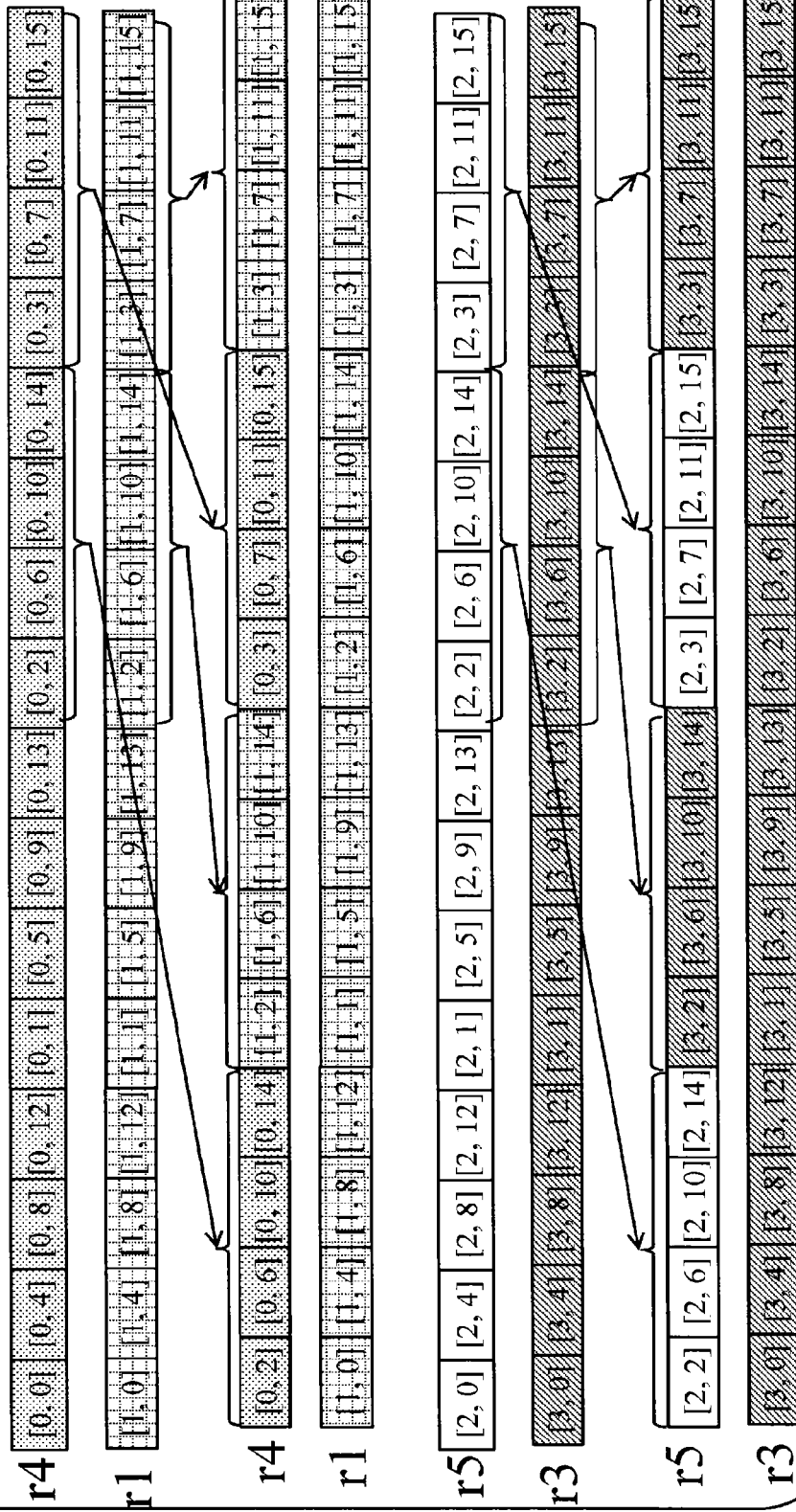
FIG. 66 is a diagram illustrating register storage data and a process example at the time of executing a linear conversion process executed in a cryptographic process.

Next, in Step S454, as shown in FIG. 66, the unpacking command is executed with respect to the right 64 bits of the registers r4 and r1 and the registers r5 and r3, in the double word unit.

As shown in FIG. 66, the unpacking process of alternately storing the right eight blocks (64 bits) of the register r4 and the register r1 in the register r4 from the left, in the double word (32 bits (four blocks)) unit, is executed.

In the same manner as described above, the unpacking process of alternately storing the right eight blocks (64 bits) of the register r5 and the register r3 in the register r5 from the left, in the double word (32 bits (four blocks)) unit, is executed.

Figure 67:
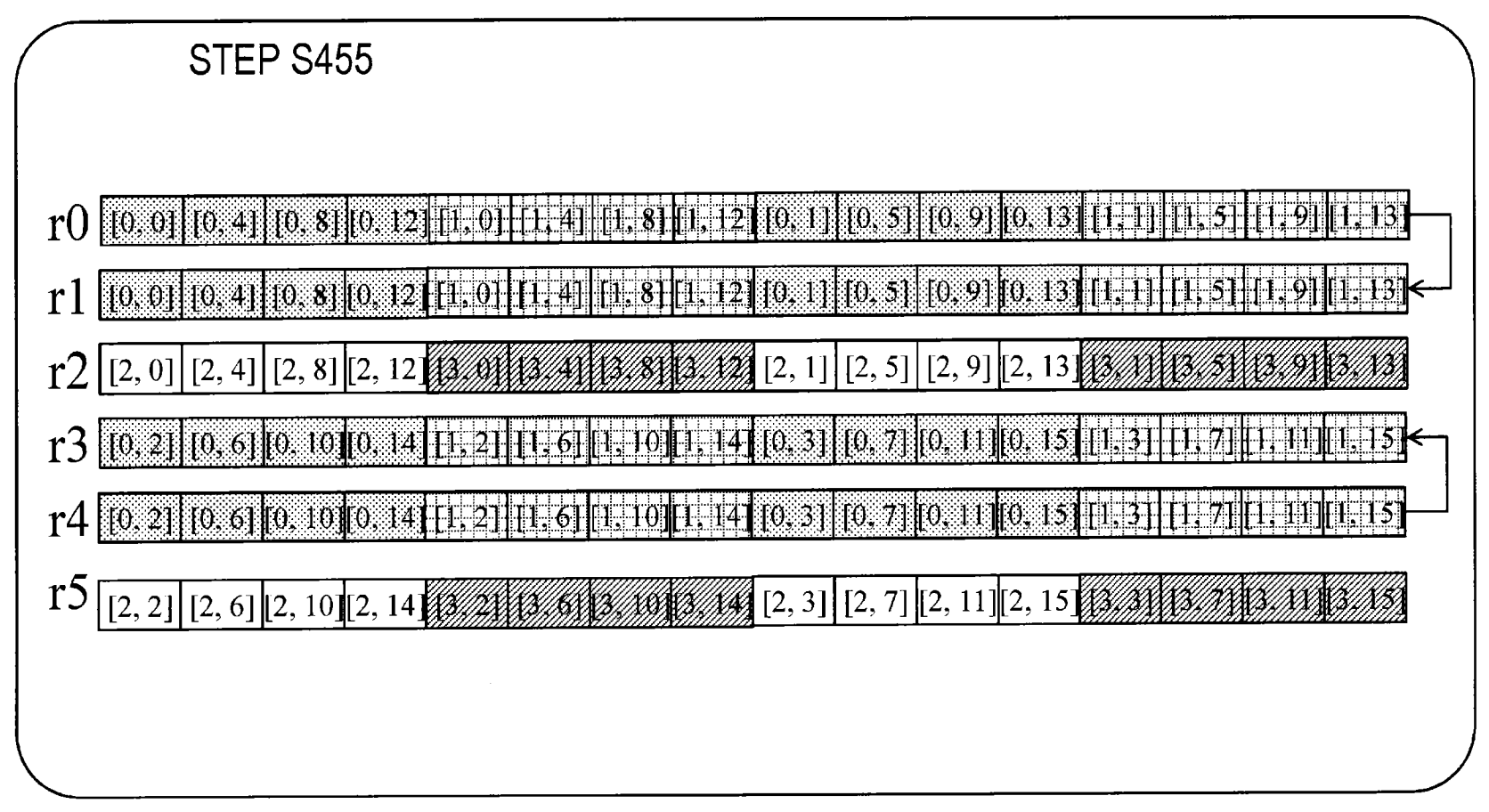

Next, in Step S455, as shown in FIG. 67, the registers r0 and r4 are copied to the registers r1 and r3.

Figure 68:
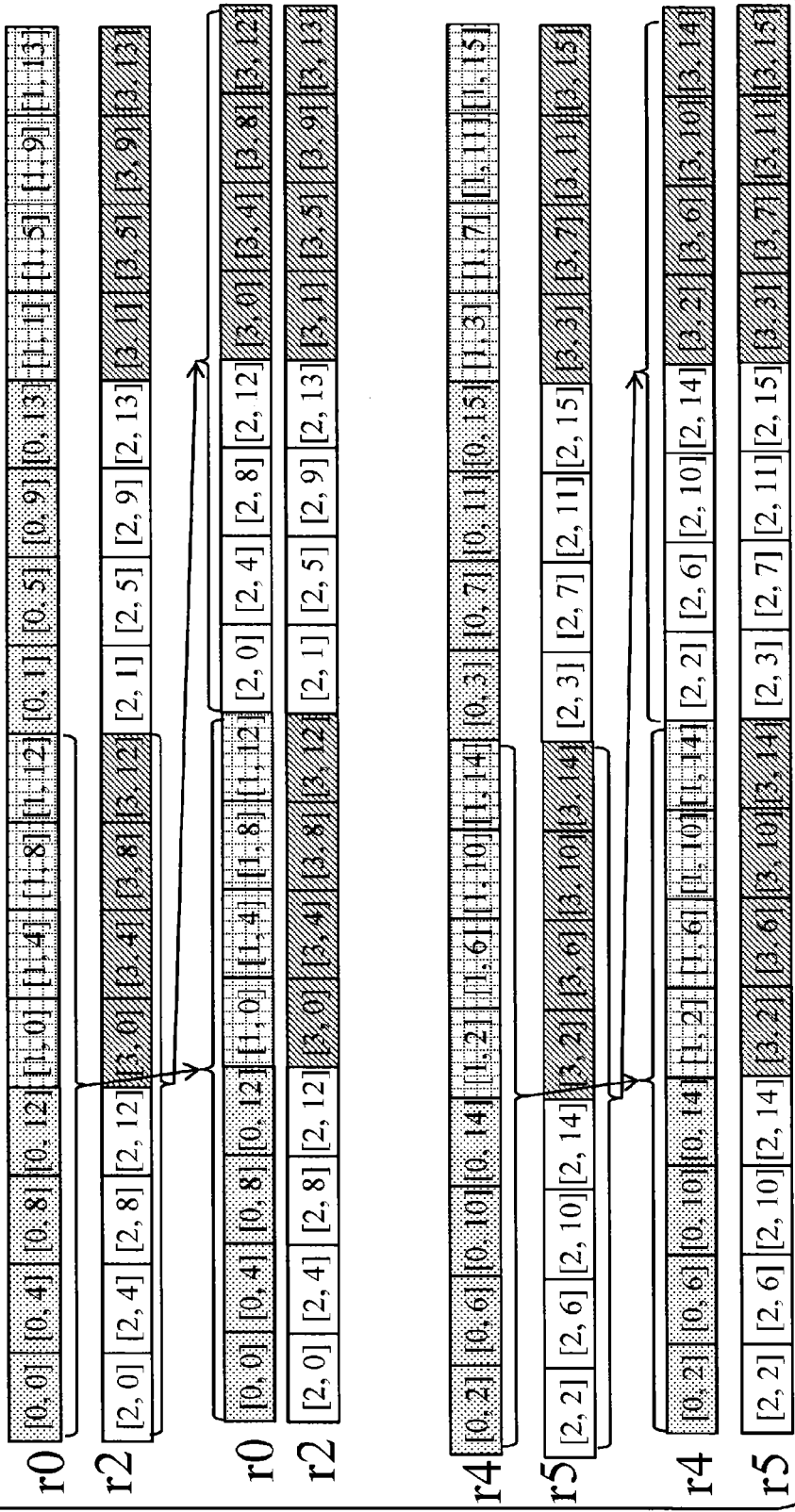
FIG. 68 is a diagram illustrating register storage data and a process example at the time of executing a linear conversion process executed in a cryptographic process.

Next, in Step S456, as shown in FIG. 68, the unpacking command is executed with respect to the left 64 bits of the registers r0 and r2 and the registers r4 and r5, in a quad word unit.

As shown in FIG. 68, the unpacking process of alternately storing the left eight blocks (64 bits) of the register r0 and the register r2 in the register r0 from the left, in the quad word (64 bits (eight blocks)) unit, is executed.

In the same manner as described above, the unpacking process of alternately storing the left eight blocks (64 bits) of the register r4 and the register r5 in the register r4 from the left, in the quad word (64 bits (eight blocks)) unit, is executed.

Figure 69:
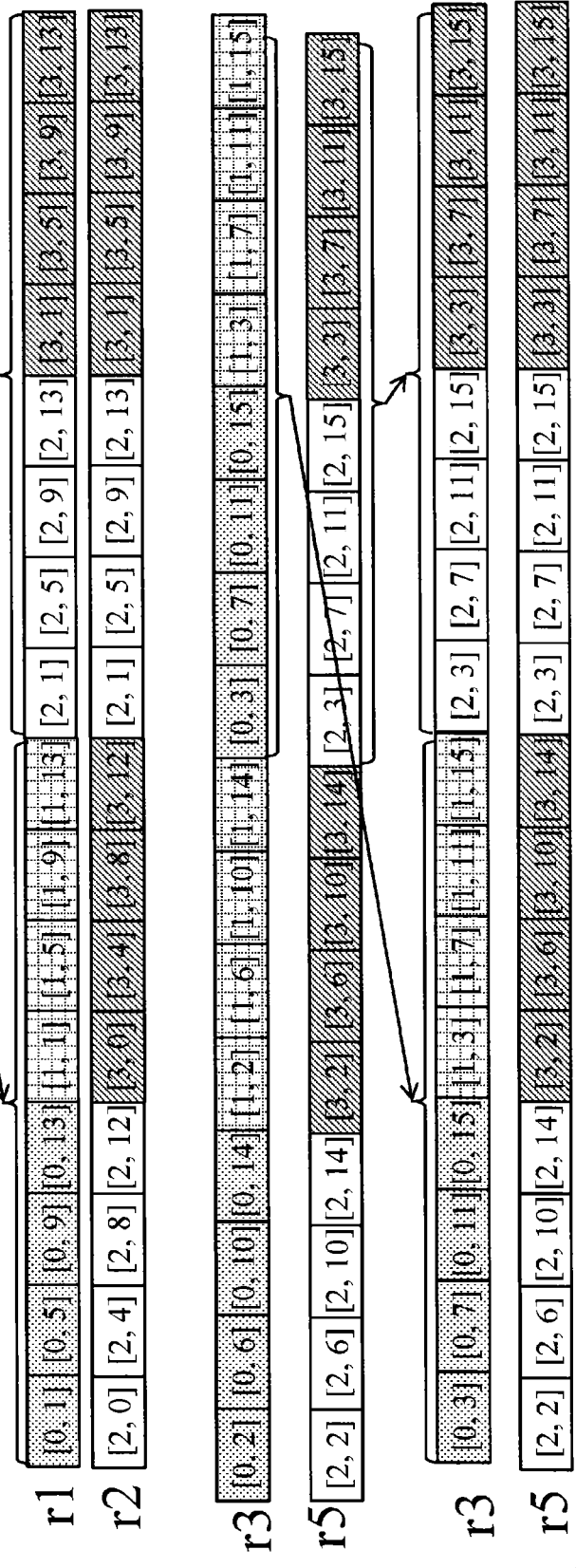
FIG. 69 is a diagram illustrating register storage data and a process example at the time of executing a linear conversion process executed in a cryptographic process.

Next, in Step S457, as shown in FIG. 69, the unpacking command is executed with respect to the right 64 bits of the registers r1 and r2 and the registers r3 and r5, in the quad word unit.

As shown in FIG. 69, the unpacking process of alternately storing the right eight blocks (64 bits) of the register r1 and the register r2 in the register r1 from the left, in the quad word (64 bits (eight blocks)) unit, is executed.

In the same manner as described above, the unpacking process of alternately storing the right eight blocks (64 bits) of the register r3 and the register r5 in the register r3 from the left, in the quad word (64 bits (eight blocks)) unit, is executed.

The registers r0, r1, r4, and r3 generated as the process results in Steps S451 to S457 of the flow shown in FIG. 61 are set to the input of the next round, as the results of the linear conversion.

FIG. 70 shows correspondence between the input and output of the linear conversion process in Step S404 of the flow of FIG. 57.

As described above, one round operation is configured with the round key addition in Step S402, the nonlinear conversion in Step S403, and the linear conversion in Step S404 of the flow shown in FIG. 57.

The number of commands of each process of this round operation process is as follows.

(a) Round key addition (addRoundKey): 4
(b) Nonlinear conversion (SboxLayer): 20
(c) Linear conversion (pLayer): 16

In Step S122 of the cryptographic processing unit 110 shown in FIG. 7, the round operation according to the flow shown in FIG. 57 is repeated the predetermined number of times (32) defined in the cryptographic algorithm. Next, in Step S123, the reverse data conversion process is executed with respect to these process results.

Step S123 is the reverse data conversion process (Data Conversion$^{-1}$) with respect to the results of the cryptographic process (Data Processing) in Step S122, and is a process of returning the bit slice expression data to the assembly of encrypted data corresponding to the plain text data 82 before the bit slice process. This process is executed as a reverse process of the generation process of the bit slice expression data described above with reference to FIG. 9.

With this process, the encrypted data 91 corresponding to the plain text data 82 is generated as the output data 90.

In addition, in the example described above, in order to efficiently execute the linear conversion process (pLayer) of [PRESENT] which is the cryptographic algorithm in the software, the bit slice expression of the data is configured so as to set the process to be performed at intervals of four bits, as described above with reference to FIG. 9. With this configuration, for example, by executing the shuffling and the unpacking command of the Intel extension SIMD command, in combination according to the processes with reference to FIGS. 61 to 70, it is possible to execute the linear conversion (pLayer) with 16 commands for each round.

In addition, in the cryptographic algorithm [PRESENT], when performing the updating process of the round key corresponding to one round, the process is set to perform the nonlinear conversion process using single Sbox.

With respect to this, according to the configuration described in [6. Key Scheduling Process (Key Scheduling Process Example 2)] described above, the key scheduling unit which performs the process by inputting 80-bit keys, can generate the round keys for 32 rounds by performing the nonlinear conversion process two times, and can perform the round key generation with the small number of commands, and therefore the process is rapidly performed.

As described above, the information processing apparatus of the present disclosure can rapidly execute the process of the specific cryptographic algorithm, for example, the cryptographic algorithm [PRESENT] described above, in the information processing apparatus which does not have the dedicated hardware for executing the cryptographic algorithm, for example, the information processing apparatus such as the PC.

[8. Configuration Example of Information Processing Apparatus and Cryptographic Processing Apparatus]

Finally, an apparatus configuration example of the information processing apparatus or the cryptographic processing apparatus which executes the cryptographic process according to the example described above, will be described. The information processing apparatus includes, for example, the server described above with reference to FIGS. 1 to 5.

The cryptographic process according to the example described above can be executed in a device, for example, the PC or the server which includes the data processing unit configured with the CPU or the like for executing the software (program) defining the cryptographic process algorithm, and the memory for storing the programs or the data.

FIG. 71 shows a configuration example of the information processing apparatus or the cryptographic processing apparatus which executes the cryptographic process of the present disclosure.

A central processing unit (CPU) 701 functions as the data processing unit which executes various processes according to programs stored in a read only memory (ROM) 702 or a storage unit 708. For example, the CPU executes the process according to the sequences described above.

A random access memory (RAM) 703 stores the program executed by the CPU 701 or the data. For example, the program defining the cryptographic process sequence described above is stored therein. The RAM also includes the registers storing the data to be used in each process described above, and the memory area used as the work area.

The CPU 701, the ROM 702, and the RAM 703 are connected to each other through a bus 704.

The CPU 701 is connected to an input and output interface 705 through the bus 704, and an input unit 706 configured with various switches, a keyboard, a mouse, or a microphone and an output unit 707 configured with a display or a speaker are connected to the input and output interface 705. The CPU 701 executes various processes in accordance with commands input from the input unit 706, and outputs the process results to the output unit 707, for example.

The storage unit 708 connected to the input and output interface 705 is configured with a hard disk, for example, and stores the program executed by the CPU 701 or various data items. A communication unit 709 communicates with an external device through a network such as the Internet or a local area network.

For example, in a case of the server described above with reference to FIGS. 1 to 5, the communication unit 709 executes a reception process of the encrypted data from the plurality of user terminals or sensors, or a transmission process of the encrypted data with respect to the plurality of user terminals or sensors.

A drive 710 connected to the input and output interface 705 drives a removable medium 711 such as a magnetic disk, an optical disk, a magnet-optical disk, or a semiconductor memory such as a memory card, and executes recording or reading of the data.

In addition, in the example described above, mainly the encryption process of encrypting the plain text as the input data has been described, but the process of the present disclosure can also be applied to the decryption process of restoring the cryptographic text as the input data to the plain text, not only the encryption process of encrypting the plain text as the input data.

[9. Summary of Configurations of Present Disclosure]

Hereinabove, the example of the present disclosure has been described in detail with reference to the specific examples. However, a person skilled in the art can, of course, perform correction or replacement of the examples within a range not departing from the gist of the present disclosure. That is, the present invention has been described with the examples, and the examples are not intended to limit the invention. In order to determine the gist of the present disclosure, it is necessary to refer to the claims.

In addition, in the decryption process according to one example of the present disclosure, the process is performed by the operation or movement process of the bit slice expression block unit stored in a register, and it is possible to perform the processing of the mass data at a high speed. In detail, in a case where a cryptographic algorithm [PRESENT (key length of 80 bits)] is executed in Intel Core i7 870 processor, a high speed of 11.06 cycles/byte is achieved.

In addition, in the examples described above, mainly the execution process example of the cryptographic algorithm [PRESENT (key length of 80 bits)] has been described, but the process of the present disclosure can also be applied to the other algorithm. For example, in a case where a cryptographic algorithm [Piccolo (key length of 80 bits)] is executed according to the process of the present disclosure, a high speed of 5.59 cycles/byte is achieved. Particularly the speed of Piccolo exceeds 6.92 cycles/byte which is a speed record of Advanced Encryption Standard (AES) in the same platform (Intel Core i7 920) which is known in the related art.

In addition, since S-box is calculated by a logical operation without referring to a table in bit slice installation according to one example of the present disclosure, it is possible to increase durability with respect to the side channel attack such as a cache attack or a cross-virtual machine attack. Further, regarding the speed-up of the cryptographic process in the software in the cloud computing process, the cryptographic process can be completed with the smaller number of cycles, and this results in a decrease of power consumption of the cloud or a data center.

In addition, the technology disclosed in the present specification can have the following configurations.

(1) An information processing apparatus including:

a data processing unit which executes a data process according to a program defining a cryptographic process sequence, in which the data processing unit, according to the program, executes
    a data conversion process of generating bit slice expression data by performing a bit slice process with respect to plain text data which is an encryption process target,
    a key conversion process of generating a bit slice expression key by performing a bit slice process with respect to each cryptographic key of the plain text data,
    a key scheduling process of inputting the bit slice expression key to generate a round key for each round of the cryptographic process,
    a cryptographic process in which the round key is applied with respect to the bit slice expression data, and
    a reverse data conversion process of generating encrypted data corresponding to the plain text data, by performing reverse conversion of the bit slice process with respect to the result of the cryptographic process, and
    executes the cryptographic process using an operation process and a movement process of a bit slice expression data block unit configured with the same orders of bits or bits at every n bits of each plain text data configuring the bit slice expression data in the cryptographic process, and herein n is a power of 2.

(2) The information processing apparatus according to (1),
in which the data processing unit
    executes a process of storing a bit slice expression data block configured with the plain text data in a register as a processing unit, in the data conversion process,
    executes a process of storing a bit slice expression key block configured with the same orders of bits or bits at every n bits of each cryptographic key configuring the bit slice expression key, in the register as a processing unit, in the key conversion process, and herein n is a power of 2, and
    executes the cryptographic process using an operation process and a movement process of the block unit using the bit slice expression data block and the bit slice expression key block stored in the register as a unit, in the cryptographic process.

(3) The information processing apparatus according to (1) or (2),
in which the data processing unit
    executes a process of dispersing and storing a bit slice expression data block configured with the plain text data in a plurality of registers as a processing unit, in the data conversion process, and
    performs the cryptographic process by executing an operation process between the plurality of registers with respect to the bit slice expression data block stored in the plurality of registers and a shifting and shuffling process of each register storage block, in the cryptographic process.

(4) The information processing apparatus according to (3),
in which the data processing unit further executes an unpacking process of re-storing a block selected from the storage blocks of the plurality of registers in one register, in the cryptographic process.

(5) The information processing apparatus according to (3) or (4),
in which the data processing unit executes a round key operation defined in the cryptographic process sequence, by executing an exclusive-OR operation (XOR) with the round key in the register unit configuring the plurality of registers for storing the bit slice expression data blocks, in the cryptographic process.

(6) The information processing apparatus according to any one of (3) to (5),
in which the data processing unit executes a nonlinear conversion process (Sbox) defined in the cryptographic process sequence, by executing an operation according to a predetermined logical command example with respect to the bit slice expression blocks stored in the plurality of registers, in the cryptographic process.

(7) The information processing apparatus according to any one of (1) to (6),
in which the data processing unit executes the cryptographic process according to a cryptographic algorithm PRESENT, according to a program, in the cryptographic process.

(8) An information processing apparatus including:
a data processing unit which executes a data process according to a program defining a decryption process sequence,
in which the data processing unit, according to the program, executes
    a data conversion process of generating bit slice expression data by performing a bit slice process with respect to a plurality of encrypted data items which are decryption process targets,
    a key conversion process of generating a bit slice expression key by performing a bit slice process with respect to each cryptographic key of each of the plurality of encrypted data items,
    a key scheduling process of inputting the bit slice expression key to generate a round key for each round of the decryption process,
    a decryption process in which the round key is applied with respect to the bit slice expression data, and
    a reverse data conversion process of generating a plurality of plain text data items corresponding to the plurality of encrypted data items, by performing reverse conversion of the bit slice process with respect to the result of the decryption process, and
    executes the decryption process using an operation process and a movement process of a bit slice expression data block unit configured with the same orders of bits or bits at every n bits of each encrypted data item configuring the bit slice expression data in the decryption process, and herein n is a power of 2.

(9) The information processing apparatus according to (8),
in which the data processing unit executes a process of storing a bit slice expression data block configured with the encrypted data in a register as a processing unit, in the data conversion process,
    executes a process of storing a bit slice expression key block configured with the same orders of bits or bits at every n bits of each cryptographic key configuring the bit slice expression key, in the register as a processing unit, in the key conversion process, and herein n is a power of 2, and
    executes a decryption process using an operation process and a movement process of the block unit using the bit slice expression data block and the bit slice expression key block stored in the register as a unit, in the decryption process.

(10) The information processing apparatus according to (8) or (9),
in which the data processing unit executes a process of dispersing and storing a bit slice expression data block configured with data of the same orders of bits of the encrypted data, in a plurality of registers as a processing unit, in the data conversion process, and
    executes an operation process between the plurality of registers with respect to the bit slice expression data block stored in the plurality of registers and a shifting and shuffling process of each register storage block, in the decryption process.

(11) The information processing apparatus according to (10), in which the data processing unit executes an unpacking process of re-storing a block selected from the storage blocks of the plurality of registers in one register, in the decryption process.

In addition, the method of the process executed in the apparatus and the system described above or the program for executing the process is also included in the configuration of the present disclosure.

In addition, the sequence of the processes described above in the specification can be executed by the hardware, software, or a composite configuration of both. In a case of executing the process by the software, the program in which the process sequence is recorded can be installed in the memory in the computer embedded in the dedicated hardware to be executed, or the program can be installed in the general-purpose computer which can execute various processes, to be executed. For example, the program can be recorded in a recording medium, in advance. In addition to the installation of the program from the recording medium in the computer, the program can be received through the network such as a local area network (LAN) or the Internet, and can be installed in the recording medium such as the built-in hard disk.

In addition, various processes described in the specification are not only executed in time series according to the description, but may be executed in parallel or individually according to the process ability of the apparatus for executing the processes or if needed. Further, the system in the present specification is a logical assembly configuration of the plurality of apparatuses, and is not limited to the apparatuses having each configuration in the same housing.

Reference Signs List
10 CLOUD
20 SENSOR NETWORK
30 SERVER
31 CRYPTOGRAPHIC KEY
32 SENSOR ID
33 ENCRYPTED DATA
70 PLAIN TEXT DATA
80 INPUT DATA
81 CRYPTOGRAPHIC KEY
82 PLAIN TEXT DATA
90 OUTPUT DATA
91 ENCRYPTED DATA
100 INFORMATION PROCESSING APPARATUS
110 CRYPTOGRAPHIC PROCESSING UNIT
701 CPU
702 ROM
703 RAM
704 BUS
705 INPUT AND OUTPUT INTERFACE
706 INPUT UNIT
707 OUTPUT UNIT
708 STORAGE UNIT
709 COMMUNICATION UNIT
710 DRIVE
711 REMOVABLE MEDIUM

The invention claimed is:

1. An information processing apparatus comprising:
  a data processing unit which executes a data process according to a program defining a cryptographic process sequence,
  wherein the data processing unit, according to the program, executes
    a data conversion process of generating bit slice expression data by performing a bit slice process with respect to plain text data which is an encryption process target,
    a key conversion process of generating a bit slice expression key by performing a bit slice process with respect to each cryptographic key of the plain text data,
    a key scheduling process of inputting the bit slice expression key to generate a round key for each round of the cryptographic process,
    a cryptographic process in which the round key is applied with respect to the bit slice expression data, and
    a reverse data conversion process of generating encrypted data corresponding to the plain text data, by performing reverse conversion of the bit slice process with respect to the result of the cryptographic process, and
  executes the cryptographic process using an operation process and a movement process of a bit slice expression data block unit configured with the same orders of bits or bits at every n bits of each plain text data configuring the bit slice expression data in the cryptographic process, and herein n is a power of 2.

2. The information processing apparatus according to claim 1,
  wherein the data processing unit
    executes a process of storing a bit slice expression data block configured with the plain text data in a register as a processing unit, in the data conversion process,
    executes a process of storing a bit slice expression key block configured with the same orders of bits or bits at every n bits of each cryptographic key configuring the bit slice expression key, in the register as a processing unit, in the key conversion process, and herein n is a power of 2, and
    executes the cryptographic process using an operation process and a movement process of the block unit using the bit slice expression data block and the bit slice expression key block stored in the register as a unit, in the cryptographic process.

3. The information processing apparatus according to claim 1,
  wherein the data processing unit
    executes a process of dispersing and storing a bit slice expression data block configured with the plain text data in a plurality of registers as a processing unit, in the data conversion process, and
    performs the cryptographic process by executing an operation process between the plurality of registers with respect to the bit slice expression data block stored in the plurality of registers and a shifting and shuffling process of each register storage block, in the cryptographic process.

4. The information processing apparatus according to claim 3,
  wherein the data processing unit further executes an unpacking process of re-storing a block selected from the storage blocks of the plurality of registers in one register, in the cryptographic process.

5. The information processing apparatus according to claim 3,
  wherein the data processing unit executes a round key operation defined in the cryptographic process sequence, by executing an exclusive-OR operation (XOR) with the round key in the register unit configuring the plurality of registers for storing the bit slice expression data blocks, in the cryptographic process.

6. The information processing apparatus according to claim 3,
wherein the data processing unit executes a nonlinear conversion process (Sbox) defined in the cryptographic process sequence, by executing an operation according to a predetermined logical command example with respect to the bit slice expression blocks stored in the plurality of registers, in the cryptographic process.

7. The information processing apparatus according to claim 1,
wherein the data processing unit executes the cryptographic process according to a cryptographic algorithm PRESENT, according to a program, in the cryptographic process.

8. An information processing apparatus comprising:
a data processing unit which executes a data process according to a program defining a decryption process sequence,
wherein the data processing unit, according to the program, executes
a data conversion process of generating bit slice expression data by performing a bit slice process with respect to encrypted data which is a decryption process target,
a key conversion process of generating a bit slice expression key by performing a bit slice process with respect to each cryptographic key of the encrypted data,
a key scheduling process of inputting the bit slice expression key to generate a round key for each round of the decryption process,
a decryption process in which the round key is applied with respect to the bit slice expression data, and
a reverse data conversion process of generating plain text data corresponding to the encrypted data, by performing reverse conversion of the bit slice process with respect to the result of the decryption process, and
executes the decryption process using an operation process and a movement process of a bit slice expression data block unit configured with the same orders of bits or bits at every n bits of each encrypted data item configuring the bit slice expression data in the decryption process, and herein n is a power of 2.

9. The information processing apparatus according to claim 8,
wherein the data processing unit executes a process of storing a bit slice expression data block configured with the encrypted data in a register as a processing unit, in the data conversion process,
executes a process of storing a bit slice expression key block configured with the same orders of bits or bits at every n bits of each cryptographic key configuring the bit slice expression key, in the register as a processing unit, in the key conversion process, and herein n is a power of 2, and
executes a decryption process using an operation process and a movement process of the block unit using the bit slice expression data block and the bit slice expression key block stored in the register as a unit, in the decryption process.

10. The information processing apparatus according to claim 8,
wherein the data processing unit executes a process of dispersing and storing a bit slice expression data block configured with data of the same orders of bits of the encrypted data, in a plurality of registers as a processing unit, in the data conversion process, and
executes an operation process between the plurality of registers with respect to the bit slice expression data block stored in the plurality of registers and a shifting and shuffling process of each register storage block, in the decryption process.

11. The information processing apparatus according to claim 10,
wherein the data processing unit executes an unpacking process of re-storing a block selected from the storage blocks of the plurality of registers in one register, in the decryption process.

12. An information processing method which is performed in an information processing apparatus, the method causing a data processing unit of the information processing apparatus, according to a program defining a cryptographic process sequence, to execute:
a data conversion process of generating bit slice expression data by performing a bit slice process with respect to plain text data which is an encryption process target;
a key conversion process of generating a bit slice expression key by performing a bit slice process with respect to each cryptographic key of the plain text data;
a key scheduling process of inputting the bit slice expression key to generate a round key for each round of the cryptographic process;
a cryptographic process in which the round key is applied with respect to the bit slice expression data; and
a reverse data conversion process of generating encrypted data corresponding to the plain text data, by performing reverse conversion of the bit slice process with respect to the result of the cryptographic process,
wherein the cryptographic process using an operation process and a movement process of a bit slice expression data block unit configured with the same orders of bits or bits at every n bits of each plain text data configuring the bit slice expression data is executed in the cryptographic process, and herein n is a power of 2.

13. An information processing method which is performed in an information processing apparatus, the method causing a data processing unit of the information processing apparatus, according to a program defining a decryption process sequence, to execute:
a data conversion process of generating bit slice expression data by performing a bit slice process with respect to the encrypted data which is a decryption process target;
a key conversion process of generating a bit slice expression key by performing a bit slice process with respect to each cryptographic key of the encrypted data;
a key scheduling process of inputting the bit slice expression key to generate a round key for each round of the decryption process;
a decryption process in which the round key is applied with respect to the bit slice expression data; and
a reverse data conversion process of generating plain text data corresponding to the encrypted data, by performing reverse conversion of the bit slice process with respect to the result of the decryption process,
wherein the decryption process using an operation process and a movement process of a bit slice expression data block unit configured with the same orders of bits or bits at every n bits of each encrypted data item configuring the bit slice expression data is executed in the decryption process, and herein n is a power of 2.

14. A program stored on a non-transitory computer-readable medium which causes an information processing apparatus to perform a cryptographic process comprising:
  causing a data processing unit of the information processing apparatus to execute
    a data conversion process of generating bit slice expression data by performing a bit slice process with respect to plain text data which is an encryption process target,
    a key conversion process of generating a bit slice expression key by performing a bit slice process with respect to each cryptographic key of the plain text data,
    a key scheduling process of inputting the bit slice expression key to generate a round key for each round of the cryptographic process,
    a cryptographic process in which the round key is applied with respect to the bit slice expression data, and
    a reverse data conversion process of generating encrypted data corresponding to the plain text data, by performing reverse conversion of the bit slice process with respect to the result of the cryptographic process,
  wherein the cryptographic process using an operation process and a movement process of a bit slice expression data block unit configured with the same orders of bits or bits at every n bits of each plain text data configuring the bit slice expression data is executed in the cryptographic process, and herein n is a power of 2.

15. A program stored on a non-transitory computer-readable medium which causes an information processing apparatus to perform a decryption process comprising:
  causing a data processing unit of the information processing apparatus to execute
    a data conversion process of generating bit slice expression data by performing a bit slice process with respect to the encrypted data which is a decryption process target,
    a key conversion process of generating a bit slice expression key by performing a bit slice process with respect to each cryptographic key of the encrypted data,
    a key scheduling process of inputting the bit slice expression key to generate a round key for each round of the decryption process,
    a decryption process in which the round key is applied with respect to the bit slice expression data, and
    a reverse data conversion process of generating plain text data corresponding to the encrypted data, by performing reverse conversion of the bit slice process with respect to the result of the decryption process,
  wherein the decryption process using an operation process and a movement process of a bit slice expression data block unit configured with the same orders of bits or bits at every n bits of each encrypted data item configuring the bit slice expression data is executed in the decryption process, and herein n is a power of 2.

* * * * *